(12) United States Patent
Nakazato et al.

(10) Patent No.: US 8,185,361 B2
(45) Date of Patent: May 22, 2012

(54) UNMOLDABLE PORTION DETECTION SYSTEM, COMPUTER READABLE MEDIUM, AND UNMOLDABLE PORTION DETECTION METHOD

(75) Inventors: Hiroaki Nakazato, Kanagawa (JP);
Masaaki Hagiwara, Kanagawa (JP);
Katsumi Takezaki, Kanagawa (JP);
Toshihiro Numauchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 827 days.

(21) Appl. No.: 12/271,314

(22) Filed: Nov. 14, 2008

(65) Prior Publication Data
US 2009/0125284 A1    May 14, 2009

(30) Foreign Application Priority Data

Nov. 14, 2007 (JP) ................ P2007-296120
May 2, 2008 (JP) ................ P2008-120638

(51) Int. Cl.
*G06F 17/50* (2006.01)
(52) U.S. Cl. .............................. 703/1; 700/97
(58) Field of Classification Search ............. 703/1
See application file for complete search history.

(56) References Cited

U.S. PATENT DOCUMENTS

| | | | | |
|---|---|---|---|---|
| 5,812,402 | A | 9/1998 | Nishiyama et al. | 364/468.03 |
| 6,192,327 | B1 * | 2/2001 | Nishiyama et al. | 703/2 |
| 6,327,553 | B1 * | 12/2001 | Nishiyama et al. | 703/2 |
| 6,546,362 | B1 * | 4/2003 | Guo et al. | 703/1 |
| 6,917,905 | B2 * | 7/2005 | Asano et al. | 703/1 |
| 7,630,783 | B2 * | 12/2009 | Walls-Manning et al. | 700/98 |
| 2009/0125284 | A1 | 5/2009 | Nakazato et al. | 703/1 |

FOREIGN PATENT DOCUMENTS

| | | |
|---|---|---|
| JP | 9-185647 | 7/1997 |
| JP | 11-147226 | 6/1999 |
| JP | 11-348044 | 12/1999 |
| JP | 2005-329589 | 12/2005 |
| JP | 2006-139791 | 6/2006 |
| JP | 2008-003963 | 1/2008 |
| JP | 2008-027139 | 2/2008 |
| JP | 2009-119716 | 6/2009 |
| JP | 2009-129095 | 6/2009 |
| JP | 2009-134376 | 6/2009 |

OTHER PUBLICATIONS

Fu et al, "Generation of Optimal Parting Direction Based on Undercut Features in Injection Molded Parts", IIE Transactions, 31, pp. 947-955, 1999.*
Nee et al, "Determination of Optimal Parting Directions in Plastic Injection Mold Design", Annals of the CIRP, vol. 46/1, 1997.*
Fu et al, "Undercut Feature Recognition in an Injection Mould Design System", Computer Aided Design 31, pp. 777-790, 1999.*

* cited by examiner

*Primary Examiner* — Mary C Jacob
(74) *Attorney, Agent, or Firm* — Morgan, Lewis & Bockius LLP

(57) ABSTRACT

An unmoldable portion detection system includes: a normal line arithmetic unit; a backward component determination unit; and an unmoldable portion determination unit, wherein the system further includes one of the following (A) units and (B) units: (A) a concave connection determination unit; and an adjacent unmoldable portion determination unit, and (B) a projection line reach determination unit; and a projection unmoldable portion determination unit.

19 Claims, 45 Drawing Sheets

(FIG. 2 Continued)

| Block | Code | Label |
|---|---|---|
| | | PROJECTION UNMOLDABLE PORTION DETERMINATION UNIT |
| C105C | C105C1 | PROJECTION LINE REACH DETERMINATION UNIT |
| | C105C2 | STAND WALL DETERMINATION UNIT |
| | C105D | UNMOLDABLE PORTION SETTING STORAGE UNIT |
| | C105E | MOLDABLE PORTION SETTING STORAGE UNIT |
| | C105F | UNMOLDABLE PORTION DISPLAY UNIT |
| C106 | C106A | UNNECESSARY BOUNDARY DETECTION UNIT |
| | C106B | MIDPOINT ARITHMETIC UNIT |
| | C106C | NORMAL LINE DETERMINATION UNIT |
| | C106D | CURVATURE ARITHMETIC UNIT |
| | C106E | CURVATURE DETERMINATION UNIT |
| | C106F | UNNECESSARY BOUNDARY SETTING STORAGE UNIT |
| | C106G | NECESSARY BOUNDARY SETTING STORAGE UNIT |
| | | UNNECESSARY BOUNDARY DISPLAY UNIT |
| C107 | C107A | WEDGE-SHAPED UNEVEN PORTION DETECTION UNIT |
| | C107B | MIDPOINT ARITHMETIC UNIT |
| | C107C | WEDGE SHAPE DETERMINATION UNIT |
| | C107D | NORMAL DIRECTION MOVEMENT POINT ARITHMETIC UNIT |
| | C107E | UNEVENNESS DETERMINATION UNIT |
| | C107F | WEDGE-SHAPED CONCAVE PORTION SETTING STORAGE UNIT |
| | C107G | WEDGE-SHAPED CONVEX PORTION SETTING STORAGE UNIT |
| | C107H | NON-WEDGE-SHAPED UNEVEN PORTION SETTING STORAGE UNIT |
| | | WEDGE-SHAPED UNEVEN PORTION DISPLAY UNIT |
| | C108 | DRAWING COMPLETION DETERMINATION UNIT |

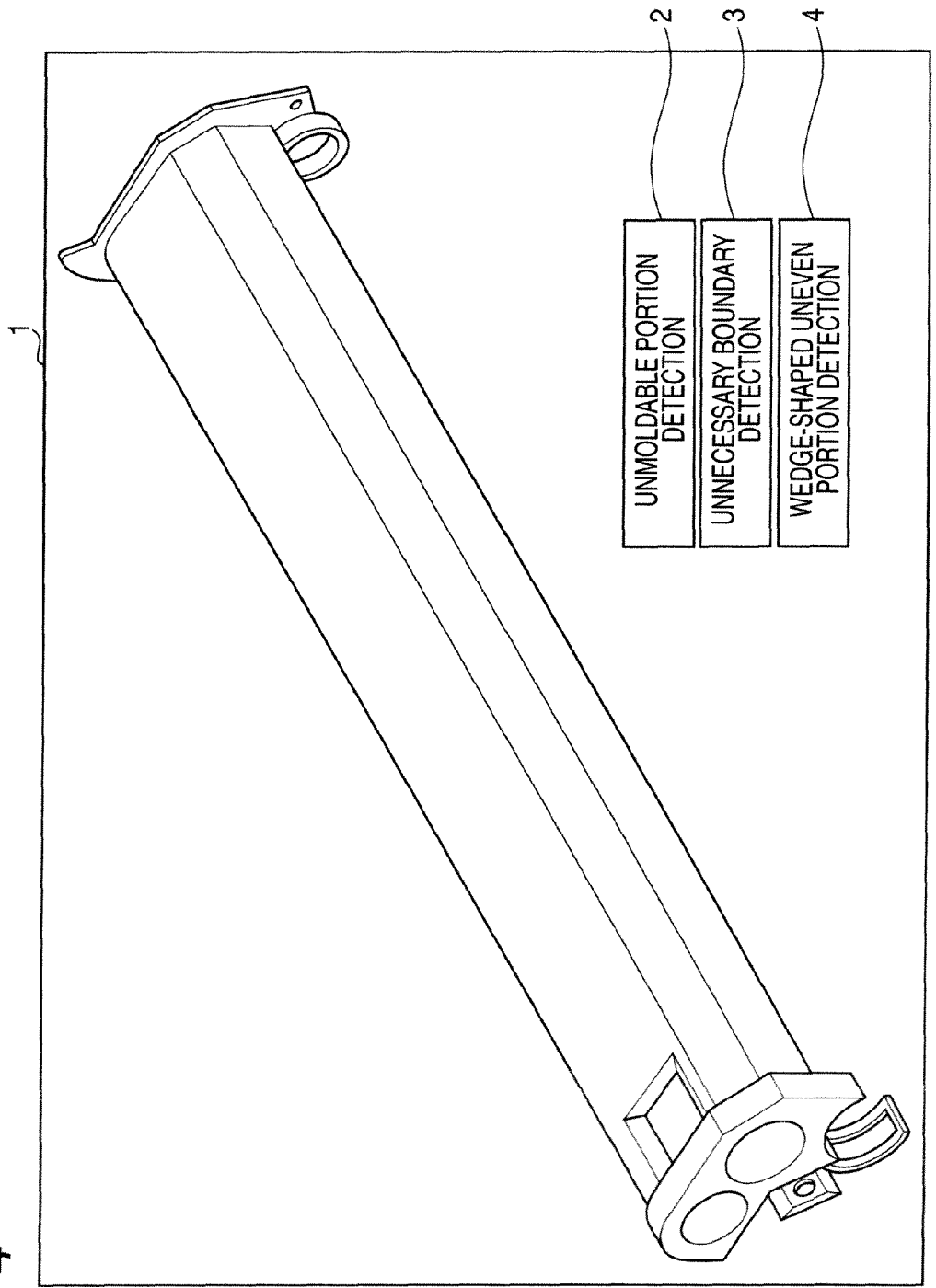

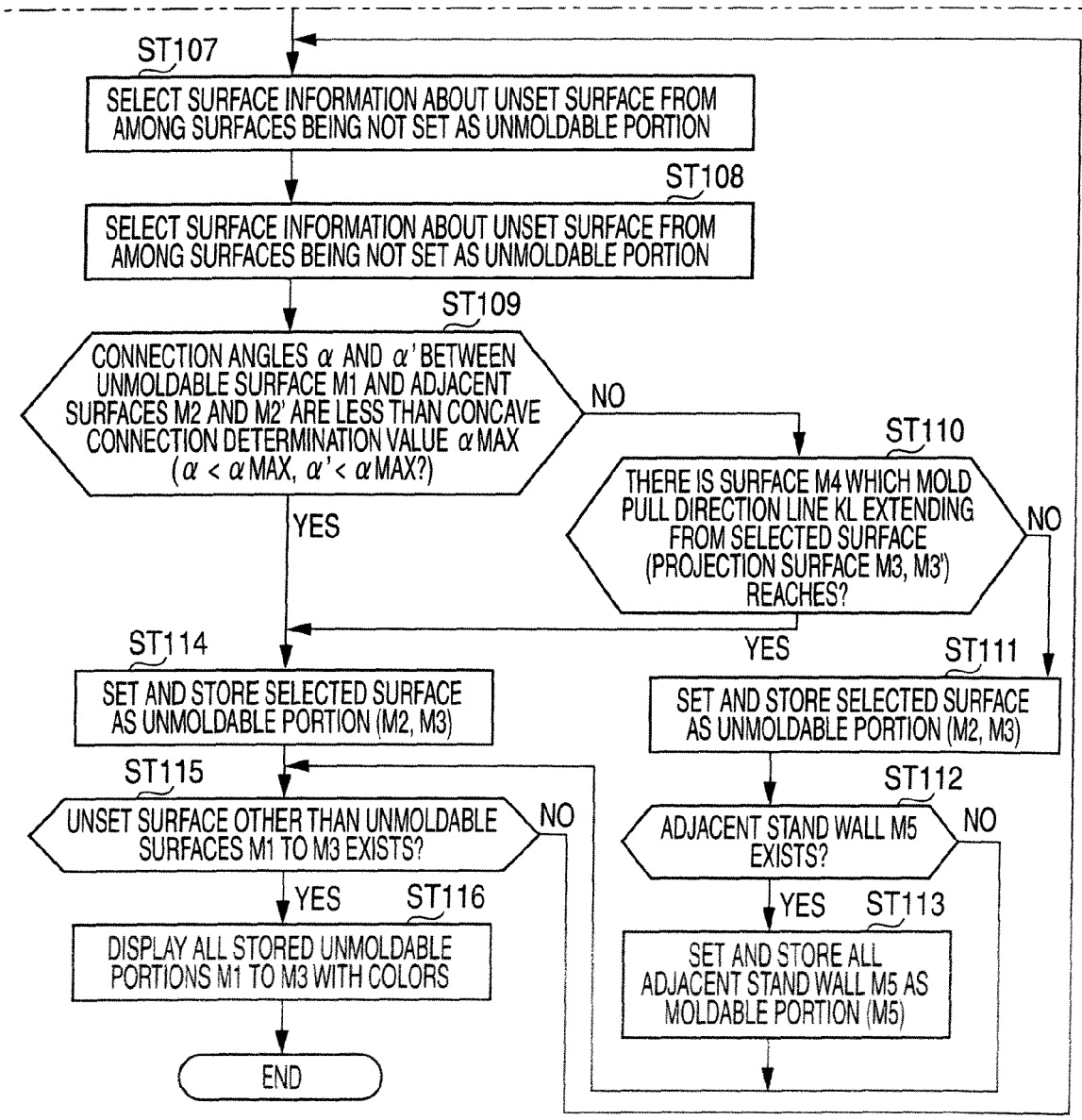

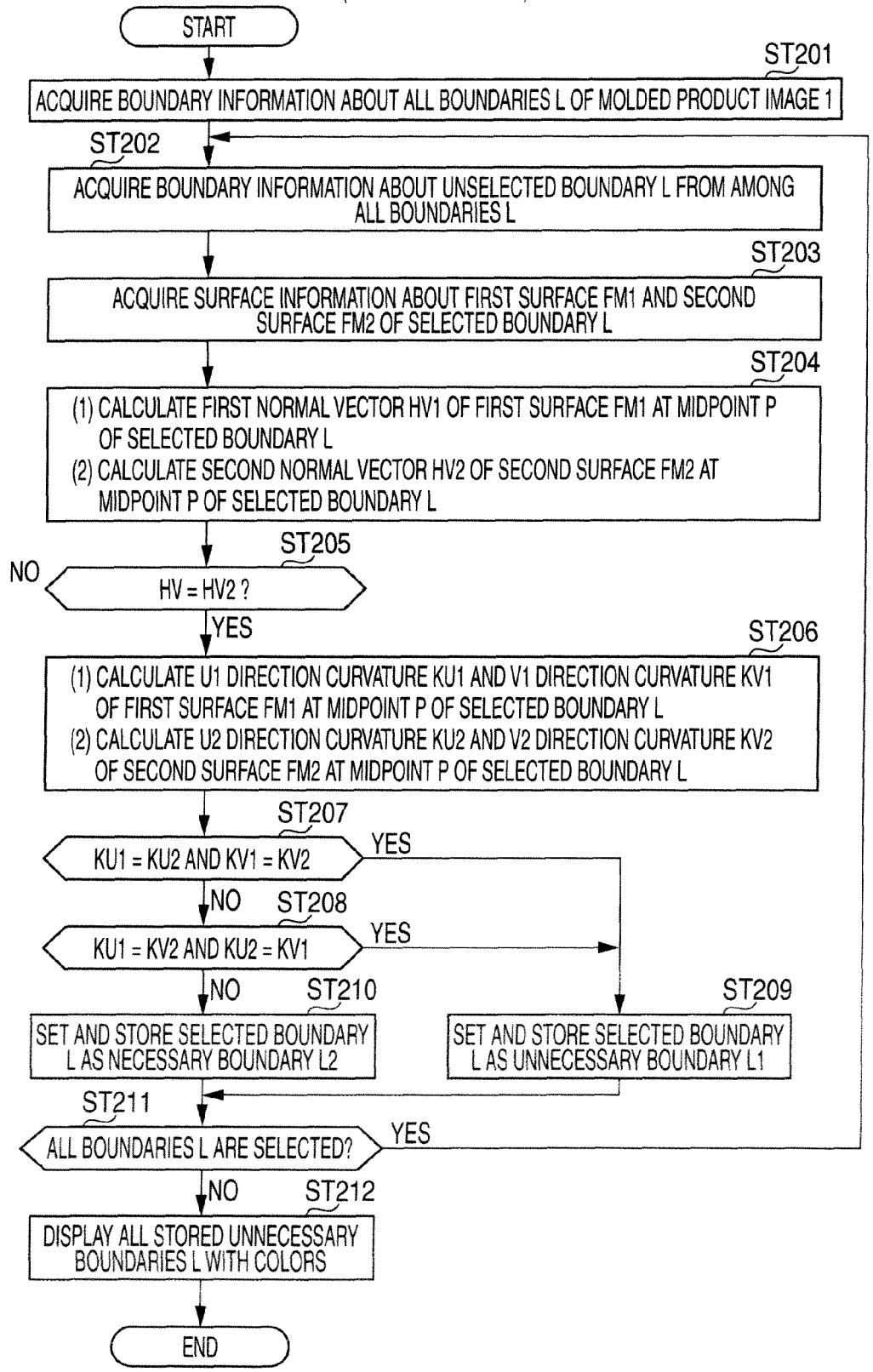

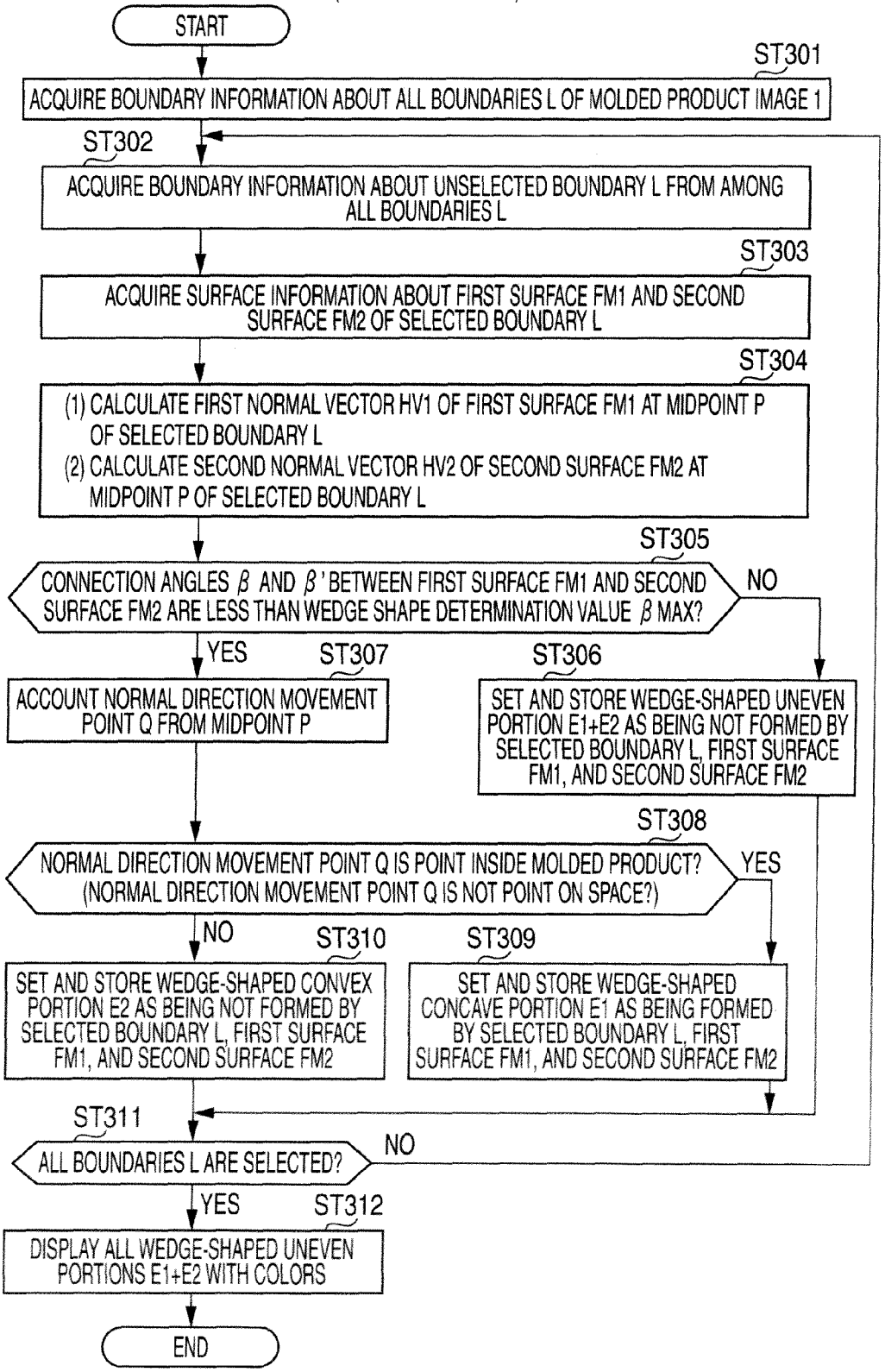

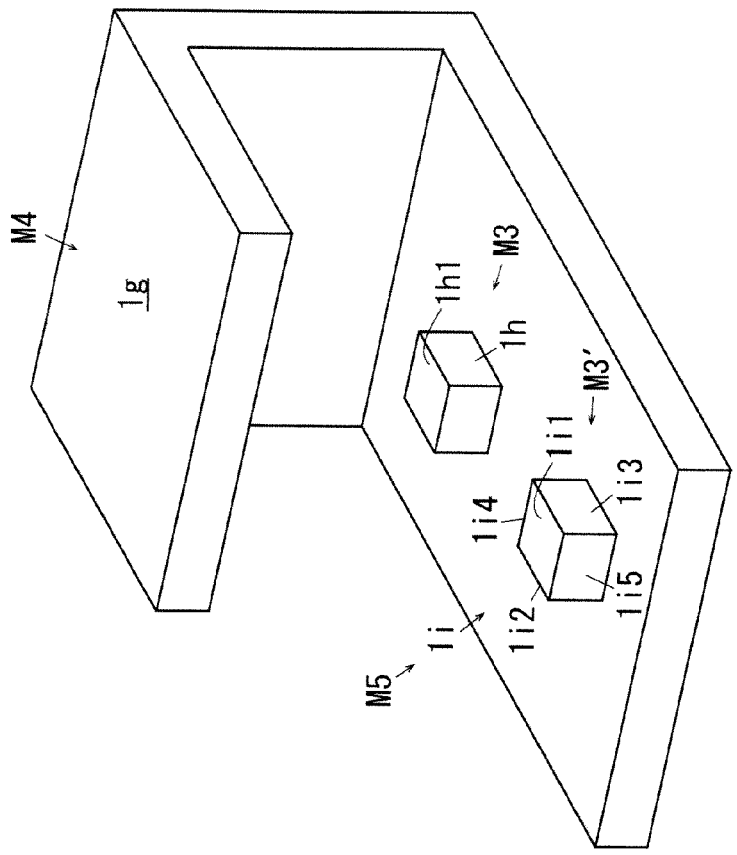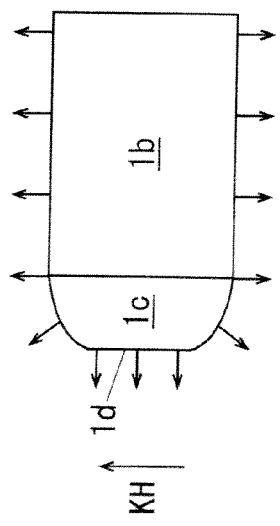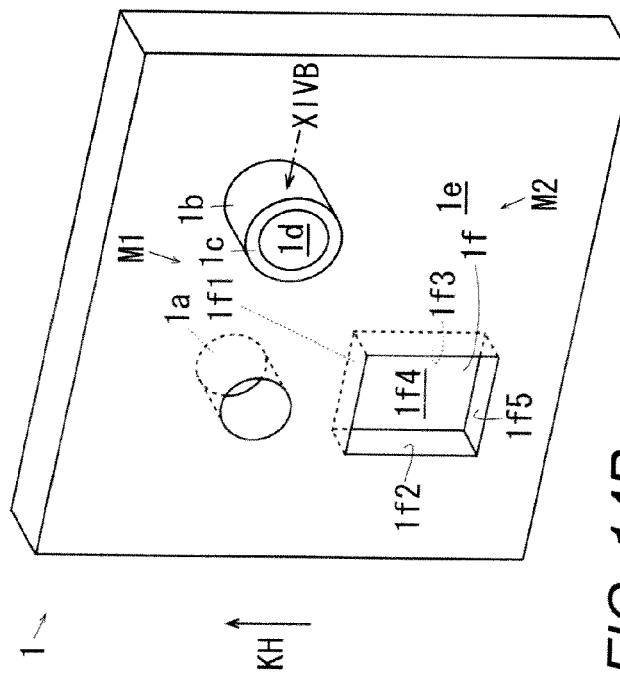

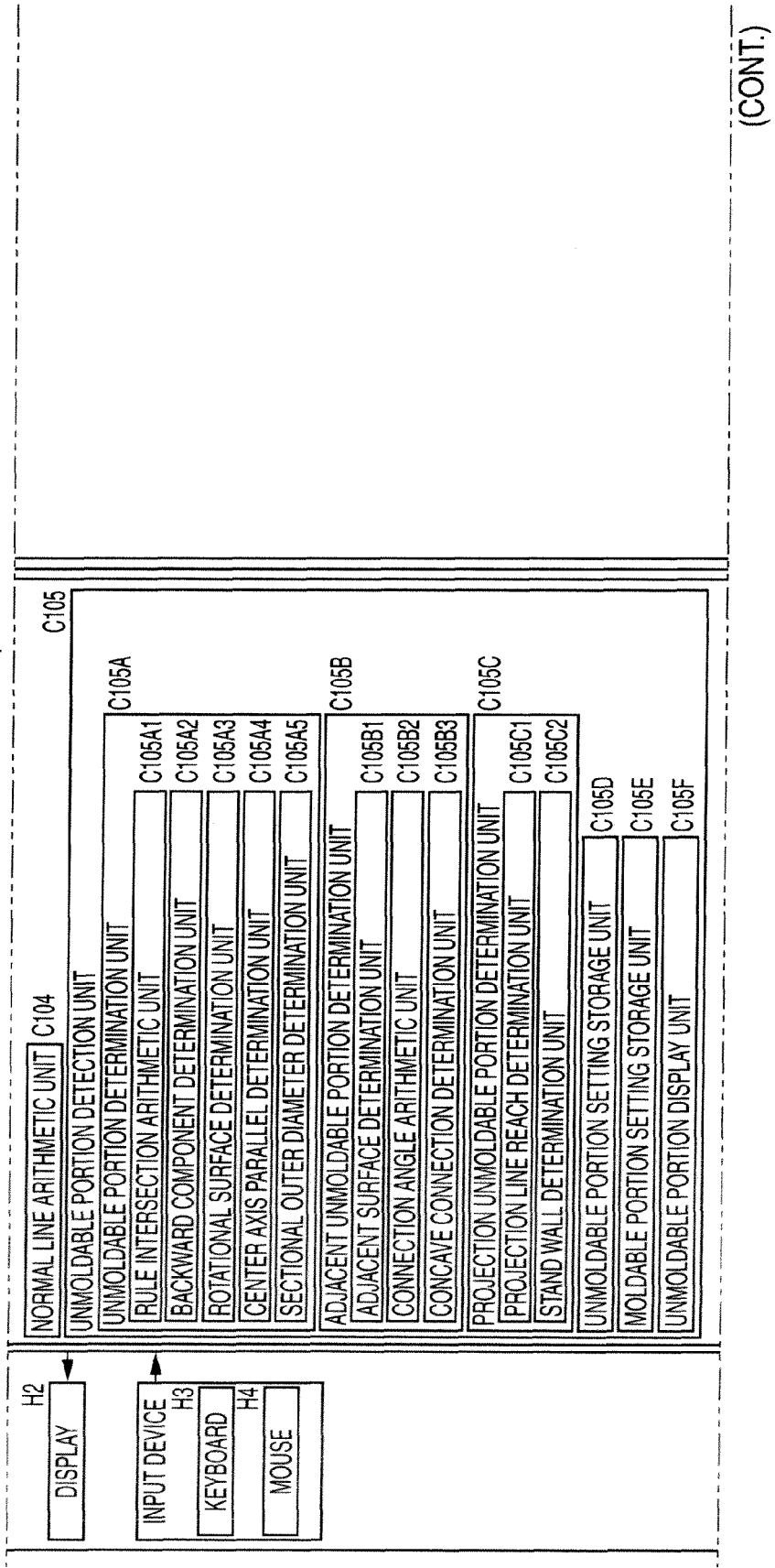

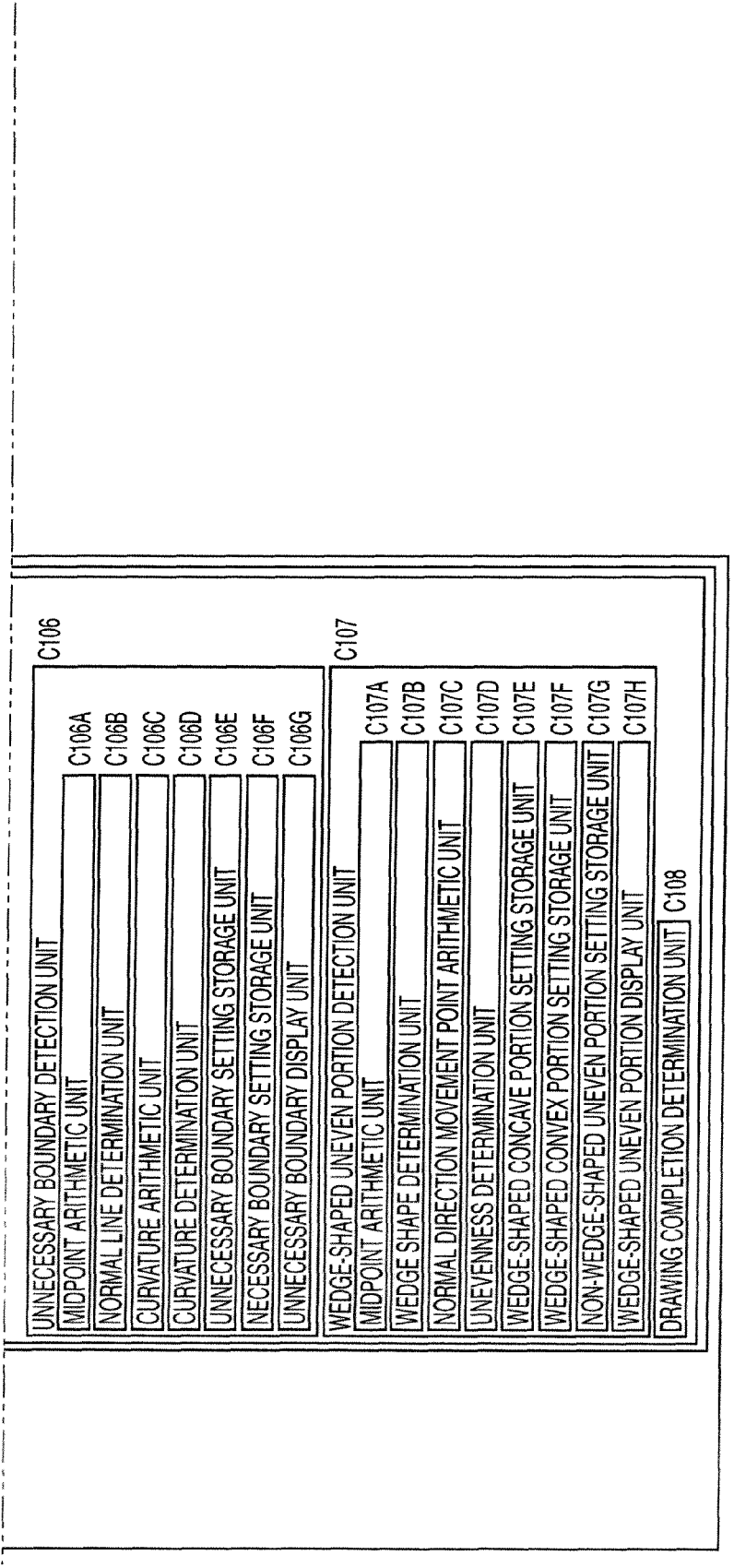

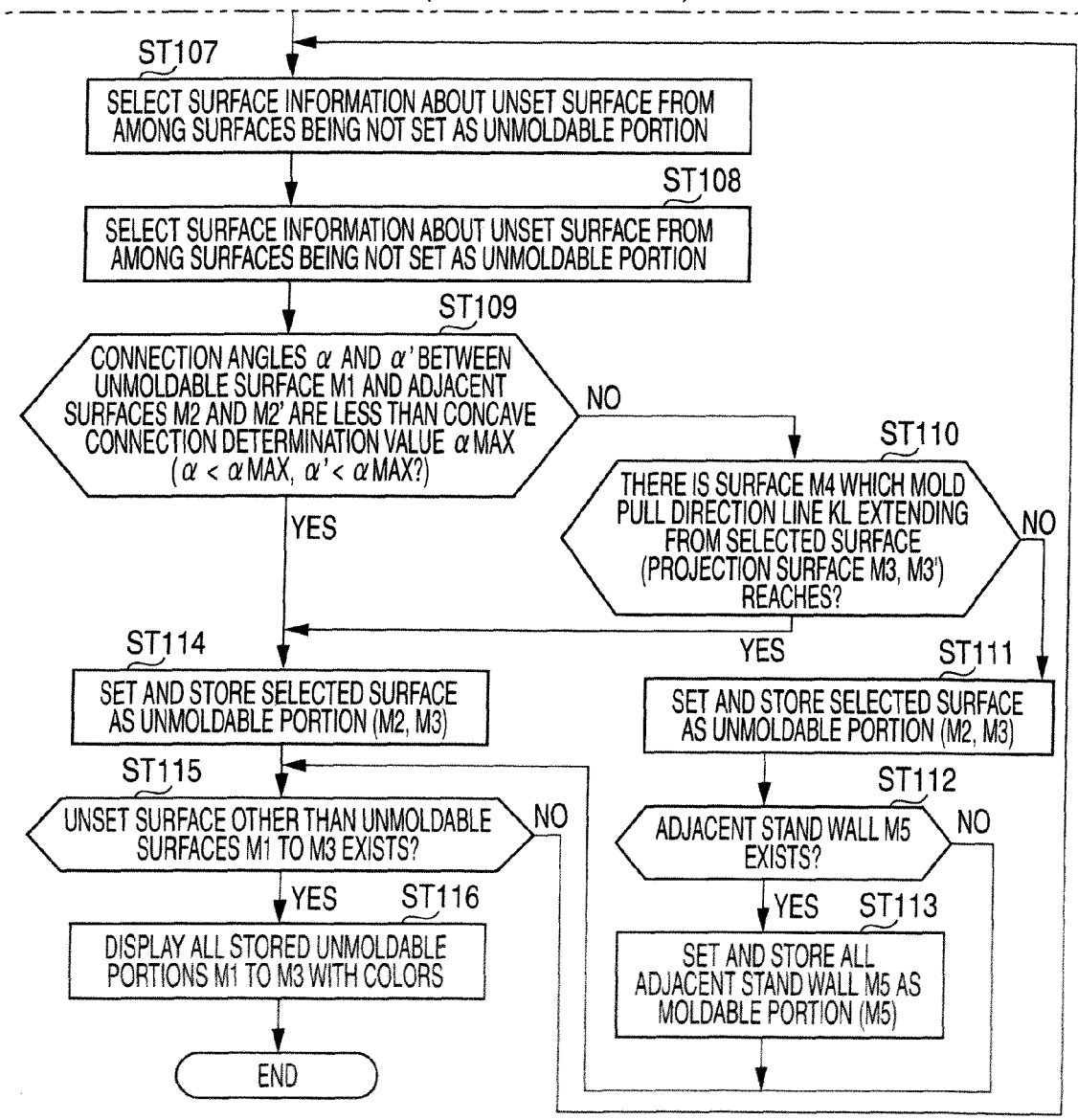
(FIG. 17 Continued)

(FIG. 19 Continued-1)

| | |
|---|---|
| FIRST ADJACENT UNMOLDABLE PORTION DETERMINATION UNIT | C105B |
| FIRST ADJACENT SURFACE DETERMINATION UNIT | C105B1 |
| FIRST CONNECTION ANGLE ARITHMETIC UNIT | C105B2 |
| FIRST CONCAVE CONNECTION DETERMINATION UNIT | C105B3 |
| FIRST PROJECTION UNMOLDABLE PORTION DETERMINATION UNIT | C105C |
| FIRST PROJECTION LINE REACH DETERMINATION UNIT | C105C1 |
| STAND WALL DETERMINATION UNIT | C105C2 |
| FIRST UNMOLDABLE PORTION SETTING STORAGE UNIT | C105D |
| SECOND UNMOLDABLE PORTION DETERMINATION UNIT | C105A' |
| RULE INTERSECTION ARITHMETIC UNIT | C105A1' |
| SECOND BACKWARD COMPONENT DETERMINATION UNIT | C105A2' |
| ROTATIONAL SURFACE DETERMINATION UNIT | C105A3' |
| SECOND CENTER AXIS PARALLEL DETERMINATION UNIT | C105A4' |
| SECOND SECTIONAL OUTER DIAMETER DETERMINATION UNIT | C105A5' |
| SECOND ADJACENT UNMOLDABLE PORTION DETERMINATION UNIT | C105B' |
| SECOND ADJACENT SURFACE DETERMINATION UNIT | C105B1' |
| SECOND CONNECTION ANGLE ARITHMETIC UNIT | C105B2' |
| SECOND CONCAVE CONNECTION DETERMINATION UNIT | C105B3' |

(CONT.)

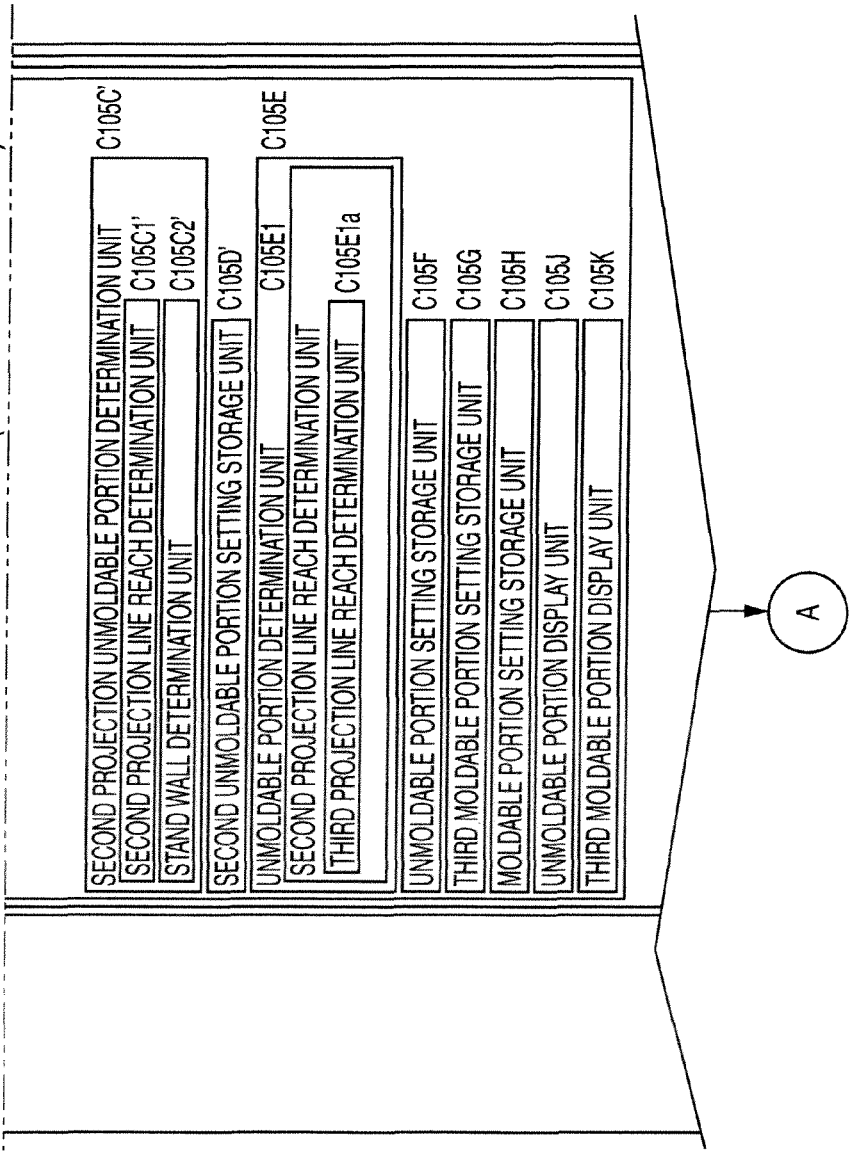

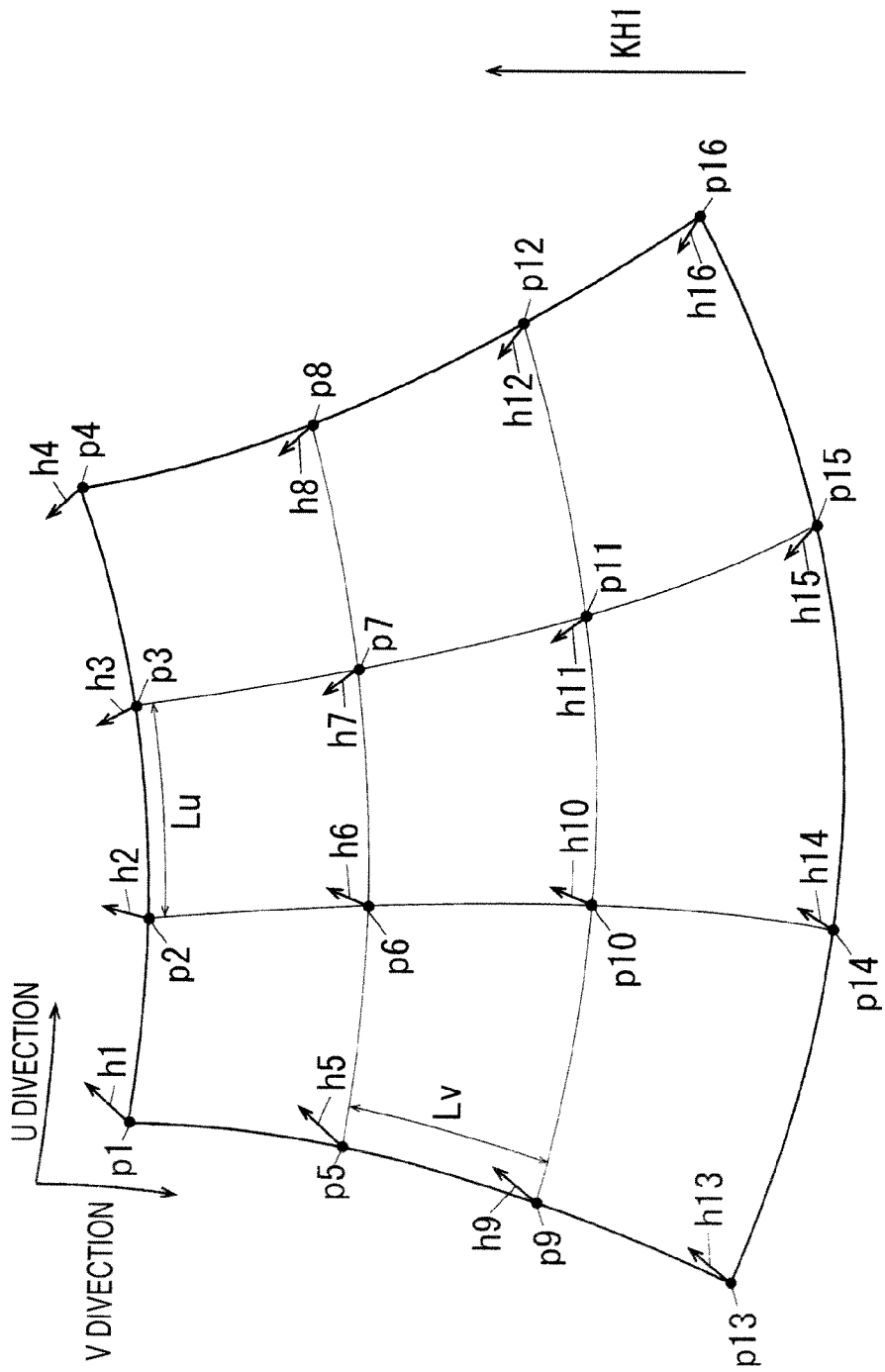

KH1: +Z DIRECTION
KH2: −Z DIRECTION
KH3: ±X DIRECTION, ±Y DIRECTION

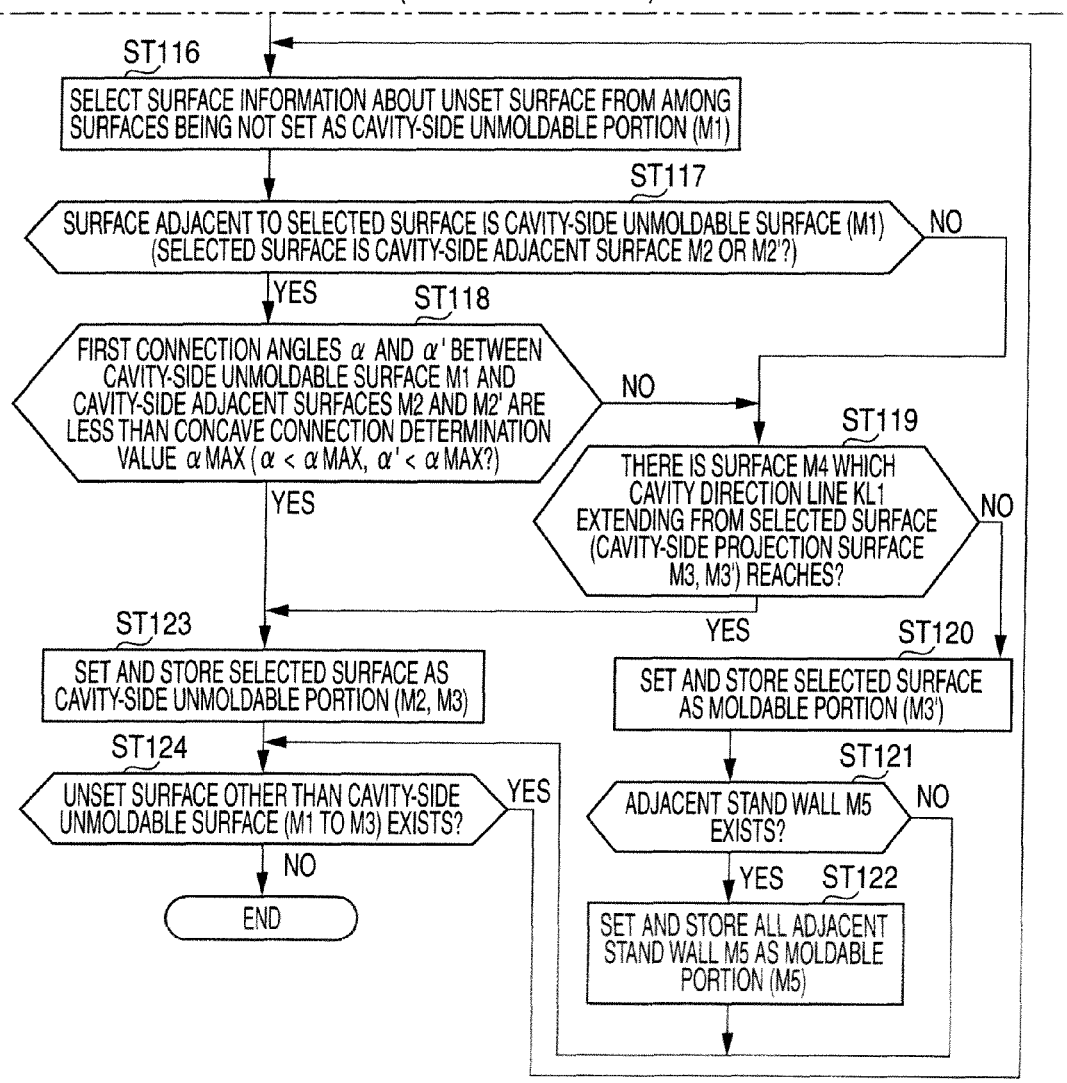

(FIG. 30 Continued-1)

| | |
|---|---|
| FIRST ADJACENT UNMOLDABLE PORTION DETERMINATION UNIT | C105B |
|   FIRST ADJACENT SURFACE DETERMINATION UNIT | C105B1 |
|   FIRST CONNECTION ANGLE ARITHMETIC UNIT | C105B2 |
|   FIRST CONCAVE CONNECTION DETERMINATION UNIT | C105B3 |
| FIRST PROJECTION UNMOLDABLE PORTION DETERMINATION UNIT | C105C |
|   FIRST PROJECTION LINE REACH DETERMINATION UNIT | C105C1 |
|   STAND WALL DETERMINATION UNIT | C105C2 |
| FIRST UNMOLDABLE PORTION SETTING STORAGE UNIT | C105D |
| SECOND UNMOLDABLE PORTION DETERMINATION UNIT | C105A' |
|   RULE INTERSECTION ARITHMETIC UNIT | C105A1' |
|   SECOND BACKWARD COMPONENT DETERMINATION UNIT | C105A2' |
|   ROTATIONAL SURFACE DETERMINATION UNIT | C105A3' |
|   SECOND CENTER AXIS PARALLEL DETERMINATION UNIT | C105A4' |
|   SECOND SECTIONAL OUTER DIAMETER DETERMINATION UNIT | C105A5' |
| SECOND ADJACENT UNMOLDABLE PORTION DETERMINATION UNIT | C105B' |
|   SECOND ADJACENT SURFACE DETERMINATION UNIT | C105B1' |
|   SECOND CONNECTION ANGLE ARITHMETIC UNIT | C105B2' |
|   SECOND CONCAVE CONNECTION DETERMINATION UNIT | C105B3' |

(CONT.)

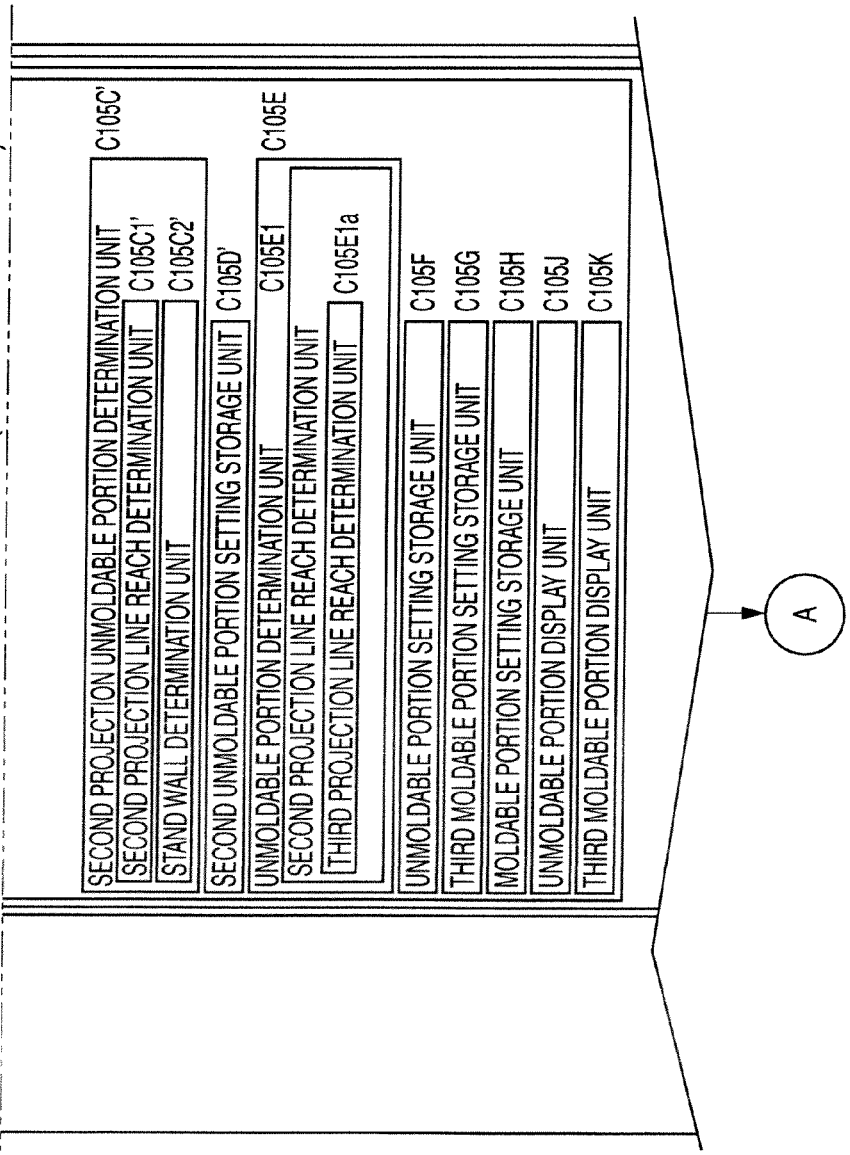
(FIG. 30 Continued-2)

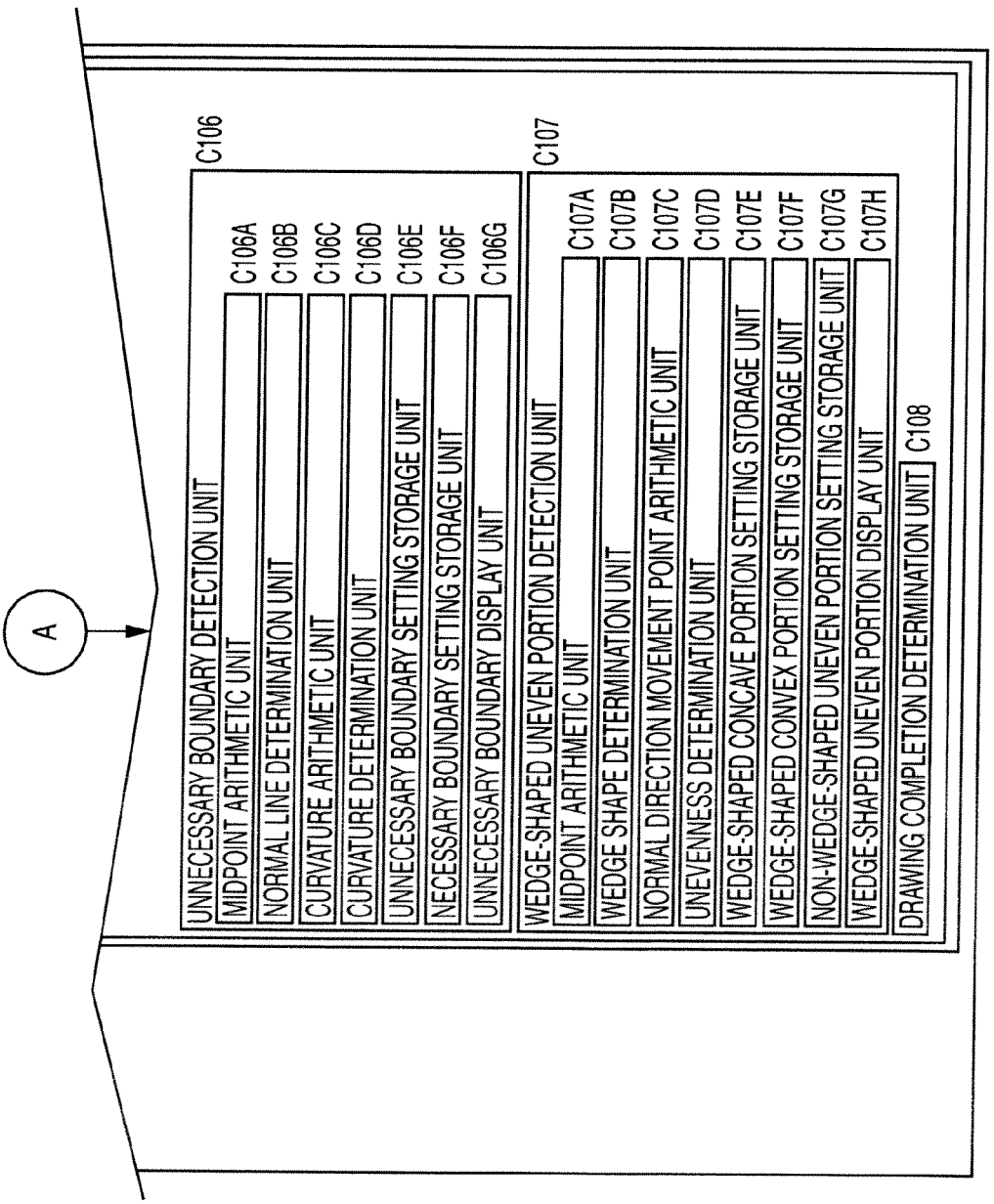

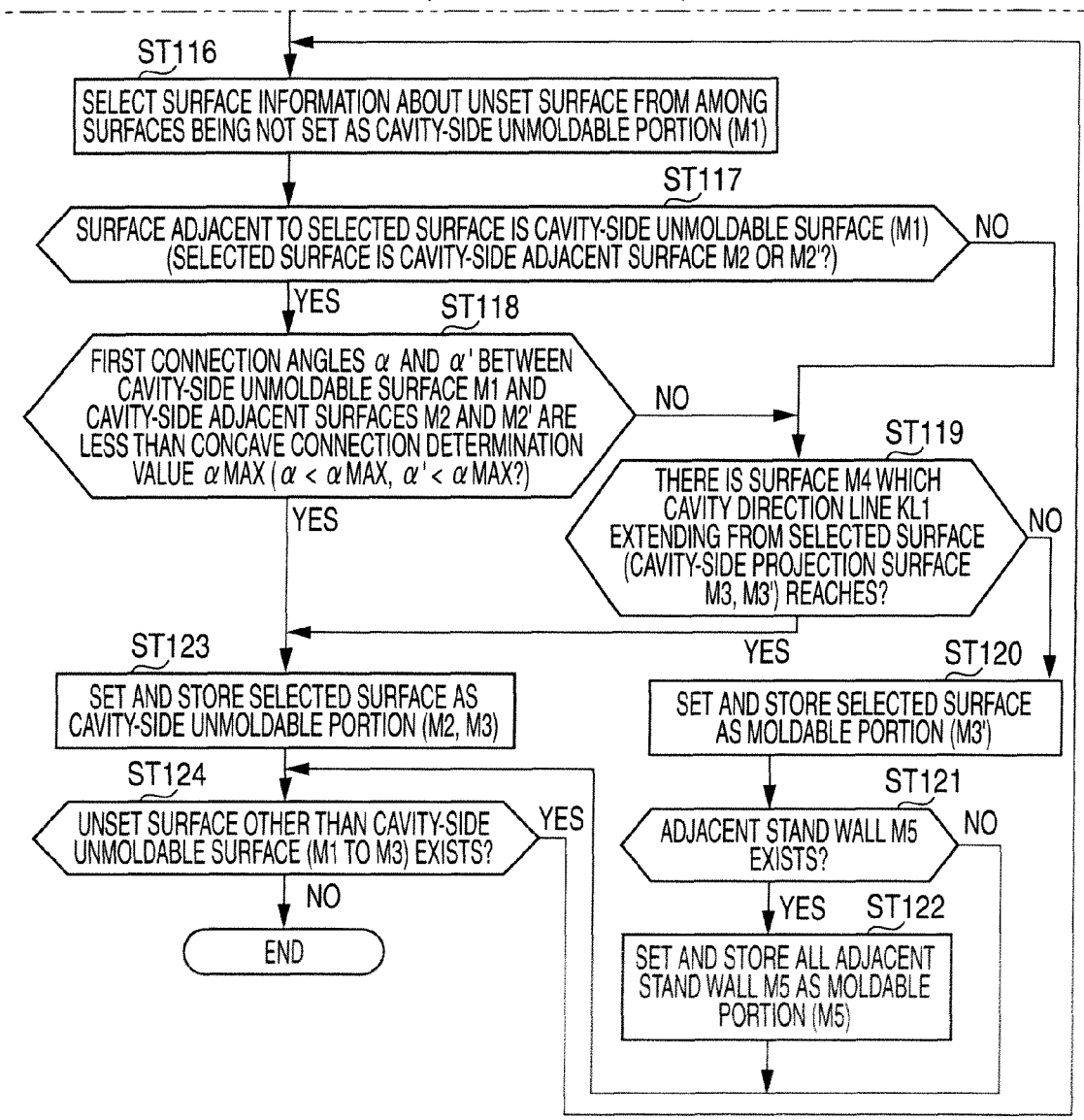

UNMOLDABLE PORTION DETECTION SYSTEM, COMPUTER READABLE MEDIUM, AND UNMOLDABLE PORTION DETECTION METHOD

CROSS-REFERENCE TO RELATED APPLICATIONS

This application is based on and claims priority under 35 U.S.C. 119 from Japanese Patent Application No. 2007-296120 filed Nov. 14, 2007, and Japanese Patent Application No. 2008-120638 filed May 2, 2008.

BACKGROUND

1. Technical Field

The present invention relates to an unmoldable portion detection system, an unmoldable portion detection program, and an unmoldable portion detection method.

2. Related Art

The parts constituting a product, such as a mechanical product, are individually drawn. In order to perform drawing, in general, a computer serving as an electronic calculator is used, and a design support system, such as a 3D-CAD (3-Dimension Computer Aided Design) system, is used. For mass production of the drawn parts, a mold having a shape corresponding to each part is formed. In order to increase productivity, when the mold is designed, presence/absence of an unmoldable portion, that is, undercut, which is unmoldable only by movement of the mold in one direction due to a concave portion in each part, is taken into consideration.

In general, since an engineer confirms presence/absence of the undercut, advanced and specialized knowledge about mold design is required, and it takes a lot of time for the engineer to confirm presence/absence of the undercut. In order to solve such a problem, studies and development on automatic detection of the undercut in the 3D-CAD field are actively in progress.

Patent Document 1 hereinafter refers to JP-A-2006-139791. Patent Document 2 hereinafter refers to JP-A-2005-329589.

SUMMARY

A first object of the invention is to automatically determine presence/absence of an unmoldable portion.

A second object of the invention is to automatically determine presence/absence of an unmoldable portion with good accuracy, and thus it is possible to make it easy to design a molded product or a mold having no unmoldable portion without having proficient knowledge.

According to an aspect of the present invention, an unmoldable portion detection system includes: a normal line arithmetic unit that calculates a normal line extending from a point on each of surfaces constituting a three-dimensional shape of a molded product to outside of the molded product; a backward component determination unit that determines whether or not an extending direction of the normal line has a backward component, which is a directional component opposite to a prescribed mold pull direction of a mold of the molded product, in accordance with a surface, on which the normal line is calculated; and an unmoldable portion determination unit that determines a surface having a point, at which the extending direction of the normal line having the backward component is calculated, as an unmoldable portion to be unmoldable only by movement of the mold in one direction, wherein the system further comprises one of the following (A) units and (B) units: (A) a concave connection determination unit that, in a case where the surface which is determined as the unmoldable portion is an unmoldable surface, and a surface which is adjacent to the unmoldable surface and determined as not the unmoldable surface is an adjacent surface, determines whether or not the unmoldable surface and the adjacent surface are concavely connected to each other with respect to a boundary between the unmoldable surface and the adjacent surface; and an adjacent unmoldable portion determination unit that, in a case where it is determined that the unmoldable surface and the adjacent surface are concavely connected to each other, determines the adjacent surface as the unmoldable portion, and (B) a projection line reach determination unit that, in a case where the surface which is determined as not the unmoldable portion is a projection surface, determines whether or not there is another surface which a mold pull direction line extending from the projection surface in the mold pull direction reaches; and a projection unmoldable portion determination unit that, in a case where there is another surface which the mold pull direction line extending from the projection surface reaches, determines the projection surface as the unmoldable portion.

BRIEF DESCRIPTION OF THE DRAWINGS

Exemplary embodiment of the present invention will be described in detail based on the following figures, wherein:

FIG. 4 is an explanatory view of a molded surface image of the first exemplary embodiment;

FIG. 5A is an explanatory view showing a state where an unmoldable surface and an adjacent surface are concavely connected to each other, and FIG. 5B is an explanatory view showing a state where an unmoldable surface and an adjacent surface are convexly connected to each other;

FIG. 6A is a sectional view showing a state where there is another surface which a normal vector reaches, and FIG. 6B is a sectional view showing a state where there is no surface which a normal vector reaches;

FIG. 7A is an explanatory view illustrating a case where a first normal vector and a second normal vector are of the same direction, and FIG. 7B is an explanatory view illustrating a case where a first normal vector and a second normal vector are of different directions;

FIG. 8A is an explanatory view showing a case where the u1 direction curvature and the v1 direction curvature are the same as the u2 direction curvature and the v2 direction curvature and FIG. 8B is an explanatory view showing a case where the u1 direction curvature and the v1 direction curvature are different from the u2 direction curvature and the v2 direction curvature, FIG. 9A is a sectional view of a wedge-shaped concave portion, and FIG. 9B is a section view of a wedge-shaped convex portion;

FIG. 12 is a flowchart of an unnecessary boundary detection processing and is an explanatory view of a subroutine of ST7 in FIG. 10;

FIG. 13 is a flowchart of a wedge-shaped uneven portion detection processing and is an explanatory view of a subroutine of ST9 in FIG. 10;

FIGS. 14A to 14C are explanatory views of the operations of the first exemplary embodiment and enlarged explanatory views showing an example of an unmoldable portion to be detected by the unmoldable portion detection processing, FIG. 14A is an explanatory view showing an example of each portion of a molded product to be detected as an unmoldable surface and an adjacent surface, FIG. 14B is an enlarged explanatory view of a boss when viewed from a direction of an arrow XIVB of FIG. 14A, and FIG. 14C is an explanatory view showing an example of each portion of a molded product to be detected as a projection surface and an example of each portion of a molded product to be not detected as a projection surface;

FIG. 17 is an explanatory view of a subroutine of ST5 shown in FIG. 10 and corresponds to FIG. 11 in the first exemplary embodiment;

FIG. 18A is a sectional view of a truncated conical surface which is an example of an unmoldable surface, FIG. 18B is a sectional view of a cylindrical surface which is an example of an unmoldable surface, and FIG. 18C is a sectional view of a B curved surface which is an example of an unmoldable surface;

FIG. 21 is a partially enlarged explanatory view showing the relationship between a normal vector and a cavity direction at an intersection of grid lines in u and v directions on a surface of a molded product;

FIG. 22A is a sectional view showing a state where there is a surface which a cavity direction line reaches, and FIG. 22B is a sectional view showing a state where there is no surface which a cavity direction line reaches;

FIG. 23A is a perspective explanatory view of a model of a molded product in which a cavity direction and a core direction are set to be in the up and down directions, and FIG. 23B is an explanatory view showing when FIG. 23A is viewed from a VIIIB direction, which is a cavity direction;

FIG. 28A is an explanatory view showing an example of individual portions of a molded product to be detected as a cavity-side unmoldable surface and a cavity-side adjacent surface, FIG. 28B is an enlarged explanatory view of a boss when viewed from a direction of an arrow XVIIIB of FIG. 28A, and FIG. 28C is an explanatory view showing an example of each portion of a molded product to be detected as a cavity-side projection surface and an example of each portion of a molded product to be detected as a cavity-side projection surface;

FIG. 31 is a functional block diagram which is continued to FIG. 30, and corresponds to FIG. 20 in the third exemplary embodiment;

FIG. 33 is an explanatory view of a subroutine of ST5 shown in FIG. 25 and corresponds to FIG. 26 in the third exemplary embodiment; FIG. 34A is a sectional view of a truncated conical surface which is an example of an unmoldable surface, FIG. 34B is a sectional view of a cylindrical surface which is an example of an unmoldable surface, FIG. 34C is a sectional view of a B curved surface which is an example of an unmoldable surface.

DETAILED DESCRIPTION

Specific examples (embodiments) of the invention will now be described with reference to the drawings. However, the invention is not limited to the following embodiments.

In the descriptions with reference to the drawings, for ease of understanding, parts other than necessary configuration or members are appropriately omitted.

First Embodiment

Figure 1:
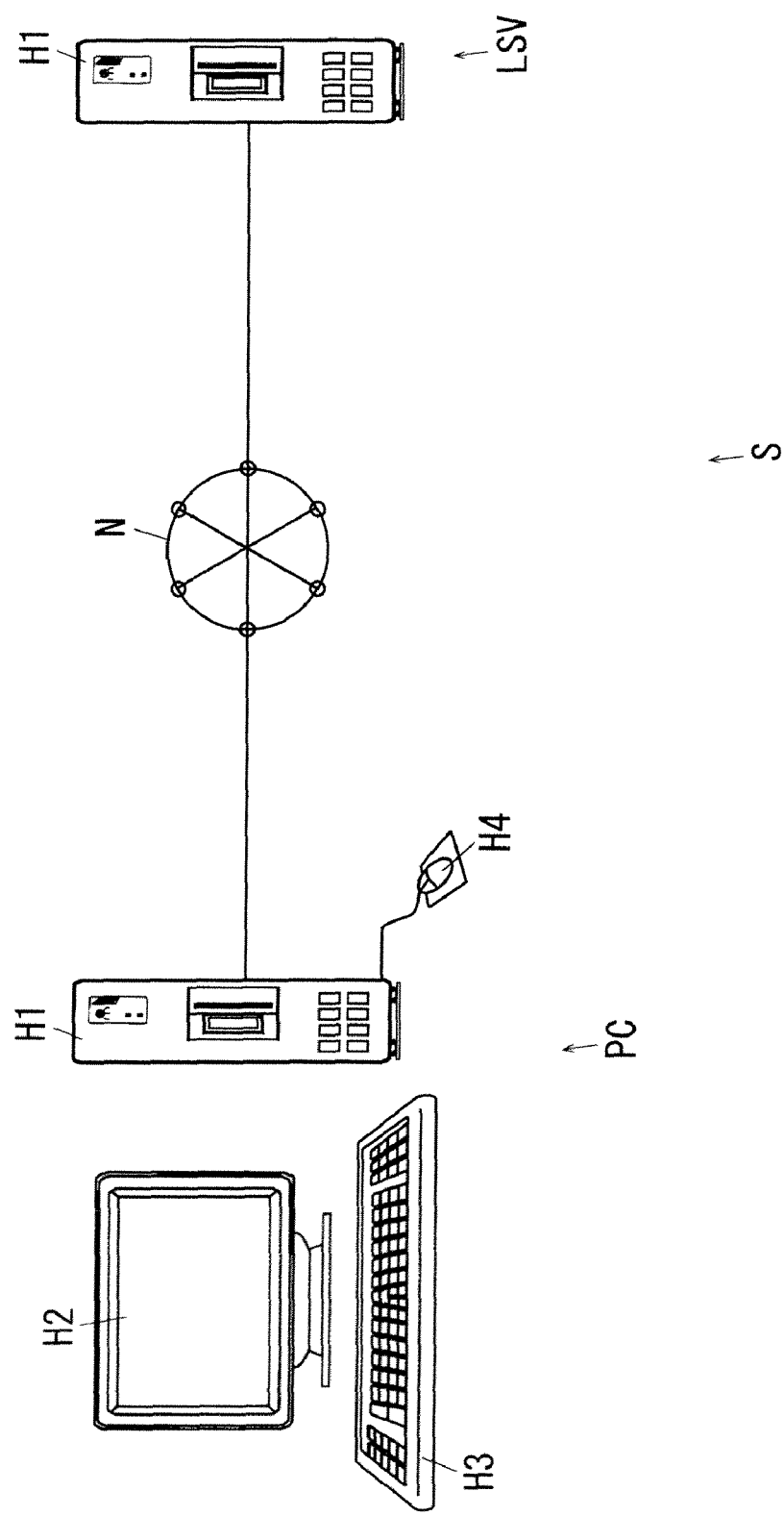
FIG. 1 is an overall explanatory view of a design support system according to a first exemplary embodiment of the invention.

FIG. 1 is an overall explanatory view of a design support system according to a first embodiment of the invention.

Referring to FIG. 1, a design support system S including a function of an unmoldable portion detection system according to the first embodiment has a client personal computer PC, which is an example of a design support apparatus including a function of an unmoldable portion detection apparatus for drawing each of molded products constituting a product, such as a mechanical product. The client personal computer PC is connected to a license server LSV, which is an example of a design support licensing apparatus for giving a license of the design support system S to the authorized client personal computer PC through a network N, which is an example of an information communication line. The network N of the first embodiment is formed by an Internet communication line. The client personal computer PC and the license server LSV of the first embodiment are formed by a computer apparatus, which is an example of an electronic calculator.

The client personal computer PC of the first embodiment includes a computer main body H1, which is an example of a calculator main body, a display H2, which is an example of an output display device, a keyboard H3 and a mouse H4, which are examples of input devices, an HD drive (Hard Disc Drive) (not shown), which is an example of a storage device, and a CD drive (Compact Disc Drive), which is an example of a storage medium reading device. Similarly to the client personal computer PC, the license server LSV of the first embodiment includes a computer main body H1, a hard disc drive, a CD drive, and the like.

Description of Controller of First Embodiment

Figure 2:
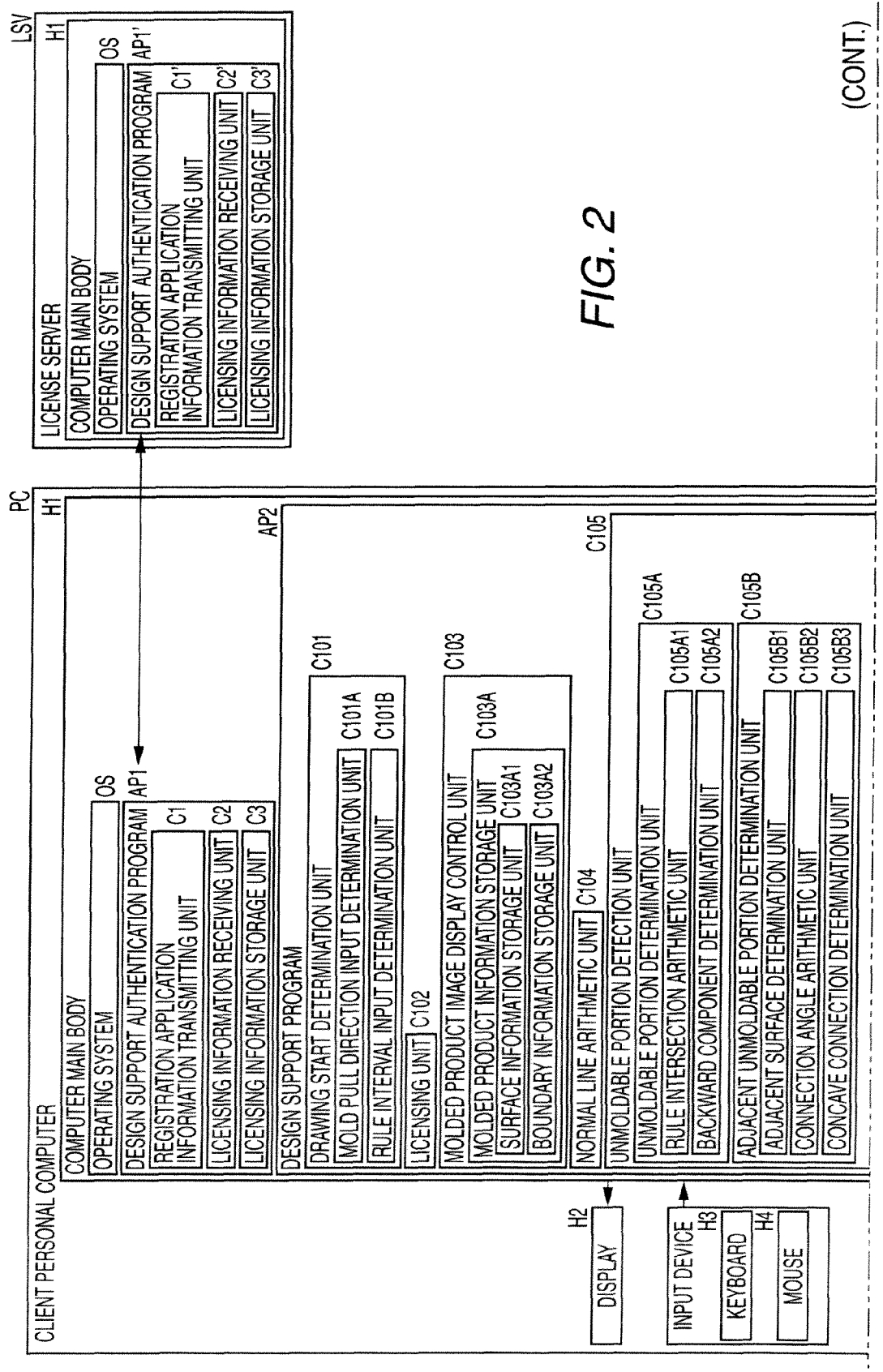
FIG. 2 is a functional block diagram showing the functions of controllers in a client personal computer and a license server of the first exemplary embodiment.

FIG. 2 is a functional block diagram showing the functions of controllers in a client personal computer and a license server of the first embodiment.
(Description of Controller in Client Personal Computer PC)

Referring to FIG. 2, the computer main body H1 of the client personal computer PC has an I/O (Input/Output Interface) that performs input/output of signals to/from the outside and adjusts the levels of the input/output signals, a ROM (Read Only Memory) that stores programs and data for necessary processing, a RAM (Random Access Memory) that temporarily stores necessary data, a CPU (Central Processing Unit) that performs processing in accordance with the programs stored in a hard disc, and a clock oscillator.

Such a client personal computer PC may implement various functions by executing the programs stored in the hard disc or the ROM.

The hard disc of the client personal computer PC stores application programs, such as an operating system OS, which is basic software for controlling the basic operations of the computer apparatus, a design support authentication program AP1 that acquires license information of the design support system S from the license server LSV, a design support program AP2 that includes a function of an unmoldable portion detection program for drawing each molded product, word processor software for document creation (not shown), and software for electronic mail transmission and reception. Hereinafter, the functions (control unit) of the programs AP1 and AP2, excluding the known operating system OS and application programs (not shown), will be described.
(Design Support Authentication Program AP1)

The design support authentication program AP1 has a registration application information transmitting unit C1 that transmits registration application information, which is information about application for registration to the design support system design support system S, a licensing information receiving unit C2 that receives licensing information, which is information about a license of the design support system S, and a licensing information storage unit C3 that stores the licensing information. The client personal computer PC of the first embodiment transmits/receives information to/from the license server LSV and acquires the licensing information on the basis of the registration application information, thereby obtaining the license of the design support system S.
(Design Support Program AP2)

Figure 3:
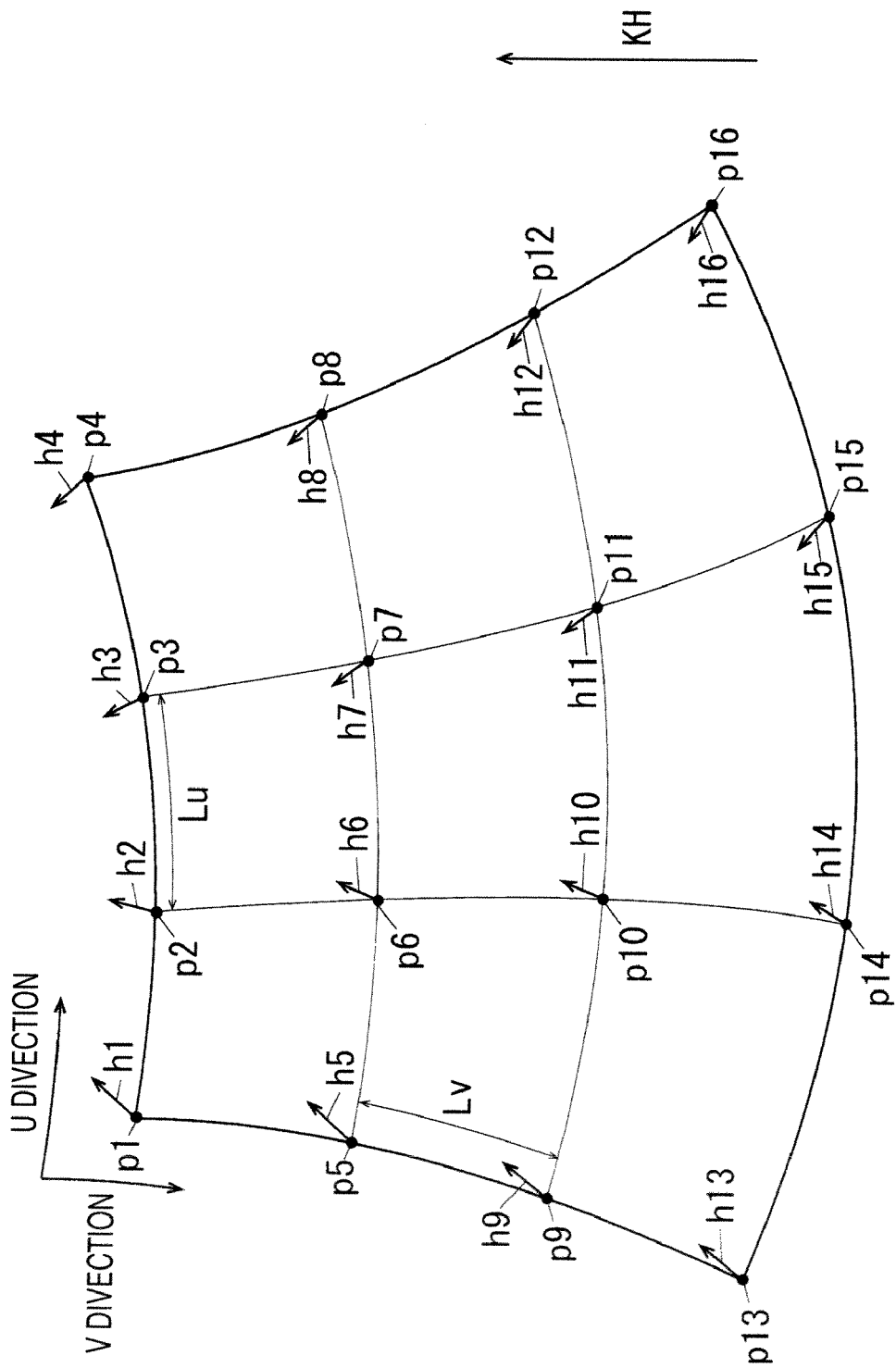
FIG. 3 is a partially enlarged explanatory view showing the relationship between a normal vector and a mold pull direction at an intersection of grid lines in u and v directions on a surface of a molded product.

FIG. 3 is a partially enlarged explanatory view showing the relationship between a normal vector and a mold pull direction at an intersection of grid lines in u and v directions on a surface of a molded product.

In the present specification, a term "normal vector" means an extending direction of a normal line from a point on each of surfaces constituting a three-dimensional shape of a molded product to outside of the molded product.
C101: Drawing Start Determination Unit The drawing start determination unit C101 has a mold pull direction input determination unit C101A and a rule interval input determination unit C101B, and determines whether or not the design support system S starts to draw a molded product.
C101A: Mold Pull Direction Input Determination Unit The mold pull direction input determination unit C101A determines whether or not a mold pull direction KH of a mold of the molded product shown in FIG. 3 is input.
C101B: Rule Interval Input Determination Unit The rule interval input determination unit C101B determines whether or not an interval Lu between the grid lines in the u direction and an interval Lv between the grid lines in the v direction on each surface of the molded product shown in FIG. 3.
C102: Licensing Unit A licensing unit C102 executes a licensing processing to determine on the basis of the licensing information stored in the licensing information storage unit C3 whether or not the client personal computer PC obtains an authorized license of the design support system S.

FIG. 4 is an explanatory view of a molded surface image of the first embodiment.
C103: Molded Product Image Display Control Unit A molded product image display control unit C103 has a molded product information storage unit C103A, and controls display of a molded product image 1 obtained from information about a three-dimensional shape of the molded product shown in FIG. 4. Referring to FIG. 4, in the molded product image 1 of the first embodiment, a developer container of a developing device in an image forming apparatus is displayed as an example of the molded product. The molded product image 1 has an unmoldable portion detection button 2 that is used to execute an unmoldable portion detection processing for detecting an unmoldable portion (M1 to M3), called an undercut, to be unmoldable only by movement in one direction of a mold of the molded product shown in FIGS. 5, 6A and 6B, an unnecessary boundary detection button 3 that is used to execute an unnecessary boundary detection processing for detecting an unnecessary boundary L1, that is, an unnecessary boundary dividing two surfaces FM1 and FM2, which should be the same surface, among boundaries L dividing surfaces of the molded product shown in FIG. 8A, and a wedge-shaped uneven portion detection button 4 that is used to execute a wedge-shaped uneven portion detection processing for detecting a wedge-shaped concave portion E1, called a mold edge, and a wedge-shaped convex portion E2, called a product edge, which are individually formed by connecting a first surface FM1 and a second surface FM2 at predetermined angles β and β', from among concave portions and convex portions formed by the boundary L and the first surface FM1 and the second surface FM2 connected to each other by the boundary L shown in FIGS. 9A and 9B.

C103A: Molded Product Information Storage Unit

A molded product information storage unit C103A has a surface information storage unit C103A1 that stores surface information about each surface of the molded product, and a boundary information storage unit C103A2 that stores boundary information, such as the coordinates of both ends of each boundary of the molded product. The molded product information storage unit C103A stores molded product information about the molded product including the surface information and the boundary information.

C104: Normal Line Arithmetic Unit

A normal line arithmetic unit C104 calculates a normal vector (h1 to h16, HV1, and HV2) serving as an example of a normal line at a normal line calculation point (p1 to p17 and P) set on the surface, at which the normal line is calculated. In the first embodiment, as the normal line calculation point (p1 to p17 and P), grid intersections p1 to p16 on each surface shown in FIG. 3 and a midpoint P of each boundary shown in FIGS. 7A to 9B are used.

C105: Unmoldable Portion Detection Unit

An unmoldable portion detection unit C 105 has an unmoldable portion determination unit C105A, an adjacent unmoldable portion determination unit C105B3 a projection unmoldable portion determination unit C105C, an unmoldable portion setting storage unit C105D, a moldable portion setting storage unit C105E, and an unmoldable portion display unit C105F. When the unmoldable portion detection button 2 is selected the unmoldable portion detection unit C105 executes the unmoldable portion detection processing for detecting the unmoldable portion (M1 to M3).

C105A: Unmoldable Portion Determination Unit

The unmoldable portion determination unit C105A has a rule intersection arithmetic unit C105A1 and a backward component determination unit C105A2. The unmoldable portion determination unit C105A determines on the basis of the normal vector (h1 to h16) whether or not each surface is an unmoldable portion (M1).

C105A1: Rule Intersection Arithmetic Unit

As shown in FIG. 3, the rule intersection arithmetic unit C105A1 calculates, on the basis of the interval Lu in the u direction and the interval Lv in the v direction previously input, the grid intersections p1 and p16 on each surface of the grid lines in the u and v directions on each surface and the boundary surrounding each surface.

C105A2: Backward Component Determination Unit

As shown in FIG. 3, the backward component determination unit C105A2 determines whether or not each of the normal vectors h1 to h16 calculated at the grid intersections p1 to p16 has a backward component, which is a directional component opposite to the mold pull direction KH previously input. Accordingly, if any one of the normal vectors h1 to h16 has the backward component, the unmoldable portion determination unit C105A of the first embodiment determines that a corresponding surface is the unmoldable portion (M1).

Figure 5A:
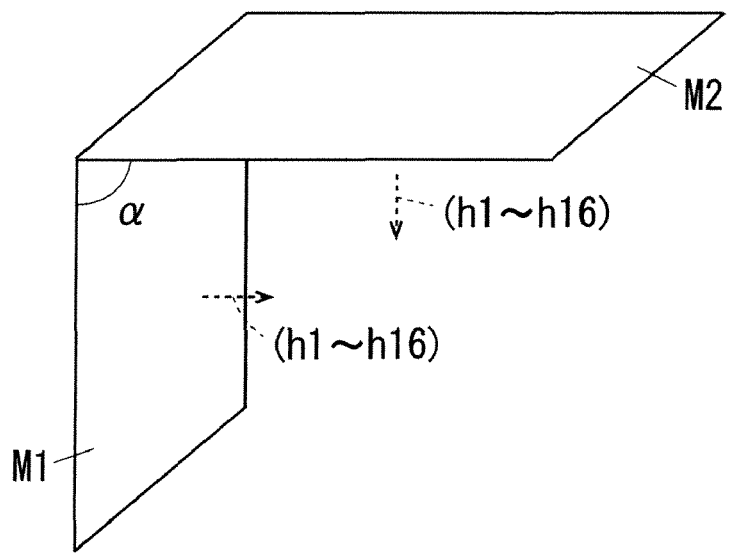
FIGS. 5A and 5B are partially enlarged explanatory views showing the relationship between an unmoldable surface and a concave connection surface of a molded product.
Figure 5B:
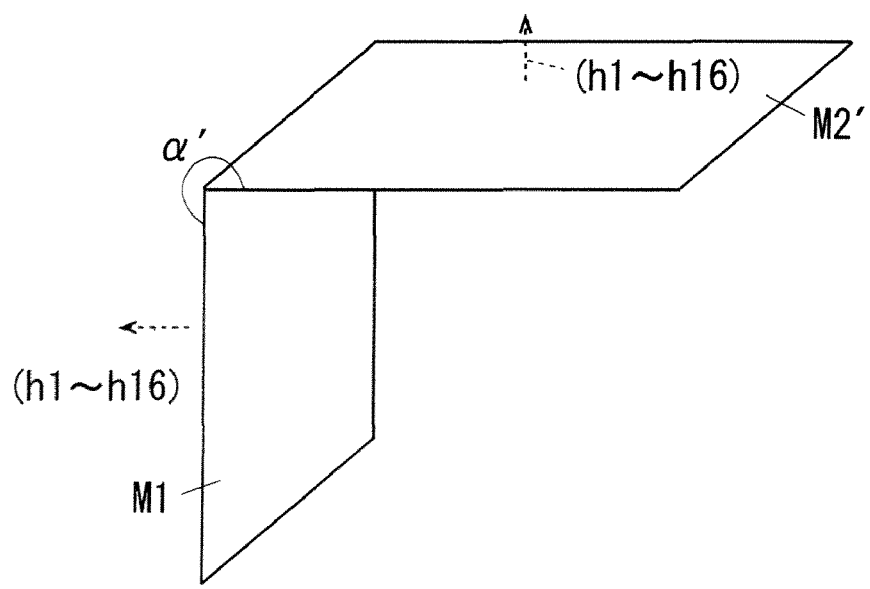

FIGS. 5A and 5B are partially enlarged explanatory views showing the relationship between an unmoldable surface and a concave connection surface of a molded product. FIG. 5A is an explanatory view showing a state where an unmoldable surface and an adjacent surface are concavely connected to each other. FIG. 5B is an explanatory view showing a state where an unmoldable surface and an adjacent surface are convexly connected to each other.

C105B: Adjacent Unmoldable Portion Determination Unit

The adjacent unmoldable portion determination unit C105B has an adjacent surface determination unit C105B1, a connection angle arithmetic unit C105B2, and a concave connection determination unit C105B3. As shown in FIGS. 5A and 5B, it is assumed that the surface which is determined by the unmoldable portion determination unit C105A as the unmoldable portions (M1 to M3) is an unmoldable surface M1, and the surface which is determined as not the unmoldable surface M1 and is adjacent to the unmoldable surface M1 is an adjacent surface M2 or M2'. In this case, the adjacent unmoldable portion determination unit C105B determines that a concave connection surface M2, which is the adjacent surface M2 concavely connected to the unmoldable surface M1, is the unmoldable portion (M2).

C105B1: Adjacent Surface Determination Unit

The adjacent surface determination unit C105B1 determines whether or not each surface which is determined as not the unmoldable surface M1 is the adjacent surface M2 or M2' shown in FIG. 5A or 5B. That is, the adjacent surface determination unit C105B1 determines whether or not a surface adjacent to each surface, which is determined as not the unmoldable surface M1, is the unmoldable portion (M1 to M3).

C105B2: Connection Angle Arithmetic Unit

The connection angle arithmetic unit C105B2 calculates a connection angle α or α' between the adjacent surface M2 or M2' and the unmoldable surface M1 adjacent to the adjacent surface M2 or M2' shown in FIG. 5A or 5B. The connection angle arithmetic unit C105B2 of the first embodiment calculates the connection angle α or α' on the basis of the normal vector (h1 to h16) serving as an example of a first normal line on the unmoldable surface M1 and the normal vector (h1 to h16) serving as an example of a second normal line on the adjacent surface M2 or M2'.

C105B3: Concave Connection Determination Unit

The concave connection determination unit C105B3 determines whether or not the unmoldable surface M1 and the adjacent surface M2 or M2' are concavely connected to each other, that is, the adjacent surface M2 or M2' is the concave connection surface M2. The concave connection determination unit C105B3 of the first embodiment determines whether or not the connection angle α or α' calculated by the connection angle arithmetic unit C105B2 is less than a prescribed concave connection determination value $α_{max}$, thereby determining whether or not the unmoldable surface M1 and the adjacent surface M2 or M2' are concavely connected to each other. In the first embodiment, for example, the concave connection determination value $\alpha_{max}$ may be set to 180° in advance. Therefore, the adjacent unmoldable portion determination unit C105B of the first embodiment determines that the concave connection surface M2 concavely connected to the unmoldable portion (M1 to M3) is the unmoldable portion (M1 and M2).

Figure 6A:
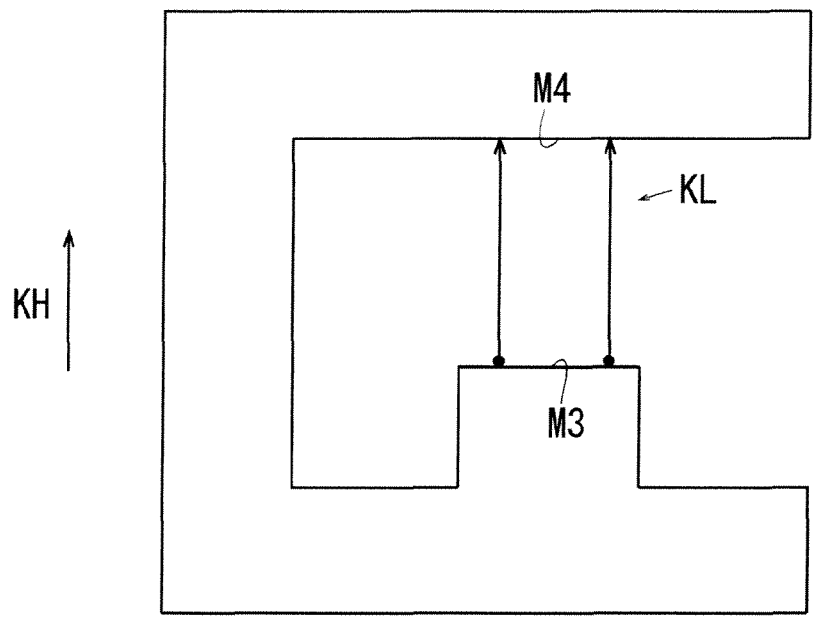
FIGS. 6A and 6B are partially enlarged explanatory view of a mold pull direction line which extends from a projection surface of a molded product.
Figure 6B:
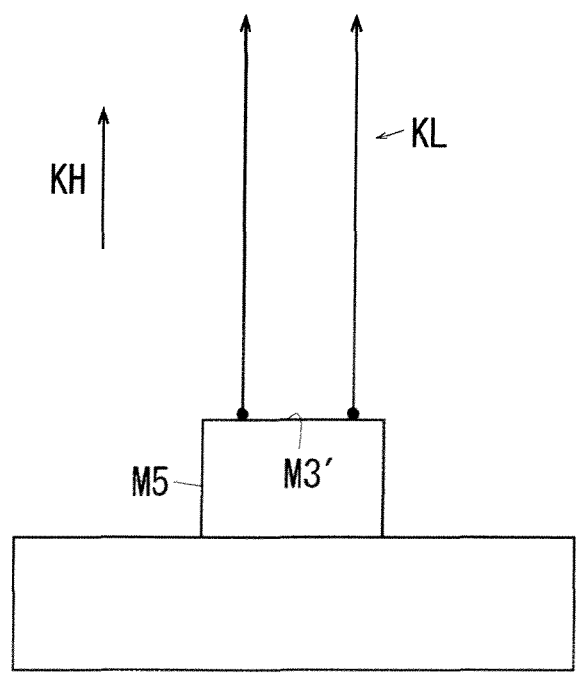

FIGS. 6A and 6B are partially enlarged explanatory view of a mold pull direction line which extends from a projection surface of a molded product. FIG. 6A is a sectional view showing a state where there is another surface which a normal vector reaches. FIG. 6B is a sectional view showing a state where there is no surface which a normal vector reaches.

C105C: Projection Unmoldable Portion Determination Unit

The projection unmoldable portion determination unit C105C has a projection line reach determination unit C105C1 and a stand wall determination unit C105C2. As shown in FIGS. 6A and 6B, when it is assumed that each surface (M2') is a projection surface M3 or M3', the projection unmoldable portion determination unit C105C determines on the basis of a mold pull direction line KL extending from the projection surface M3 or M3' in the mold pull direction KH whether or not the projection surface M3 or M3' is the unmoldable portion (M1 to M3). In regards to each surface (M2') which is not determined as the unmoldable portion (M1, M2) by the unmoldable portion determination unit C105A and the adjacent unmoldable portion determination unit C105B, the projection unmoldable portion determination unit C105C of the first embodiment determines whether or not the projection surface M3 or M3' is the unmoldable portion (M1 to M3).

C105C1: Projection Line Reach Determination Unit

As shown in FIGS. 6A and 6B, the projection line reach determination unit C105C1 determines whether or not there is another surface M4 which the mold pull direction line KL extending from the projection surface M3 or M3' reaches. Therefore, the projection unmoldable portion determination unit C105C of the first embodiment determines that the projection surface M3 having the surface M4 is the unmoldable portions M1 to M3.

C105C2: Stand Wall Determination Unit

The stand wall determination unit C105C2 determines whether or not there is a stand wall M5 shown in FIG. 6B, which is a surface adjacent to the projection surface M3' not having the surface M4 and in parallel to the mold pull direction line KL. Therefore, the projection unmoldable portion determination unit C105C of the first embodiment determines that the projection surface M3' not having the surface M4 and the stand wall M5 are not the unmoldable portions M1 to M3.

C105D: Unmoldable Portion Setting Storage Unit

The unmoldable portion setting storage unit C105D sets and stores the surfaces (M1 to M3), which are determined as the unmoldable portions M1 to M3, as the unmoldable portions M1 to M3, respectively.

C105E: Moldable Portion Setting Storage Unit

The moldable portion setting storage unit C105E sets and stores the surfaces (M3', M5), which are determined as the unmoldable portions M1 to M3, as the moldable portions M3' and M5, which are surfaces being not undercut, respectively.

C105F: Unmoldable Portion Display Unit

The unmoldable portion display unit C105F displays all the unmoldable portions M1 to M3 stored in the unmoldable portion setting storage unit C105D on the molded product image 1 with colors.

C106: Unnecessary Boundary Detection Unit

An unnecessary boundary detection unit C106 has a midpoint arithmetic unit C106A, a normal line determination unit C106B, a curvature arithmetic unit C106C, a curvature determination unit C106D serving as an example of a curved state determination unit, an unnecessary boundary setting storage unit C106E, a necessary boundary setting storage unit C106F, and an unnecessary boundary display unit C106G. When the unnecessary boundary detection button 3 is selected, the unnecessary boundary detection unit C106 executes the unnecessary boundary detection processing for detecting the unnecessary boundary (L1).

Figure 7A:
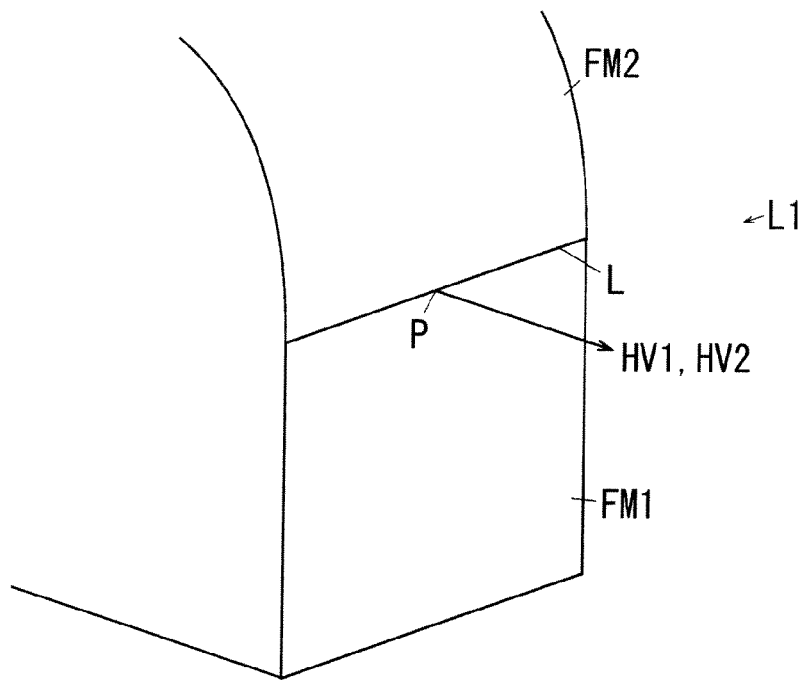
FIGS. 7A and 7B are partially enlarged explanatory views showing the relationship between a first normal vector of a first surface and a second normal vector of a second surface at a midpoint of a boundary of a molded product.
Figure 7B:
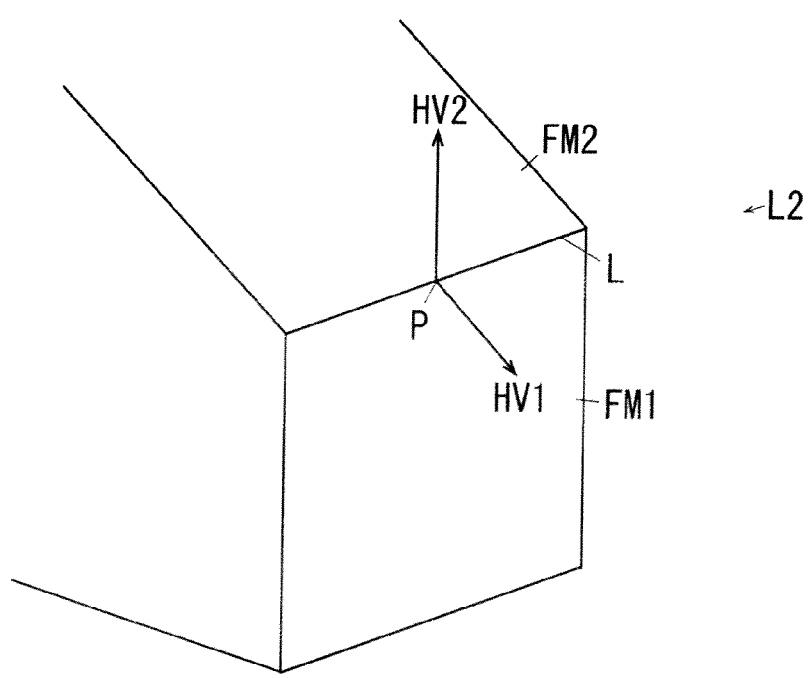

FIGS. 7A and 7B are partially enlarged explanatory views showing the relationship between a first normal vector of a first surface and a second normal vector of a second surface at a midpoint of a boundary of a molded product. FIG. 7A is an explanatory view illustrating a case where a first normal vector and a second normal vector are of the same direction. FIG. 7B is an explanatory view illustrating a case where a first normal vector and a second normal vector are of different directions.

C106A: Midpoint Arithmetic Unit

The midpoint arithmetic unit C106A calculates a midpoint P on the basis of the coordinates of both ends of each boundary L shown in FIGS. 7A and 7B.

C106B: Normal Line Determination Unit

As shown in FIG. 7A, if it is assumed that two surfaces, which are connected to each other by the boundary L, are a first surface FM1 and a second surface FM2, a normal vector of the first surface FM1 is a first normal vector HV1, and a normal vector of the second surface FM2 is a second normal vector HV1, the normal line determination unit C106B determines whether or not the first normal vector HV1 and the second normal vector HV2 are of the same direction at the midpoint P calculated by the normal line arithmetic unit C104.

Figure 8A:
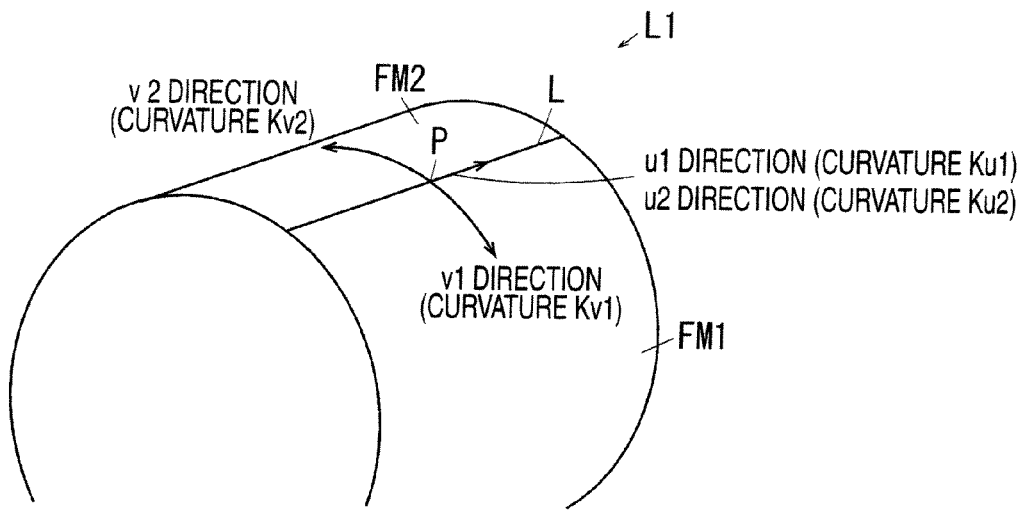
FIGS. 8A and 8B are partially enlarged explanatory views showing the relationship between a u1 direction curvature and a v1 direction curvature of a first surface and a u2 direction curvature and a v2 direction curvature of a second surface at a midpoint of a boundary of a molded product.
Figure 8B:
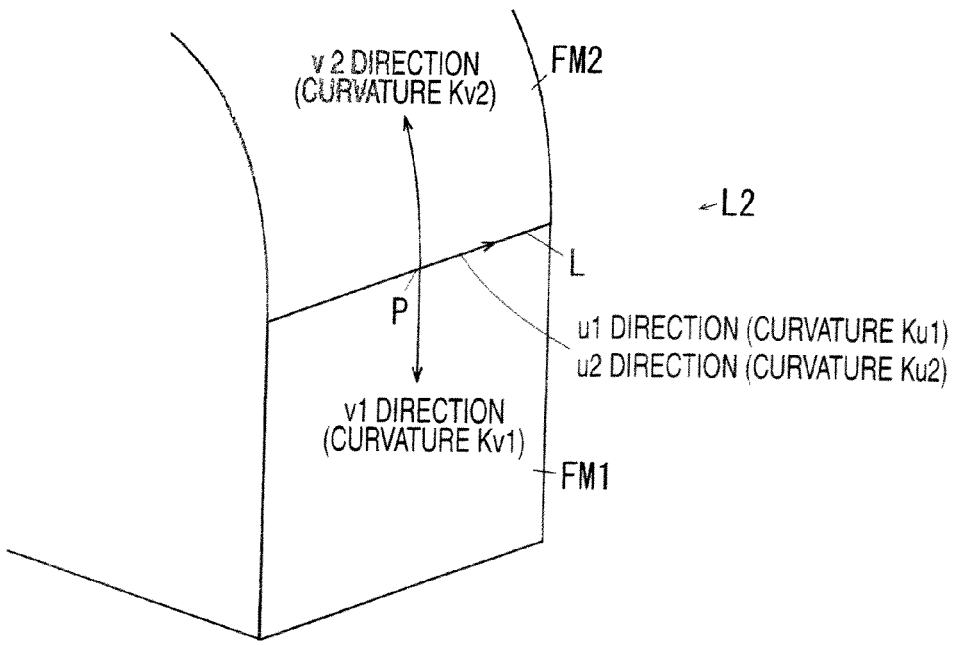

FIGS. 8A and 8B are partially enlarged explanatory views showing the relationship between a u1 direction curvature and a v1 direction curvature of a first surface and a u2 direction curvature and a v2 direction curvature of a second surface at a midpoint of a boundary of a molded product. FIG. 8A is an explanatory view showing a case where the u1 direction curvature and the v1 direction curvature are the same as the u2 direction curvature and the v2 direction curvature. FIG. 8B is an explanatory view showing a case where the u1 direction curvature and the v1 direction curvature are different from the u2 direction curvature and the v2 direction curvature.

C106C: Curvature Arithmetic Unit

The curvature arithmetic unit C106C calculates the curvatures (Ku1, Kv1, Ku2, and Kv2) of the first surface FM1 and the second surface FM2. If the first normal vector HV1 and the second normal vector HV2 are of the same direction, as shown in FIGS. 8A and 8B, the curvature arithmetic unit C106C of the first embodiment calculates, at the midpoint P, a u1 direction curvature Ku1 that is a curvature in a u1 direction, which is an example of a u direction of the grid line on the first surface FM1, a v1 direction curvature Kv1 that is a curvature in a v1 direction, which is an example of a v direction of the grid line a u2 direction curvature Ku2 that is a curvature in a u2 direction, which is an example of a u direction of the grid line on the second surface FM2, and a v2 direction curvature Kv2 that is a curvature in a v2 direction, which is an example of a v direction of the grid line. In the first embodiment, first curvatures Ku1 and Kv1 are defined as the u1 direction curvature Ku1 and the v1 direction curvature Kv1, respectively. Second curvatures Ku2 and Kv2 are defined as the u2 direction curvature Ku2 and the v2 direction curvature Kv2, respectively.

C106D: Curvature Determination Unit

As shown in FIG. 8A, the curvature determination unit C106D determines whether or not the first curvatures Ku1 and Kv1 of the first surface FM1 calculated by the curvature arithmetic unit C106C are the same as the second curvatures Ku2 and Kv2 of the second surface FM2, thereby determining whether or not a first curved state, which is a curved state of the first surface FM1 at the boundary L, is the same as a second curved state, which is a curved state of the second surface FM2 at the boundary L. When the u1 direction curvature Ku1 and the u2 direction curvature Ku2 are the same and the v1 direction curvature Kv1 and the v2 direction curvature Kv2 are the same, or when the u1 direction curvature Ku1 and the v2 direction curvature Kv2 are the same and the u2 direction curvature Ku2 and the v1 direction curvature Kv1 are the same, that is, when the conditions Ku1=Ku2 and Kv1=Kv2 are satisfied, or when the conditions Ku1=Kv2 and Ku2=Kv1 are satisfied, the curvature determination unit C106D of the first embodiment determines that the curvatures Ku1 and Kv1 of the first surface FM1 are the same as the curvatures Ku2 and Kv2 of the second surface FM2. Therefore, if it is determined that the normal vectors HV1 and HV2 are of the same direction, and the first curvatures Ku1 and Kv1 of the first surface FM1 are the same as the second curvatures Ku2 and Kv2 of the second surface FM2, the unnecessary boundary detection unit C106 of the first embodiment determines that the boundary L is the unnecessary boundary L1, which divides the first surface FM1 and the second surface FM2, which should be the same surface.

C106E: Unnecessary Boundary Setting Storage Unit

The unnecessary boundary setting storage unit C106E sets and stores as the unnecessary boundary L1 each boundary L, shown in FIG. 8A which is determined as the unnecessary boundary L1.

C106F: Necessary Boundary Setting Storage Unit

The necessary boundary setting storage unit C106F sets and stores each boundary L, shown in FIGS. 7B and 8B, which is not determined as the unnecessary boundary L1, as a necessary boundary L2, which is a necessary boundary.

C106G: Unnecessary Boundary Display Unit

The unnecessary boundary display unit C106G displays all the unnecessary boundaries L1 stored in the unnecessary boundary setting storage unit C106E with colors on the molded product image 1.

C107: Wedge-Shaped Uneven Portion Detection Unit

A wedge-shaped uneven portion detection unit C107 has a midpoint arithmetic unit C107A, a wedge shape determination unit C107B, a normal direction movement point arithmetic unit C107C, an unevenness determination unit C107D, a wedge-shaped concave portion setting storage unit C107E, a wedge-shaped convex portion setting storage unit C107F, a non-wedge-shaped uneven portion setting storage unit C107G and a wedge-shaped uneven portion display unit C107H. When the wedge-shaped uneven portion detection button 4 is selected, the wedge-shaped uneven portion detection unit C107 executes a wedge-shaped uneven portion detection processing for detecting a wedge-shaped uneven portion (E1+E2) including a wedge-shaped concave portion (E1) or a wedge-shaped convex portion (E2), called a sharp edge.

Figure 9A:
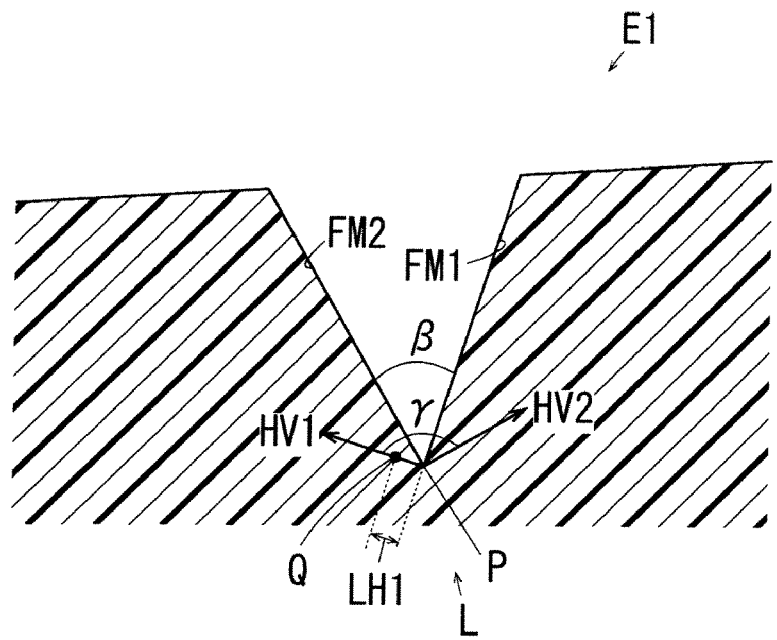
FIGS. 9A and 9B are enlarged sectional explanatory views of a wedge-shaped uneven portion, which is formed in a molded product.
Figure 9B:
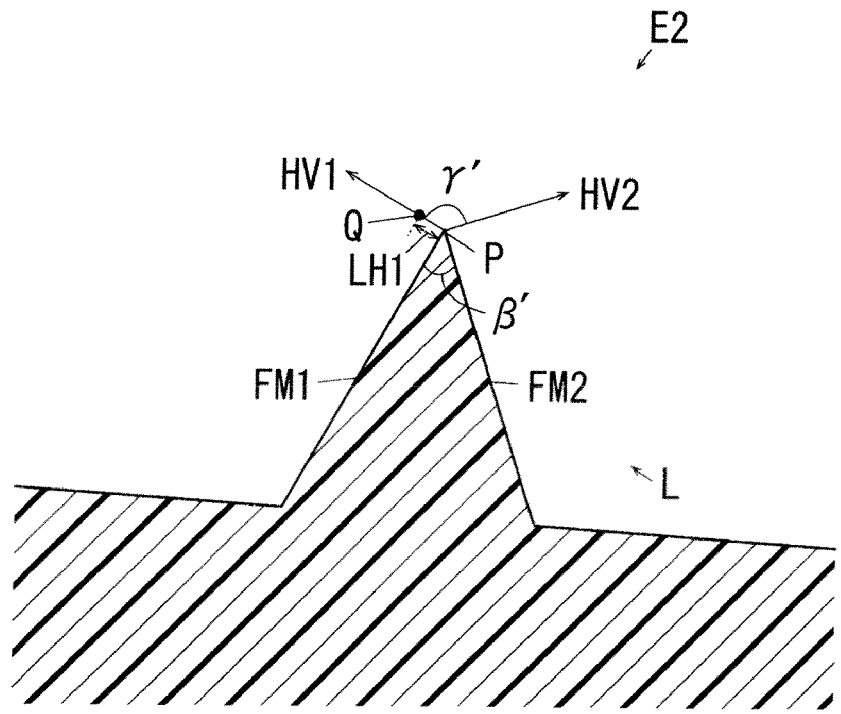

FIGS. 9A and 9B are enlarged sectional explanatory views of a wedge-shaped uneven portion, which is formed in a molded product. FIG. 9A is a sectional view of a wedge-shaped concave portion. FIG. 9B is a section view of a wedge-shaped convex portion.

C107A: Midpoint Arithmetic Unit

Similarly to the midpoint arithmetic unit C106A, the midpoint arithmetic unit C107A calculates a midpoint P on the basis of the coordinates of both ends of each boundary L shown in FIGS. 9A and 9B.

C107B: Wedge Shape Determination Unit

The wedge shape determination unit C107B determines whether or not a connection angle $\beta$ or $\beta'$, which is an angle between the first surface FM1 and the second surface FM2 connected by the boundary L shown in FIGS. 9A and 9B with respect to the boundary L, is less than a wedge shape determination value $\beta_{max}$. Similarly to the first connection angle arithmetic unit C105B2, in the wedge shape determination unit C107B, the connection angle $\beta$ or $\beta'$ is calculated on the basis of an angle $\gamma$ or $\gamma'$ between the first normal vector HV1 of the first surface FM1 and the second normal vector HV2 of the second surface FM2 at the midpoint P. That is, $\beta$=|360°−(90(2)−((=180(−((and ('=(360(−(90((2)−('(=(180(−('(are calculated. In the first embodiment, for example the wedge shape determination value $\beta_{max}$ may be set to 60° in advance.

C107C: Normal Direction Movement Point Arithmetic Unit

The normal direction movement point arithmetic unit C107C calculates a normal direction movement point Q which is moved to a point in a direction of a normal line calculated from the normal line calculation point P. As shown in FIGS. 9A and 9B, the normal direction movement point arithmetic unit C107C calculates the normal direction movement point Q which is moved to a point in a direction of the first normal vector HV1 at the midpoint P. In the first embodiment, a normal direction movement distance LH1, which is a distance between the midpoint P and the normal direction movement point Q, may be set to a value sufficiently smaller than the thickness of each surface of the molded product. For example, the normal direction movement distance LH1 may be set to 0.1 [mm]. Although in the first embodiment, the normal direction movement point Q which is moved in a direction of the first normal vector HV1 at the midpoint P is calculated, the invention is not limited thereto. For example, a normal direction movement point which is moved in a direction of the second normal vector HV2 by the normal direction movement distance LH1 may be calculated.

C107D: Unevenness Determination Unit

The unevenness determination unit C107D determines whether the first surface FM1 and the second surface FM2 are connected to each other concavely or convexly through the boundary L. As shown in FIG. 9A, when the normal direction movement point Q is a point inside the molded product, the unevenness determination unit C107D of the first embodiment determines that the first surface FM1 and the second surface FM2 are concavely connected to each other. As shown in FIG. 9B, when the normal direction movement point Q is a point on a space, the unevenness determination unit C107D determines that the first surface FM1 and the second surface FM2 are convexly connected to each other. Therefore, if it is determined that the connection angle $\beta$ or $\beta'$ is less than the wedge shape determination value $\beta_{max}$, and the first surface FM1 and the second surface FM2 are concavely connected to each other, the wedge-shaped uneven portion detection unit C107 of the first embodiment determines that the wedge-shaped concave portion E1 is formed by the boundary L and the first and second surfaces FM1 and FM2. If it is determined that the connection angle $\beta$ or $\beta'$ is less than the wedge shape determination value $\beta_{max}$, and the first surface FM1 and the second surface FM2 are convexly connected to each other, the wedge-shaped uneven portion detection unit C107 determines that the wedge-shaped convex portion E2 is formed by the boundary L and the first and second surfaces FM1 and FM2.

C107E: Wedge-Shaped Concave Portion Setting Storage Unit

The wedge-shaped concave portion setting storage unit C107E sets and stores as the wedge-shaped concave portion E1 the boundary L and the first and second surfaces FM1 and FM2, shown in FIG. 9A, which are determined as the wedge-shaped concave portion E1.

C107F: Wedge-Shaped Convex Portion Setting Storage Unit

The wedge-shaped convex portion setting storage unit C107F sets and stores as the wedge-shaped convex portion E2 the boundary L and the first and second surfaces FM1 and FM2, shown in FIG. 9B which are determined as the wedge-shaped convex portion E2.

C107G: Non-Wedge-Shaped Uneven Portion Setting Storage Unit

The non-wedge-shaped uneven portion setting storage unit C107G sets and stores the boundary L and the first and second surfaces FM1 and FM2, which are not determined as the wedge-shaped concave portion E1 or the wedge-shaped convex portion E2, as a non-wedge-shaped uneven portion with no wedge-shaped uneven portion E1+E2.

C107H: Wedge-Shaped Uneven Portion Display Unit

The wedge-shaped uneven portion display unit C107H displays all the wedge-shaped concave portions E1 stored in the wedge-shaped concave portion setting storage unit C107E and all the wedge-shaped convex portions E2 stored in the wedge-shaped convex portion setting storage unit C107F with different colors on the molded product image 1.

C108: Drawing Completion Determination Unit

A drawing completion determination unit C108 determines whether or not the design support system S completes drawing of a molded product. The drawing completion determination unit C108 of the first embodiment determines whether or not a user inputs an instruction to end the design support program AP1, thereby determining whether or not the design support system S completes drawing of a molded product.

(Description of Controller of License Server LSV)

Referring to FIG. 2, similarly to the computer main body H1 of the client personal computer PC, the computer main body H1 of the license server LSV has an input/output interface, a ROM, a RAM, a CPU, a clock oscillator, and the like. The computer main body H1 executes programs stored in the hard disc or the ROM, thereby implementing various functions. The hard disc of the license server LSV stores application programs, such as an operating system OS, a design support authentication program AP1 for transmitting licensing information of the design support system S to the client personal computer PC. Hereinafter, the functions (control unit) of the design support authentication program AP1 will be described.

(Design Support Authentication Program AP1)

The design support authentication program AP1 has a registration application information receiving unit C1 that receives the registration application information from the client personal computer PC, a licensing information transmitting unit C2 that transmits the licensing information, and a registration application information storage unit C3 that stores the registration application information. The license server LSV of the first embodiment transmits/receives information with respect to the client personal computer PC, and transfers the licensing information on the basis of the registration application information to thereby permit the use of the design support system S.

Description of Flowchart of First Embodiment

Next, the flow of a processing of the design support program AP2 in the client personal computer PC according to the first embodiment will be described with reference to a flowchart. The processing corresponding to the design support authentication program AP1 in the client personal computer PC and the license server LSV is just as follows: the client personal computer PC transmits the registration application information, and receives and stores the licensing information; and the license server LSV transmits and stores the registration application information, and receives the licensing information. Therefore, detailed description thereof will be omitted.

Figure 10:
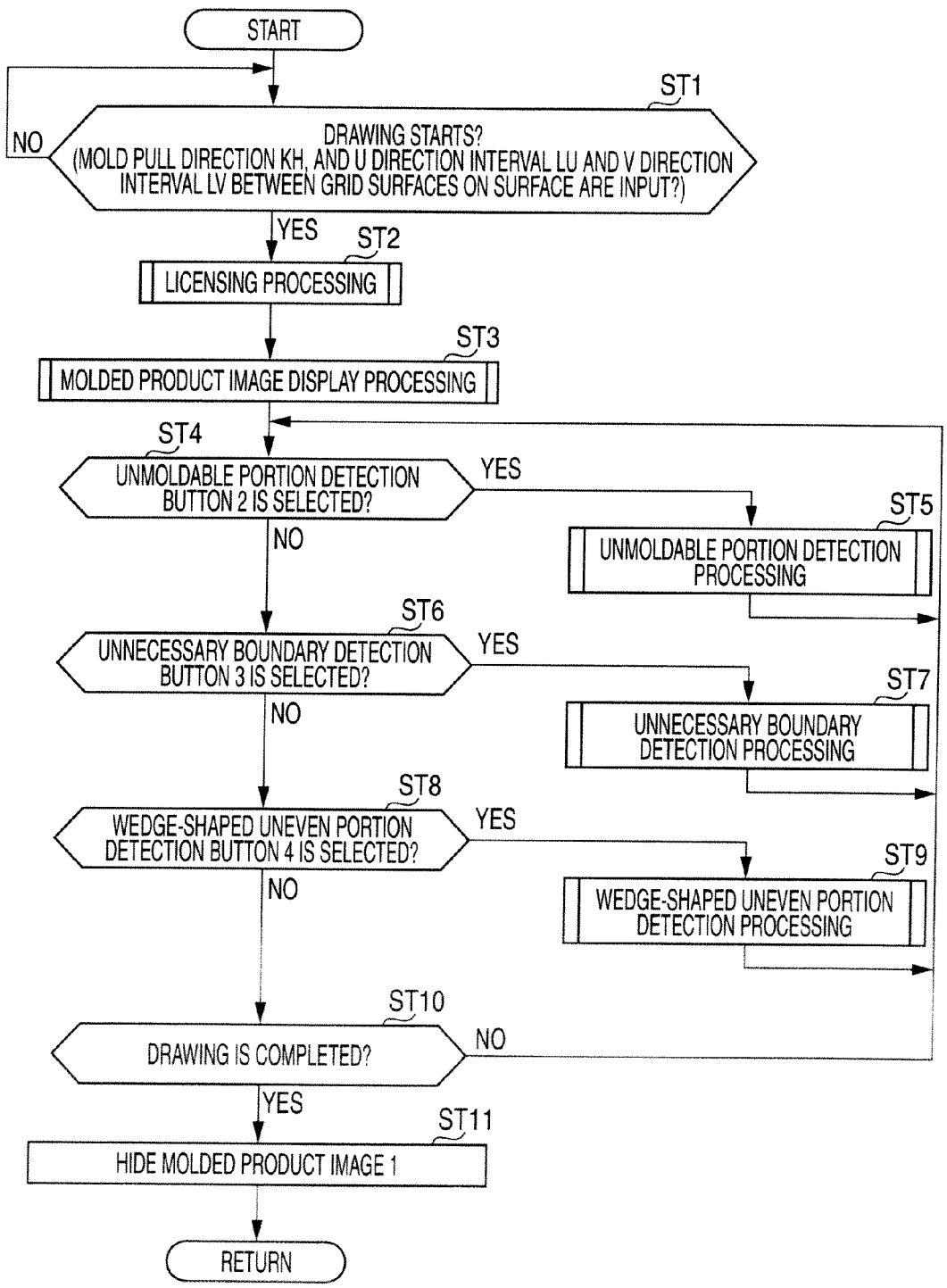
FIG. 10 is a flowchart of a main processing of a design support program according to the first exemplary embodiment.

Description of Flowchart of Main Processing of Design Support Program AP2 in First Embodiment FIG. 10 is a flowchart of a main processing of a design support program according to the first embodiment.

The STs (Steps) of the flowchart shown in FIG. 10 are executed in accordance with the programs stored in the ROM or the like of the controller. The STs are executed in parallel to various processing, for example, molded product drawing, in a multitask manner.

The flowchart shown in FIG. 10 starts when the design support program AP1 runs after the client personal computer PC is powered-on.

Referring to FIG. 10, in ST1, it is determined whether or not a user inputs the mold pull direction KH, and the u direction interval Lv and the v direction interval Lu between the grid lines. Accordingly, it is determined whether or not the design support system S starts to draw a molded product. If it is determined Yes (Y), the process progresses to ST2, and if it is determined No (M), ST1 is repeatedly executed.

In ST2, a licensing processing is executed to determine on the basis of the licensing information stored in the licensing information storage unit C3 whether or not the client personal computer PC obtains an authorized license of the design support system S. Next, the process progresses to ST3.

In ST3, as shown in FIG. 4, a molded product image display processing is executed to display the molded product image 1 obtained from molded product information, which is information about a three-dimensional shape of a molded product stored in the molded product information storage unit C103A. Next, the process progresses to ST4.

In ST4 it is determined whether or not the unmoldable portion detection button 2 of the molded product image 1 is selected. If it is determined Yes (Y), the process progresses to ST5, and if it is determined No (N), the process progresses to ST6.

Figure 11:
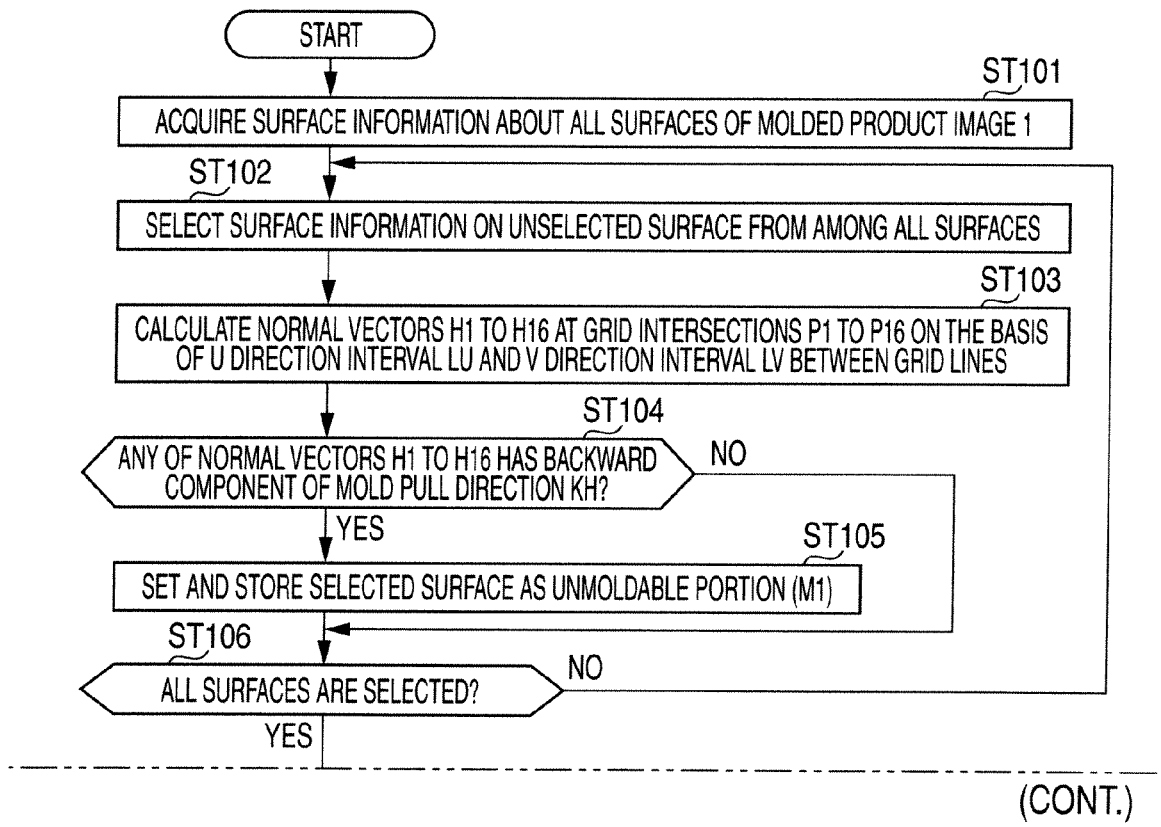
FIG. 11 is a flowchart of an unmoldable portion detection processing, and is an explanatory view of a subroutine of ST5 in FIG. 10.

In ST5, an unmoldable portion detection processing shown in a flowchart of the FIG. 11 is executed to detect the unmoldable portions M1 to M3. Next, the process returns to ST4.

In ST6, it is determined whether or not the unnecessary boundary detection button 3 of the molded product image 1 is selected. If it is determined Yes (Y), the process progresses to ST7, and if it is determined No (N), the process progresses to ST8.

In ST7, an unnecessary boundary detection processing shown in a flowchart of FIG. 12 is executed to detect the unnecessary boundary L1. Next, the process returns to ST4.

In ST8, it is determined whether or not the wedge-shaped uneven portion detection button 4 of the molded product image 1 is selected. If it is determined Yes (Y), the process progresses to ST9, and if it is determined No (N), the process progresses to ST10.

In ST9, a wedge-shaped uneven portion detection processing shown in a flowchart of FIG. 13 is execute to detect the wedge-shaped uneven portion E1+E2 including a wedge-shaped concave portion E1 or a wedge-shaped convex portion E2. Next, the process returns to ST4.

In ST10, it is determined whether or not the user inputs an instruction to end the design support program AP1. Accordingly, it is determined whether or not the design support system S completes drawing of a molded product. If it is determined Yes (Y), the process progresses to ST11, and if it is determined No (N), the process returns to ST4.

In ST11, the molded product image 1 is hidden. Next, the process returns to ST1.

Description of Flowchart of Unmoldable Portion Detection Processing of Design Support Program AP2 in First Embodiment FIG. 11 is a flowchart of an unmoldable portion detection processing, and is an explanatory view of a subroutine of ST5 in FIG. 10.

Referring to FIG. 11, in ST101, surface information about all the surfaces of the molded product image 1 stored in the surface information storage unit C103A1 is acquired. Next, the process progresses to ST102.

In ST102, surface information about an unselected surface from among all the surfaces is selected. Next, the process progresses to ST103.

In ST103, the normal vectors h1 to h16 of all the grid intersections p1 to p16 shown in FIG. 3 are calculated on the basis of the u direction interval Lu and the v direction interval Lv between the grid lines are calculated. Next, the process progresses to ST104.

In ST104, it is determined whether or not any one of the normal vectors h1 to h16 has a backward component of the mold pull direction KH. If it is determined Yes (Y), the process progresses to ST105, and if it is determined No (N), the process progresses to ST106.

In ST105 the selected surface is set and stored as the unmoldable portion (M1). Next, the process progresses to ST106.

In ST106, it is determined whether or not all the surfaces are selected. If it is determined Yes (Y), the process progresses to ST107, and if it is determined No (N), the process returns to ST102.

In ST107, surface information about an unset surface from among the surfaces, excluding the surface set as the unmoldable portion, is selected. Next, the process progresses to ST108.

In ST108, it is determined whether or not a surface adjacent to the selected surface is the unmoldable surfaces M1 to M3. That is, it is determined whether or not the selected surface is the adjacent surface M2. If it is determined Yes (Y), the process progresses to ST109, and if it is determined No (N), the process progresses to ST110.

In ST109, it is determined whether or not the connection angle α or α' between the unmoldable surface M1 and the adjacent surface M2 shown in FIGS. 5A and 5B is less than a prescribed concave connection determination value $α_{max}$. That is, it is determined that the conditions $α<α_{max}$ and $α'<α_{max}$ are satisfied, and accordingly it is determined whether or not the adjacent surface M2 or M2' is the concave connection surface M2. If it is determined No (N), the process progresses to ST110, and if it is determined Yes (Y), the process progresses to ST114.

In ST110, it is determined whether or not there is another surface M4 which the mold pull direction line KL extending from the selected surface, that is, the projection surface M3 or M3' shown in FIG. 6A or 6B, reaches. If it is determined No (N), the process progresses to ST111, and if it is determined Yes (Y), the process progresses to ST112.

In ST111, the selected surface is set and stored as the moldable portion (M3'). Next, the process progresses to ST113.

In ST112, it is determined whether or not there is a stand wall M5 which is adjacent to the selected surface (M3') and in parallel to the mold pull direction line KL. If it is determined Yes (Y), the process progresses to ST113 and if it is determined No (N), the process progresses to ST115.

In ST113, all the stand walls M5 adjacent to the selected surface (M3') are set and stored as the moldable portion M5. Next, the process progresses to ST115.

In ST114, the selected surface is set and stored as the unmoldable portion (M2, M3). Next, the process progresses to ST115.

In ST115 it is determined whether or not there is an unset surface other than the unmoldable portions M1 to M3, If it is determined No (N), the process progresses to ST116, and if it is determined Yes (Y), the process returns to ST107.

In ST116, all the stored unmoldable portions M1 to M3 are displayed with colors. Next, the unmoldable portion detection processing ends, and the process returns to the main processing of FIG. 10.

Description of Flowchart of Unnecessary Boundary Detection Processing of Design Support Program AP2 in First Embodiment FIG. 12 is a flowchart of an unnecessary boundary detection processing and is an explanatory view of a subroutine of ST7 in FIG. 10.

Referring to FIG. 12, in ST201, boundary information about all the boundaries L of the molded product image 1 stored in the boundary information storage unit C103A2 is acquired. Next, the process progresses to ST202.

In ST202, boundary information about an unselected boundary L from among all the boundaries L is selected. Next, the process progresses to ST203.

In ST203, surface information about the first surface FM1 and the second surface FM2 connected to each other through the selected boundary L is acquired. Next, the process progresses to ST204.

In ST204, the following substeps (1) and (2) are executed, and then the process progresses to ST205.

(1) At the midpoint P of the selected boundary L, the first normal vector HV1 of the first surface FM1 is calculated.

(2) At the midpoint P of the selected boundary L, the second normal vector HV2 of the second surface FM2 is calculated.

In ST205, it is determined whether or not the first normal vector HV1 and the second normal vector HV2 are of the same direction. If it is determined Yes (Y), the process progresses to ST206, and if it is determined No (N), the process progresses to ST210.

In ST206, the following substeps (1) and (2) are executed, and then the process progresses to ST207.

(1) At the midpoint P of the selected boundary L, the u1 direction curvature Ku1 and the v1 direction curvature Kv1 of the first surface FM1 are calculated.

(2) At the midpoint P of the selected boundary L, the u2 direction curvature Ku2 and the v2 direction curvature Kv2 of the second surface FM2 are calculated.

In ST207, it is determined whether or not the u1 direction curvature Ku1 and the u2 direction curvature Ku2 are the same and the v1 direction curvature Kv1 and the v2 direction curvature Kv2 are the same. That is, it is determined whether or not the conditions Ku1=Ku2 and Kv1=Kv2 are satisfied. If it is determined No (N), the process progresses to ST208, and if it is determined Yes (Y), the process progresses to ST209.

In ST208, it is determined whether or not the u1 direction curvature Ku1 and the v2 direction curvature Kv2 are the same, and the u2 direction curvature Ku2 and the v1 direction curvature Kv1 are the same. That is, it is determined whether or not the conditions Ku1=Kv2 and Ku2=Kv1 are satisfied. If it is determined Yes (Y), the process progresses to ST209, and if it is determined No (N), the process progresses to ST210.

In ST209, the selected boundary L is set and stored as the unnecessary boundary L1. Next, the process progresses to ST211.

In ST210, the selected boundary L is set and stored as the necessary boundary L2. Next, the process progresses to ST211.

In ST211, it is determined whether or not all the boundaries L are selected. If it is determined Yes (Y), the process progresses to ST212, and if it is determined No (N), the process returns to ST202.

In ST212, all the stored unnecessary boundaries L1 are displayed with color. Thereafter, the unnecessary boundary detection processing ends, and the process returns to the main processing of FIG. 10.

Description of Flowchart of Wedge-Shaped Uneven Portion Detection Processing of Design Support Program AP2 in First Embodiment FIG. 13 is a flowchart of a wedge-shaped uneven portion detection processing and is an explanatory view of a subroutine of ST9 in FIG. 10.

Referring to FIG. 13, in ST301, boundary information about all the boundaries L of the molded product image 1 stored in the boundary information storage unit C103A2 is acquired. Next, the process progresses to ST302.

In ST302, boundary information of an unselected boundary L from among all the boundaries L is selected. Next, the process progresses to ST303.

In ST303, surface information of the first surface FM1 and the second surface FM2 connected to each other through the selected boundary L is acquired. Next, the process progresses to ST304.

In ST304, the following substeps (1) and (2) are executed, and then the process progresses to ST305.

(1) At the midpoint P of the selected boundary L, the first normal vector HV1 of the first surface FM1 is calculated.

(2) At the midpoint P of the selected boundary L, the second normal vector HV2 of the second surface FM2 is calculated.

In ST305, it is determined whether or not the connection angles β and β' between the first surface FM1 and the second surface FM2 are less than the wedge shape determination value $β_{max}$. That is, it is determined whether or not the conditions $β<β_{max}$ and $β'<β_{max}$ are satisfied. In ST305, the connection angles β and β' are calculated on the basis of the angles γ and γ' between the first normal vector HV1 of the first surface FM1 and the second normal vector HV2 of the second surface FM2 at the midpoint P. That is, β=|360°−(90°×2)−γ⊕=|180°−γ| and β'=|360°−(90°×2)−γ'=|180°−γ'| are calculated. If it is determined No (N), the process progresses to ST306, and if it is determined Yes (Y), the process returns to ST307.

In ST306, the selected boundary L, the first surface FM1, and the second surface FM2 are set and stored as a non-wedge-shaped uneven portion. Next, the process progresses to ST311.

In ST307, the normal direction movement point Q which is moved from the midpoint P in a direction of the first normal vector HV1 by the normal direction movement distance LH1 is calculated. Next, the process progresses to ST308.

In ST308, it is determined whether or not the normal direction movement point Q is a point inside a molded product. That is, it is determined whether or not the normal direction movement point Q is not a point on a space. If it is determined Yes (Y), the process progresses to ST309, and if it is determined No (N), the process progresses to ST310.

In ST309, the selected boundary L, the first surface FM1, and the second surface FM2 are set and stored as the wedge-shaped concave portion E1. Next, the process progresses to ST311.

In ST310, the selected boundary L, the first surface FM1, and the second surface FM2 are set and stored as the wedge-shaped convex portion E2. Next, the process progresses to ST311.

In ST311, it is determined whether or not all the boundaries L are selected. If it is determined Yes (Y), the process progresses to ST312, and if it is determined No (N), the process returns to ST302.

In ST312, all the wedge-shaped concave portions E1 stored in the wedge-shaped concave portion setting storage unit C107E and all the wedge-shaped convex portions E2 stored in the wedge-shaped convex portion setting storage unit C107F are displayed with different colors on the molded product image 1. Thereafter, the wedge-shaped uneven portion detection processing ends, and the process returns to the main processing of FIG. 10.

Operations of First Embodiment

FIGS. 14A to 14C are explanatory views of the operations of the first embodiment and enlarged explanatory views showing an example of an unmoldable portion to be detected by the unmoldable portion detection processing. FIG. 14A is an explanatory view showing an example of each portion of a molded product to be detected as an unmoldable surface and an adjacent surface. FIG. 14B is an enlarged explanatory view of a boss when viewed from a direction of an arrow XIVB of FIG. 14A. FIG. 14C is an explanatory view showing an example of each portion of a molded product to be detected as a projection surface and an example of each portion of a molded product to be not detected as a projection surface.

In the design support system S of the first embodiment having the above-described configuration, when the unmoldable portion detection button 2 of the molded product image 1 shown in FIG. 4 is selected, the unmoldable portion detection processing shown in ST5 of FIG. 10 and ST101 to ST16 of FIG. 11 is executed.

During the unmoldable portion detection processing of the first embodiment, first, like Patent Documents 1 and 2, an in-plane undercut processing is executed in which the unmoldable portion M1 is detected on the basis of the mold pull direction KH and the normal vectors h1 to h16. That is, in ST104 of FIG. 11, the unmoldable surface M1, on which any one of the normal vectors h1 to h16 has the backward component of the mold pull direction KH, is detected as the unmoldable portion M1.

As a result, in regards to a through hole that passes through a surface of a molded product on the molded product image 1 shown in FIGS. 14A and 14B, a normal vector at an upper part of a through hole inside the through hole has a backward component of the mold pull direction KH, that is, upward. In regards to a boss, which is an example of a protrusion protruding from a surface of the molded product, a normal vector at a lower part of a cylindrical surface 1$b$ in a base end portion and a normal vector at a lower part of a chamfered portion 1$c$ in a front end portion have the backward component. Meanwhile, the normal vectors on a planar front end surface 1$d$ of the boss are all perpendicular to the mold pull direction KH and have no backward component. For this reason, the through surface 1$a$, the cylindrical surface 1$b$, and the chamfered portion 1$c$ are detected as the unmoldable portion M1.

During the unmoldable portion detection processing, a concave edge processing is executed in which a new unmoldable portion M2 is detected on the basis of the connection angles $\alpha$ and $\alpha'$ to the previously detected unmoldable portions M1 to M3. That is, in ST108 and ST109 of FIG. 11, it is determined whether or not the connection angles $\alpha$ and $\alpha'$ between the unmoldable portions M1 to M3 and the adjacent surfaces M2 and M2' shown in FIGS. 5A and 5B are less than the prescribed concave connection determination value $\alpha_{max}$. Therefore, the concave connection surface M2, which is connected to the unmoldable portions M1 to M3, is detected as a new unmoldable portion M2.

As a result, a protrusion support surface 1$e$, shown in FIG. 14A, which supports the boss 1$b$ to 1$d$, is detected as the concave connection surface M2 concavely connected to the cylindrical surface 1$b$. Actually, in regards to the protrusion support surface 1$e$, a downward portion of the boss 1$b$ to 1$d$ on the upstream side of the mold pull direction KH becomes an unmoldable portion M1. Furthermore, in regards to a pocket-like groove 1$f$, an upper end surface 1$f$1 is detected as the unmoldable surface M1, but there is no normal vector opposite to the mold pull direction KH during the in-plane undercut processing in ST104 of FIG. 11. For this reason, other surfaces 1$f$2 to 1$f$5 are not detected as the unmoldable surface M1 even though they are the unmoldable surface M1. In the first embodiment, however, with the concave edge processing, a left surface 1$f$2, a right surface 1$f$3, and a bottom surface 1$f$4 concavely connected to the upper end surface 1$f$1 are detected as the concave connection surface M2, and a lower end surface 1$f$5 is detected as the concave connection surface M2 of each of the surfaces 1$f$2 to 1$f$4.

During the unmoldable portion detection processing, a projection point processing is executed in which a new unmoldable portion M3 is detected on the basis of the mold pull direction line KL extending from the projection surface M3 or M3'. That is, in ST110 of FIG. 11, it is determined whether or not there is another surface M4 which the mold pull direction line KL extending from the projection surface M3 or M3' shown in FIG. 6A or 6B reaches. Accordingly, the projection surface M3 having the surface M4 is detected as a new unmoldable portion M3.

As a result, an upper surface 1$h$1 of a first protrusion 1$h$, which protrudes upward from a bottom surface of the molded product below a solid barrier portion 1$g$, shown in FIG. 14C, which is an example of the surface M4, is detected as the unmoldable portion M3 since the mold pull direction line KL extending from the upper surface 1$h$1 reaches the solid barrier portion 1$g$.

During the unmoldable portion detection processing, a stand wall processing is executed in which it is determined on the basis of the projection surface M3' not having the surface M4 whether or not a surface (M5) adjacent to the projection surface M3' is the moldable surface M5. That is, in ST112 of FIG. 11, the stand wall M5, shown in FIG. 6B, which is adjacent to the projection surface M3 and in parallel to the mold pull direction line KL is determined as the moldable surface M5.

As a result, in regards to a second protrusion 1$i$, shown in FIG. 14C, which protrudes upward from a bottom surface of a molded product, an upper surface 1$i$1 of the second protrusion 1$i$ is detected as the moldable portion M3 being not undercut with no solid barrier portion against the mold pull direction line KL extending from the upper surface 1$i$1. Furthermore, since the side surfaces 1$i$2 to 1$i$5 are in parallel to the mold pull direction line KL, each side surface is determined as the stand wall M5 and then detected as the moldable portion M5.

Therefore, in the design support system S of the first embodiment, the unmoldable portion detection processing ensures automatic determination of presence/absence of the unmoldable portions M1 to M3 with good accuracy and makes it easy to design a mold without needing proficient knowledge.

In the design support system S of the first embodiment, when the unnecessary boundary detection button 3 of the molded product image 1 shown in FIG. 5 is selected, the unnecessary boundary detection processing shown in ST7 of FIG. 10 and ST201 to ST212 of FIG. 12 is executed.

During the unnecessary boundary detection processing of the first embodiment, if it is determined in ST205 of FIG. 12 that the normal vectors HV1 and HV2 of the first surface FM1 and second surface FM2 connected to each other through the boundary L shown in FIGS. 7A and 7B are of the same direction, and it is determined in ST207 and ST208 of FIG. 12 that the first curvatures Ku1 and Kv1 of the first surface FM1 and the second curvatures Ku2 and Kv2 of the second surface FM2 shown in FIGS. 8A and 8B are the same, the boundary L is determined as the unnecessary boundary L1 that divides the first surface FM1 and the second surface FM2, which should be the same surface.

Therefore, in the design support system S of the first embodiment, the unnecessary boundary detection processing ensures automatic detection of the unnecessary boundary L1 with good accuracy and makes it easy to design the mold without needing proficient knowledge.

In the design support system S of the first embodiment, when the wedge-shaped uneven portion detection button 4 of the molded product image 1 shown in FIG. 4 is selected, the wedge-shaped uneven portion detection processing shown in ST9 of FIG. 10 and ST301 to ST312 of FIG. 13 is executed.

During the wedge-shaped uneven portion detection processing of the first embodiment, in ST305 of FIG. 13, it is determined whether or not the connection angles $\beta$ and $\beta'$ of the first surface FM1 and the second surface FM2, which are calculated on the basis of the normal vectors HV1 and HV2 of the first surface FM1 and the second surface FM2 connected to each other through the boundary L are less than the prescribed wedge shape determination value $\beta_{max}$. Accordingly, it is determined whether or not the boundary L, the first surface FM1, and the second surface FM2 are the wedge-shaped uneven portion E1+E2.

If it is determined that the boundary L, the first surface FM1, and the second surface FM2 are the wedge-shaped uneven portion E1+E2, in ST307 and ST308 of FIG. 13, it is determined whether or not the normal direction movement point Q, which is moved from the midpoint P of the boundary L in the first normal vector HV1 by the normal direction movement distance LH1 is a point inside the molded product or a point on a space. As a result, if it is determined that the normal direction movement point Q is a point inside the molded product, it is determined that the boundary L, the first surface FM1, and the second surface FM2 are the wedge-shaped concave portion E1. If it is determined that the normal direction movement point Q is a point on a space, it is determined that the boundary L, the first surface FM1, and the second surface FM2 are the wedge-shaped convex portion E2.

Therefore, in the design support system S of the first embodiment, the wedge-shaped uneven portion detection processing ensures automatic detection with good accuracy of the wedge-shaped concave portion E1, which becomes problematic in terms of the strength of the mold due to the sharpness of the mold, and the wedge-shaped convex portion E2, which is dangerous to the user due to the sharpness of the molded product, causes a difficulty in processing the mold having a concave shape, and becomes problematic in terms of manufacturing costs. As a result, it is possible to easily design the mold without needing proficient knowledge.

Second Embodiment

Figure 15:
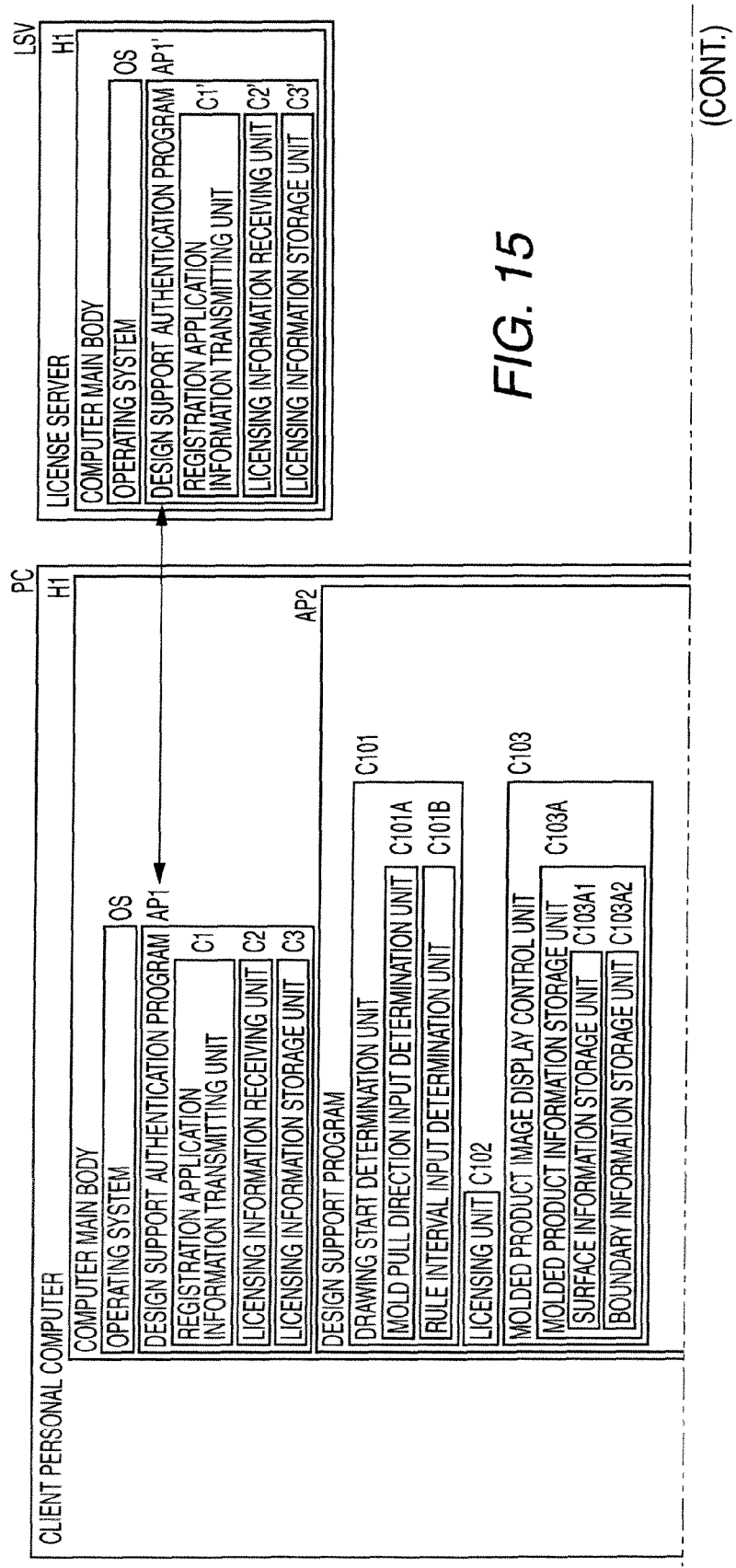
FIG. 15 is a functional block diagram showing the functions of controllers of a client personal computer and a license server according to a second exemplary embodiment of the invention, and corresponds to FIG. 2 in the first exemplary embodiment.

FIG. 15 is a functional block diagram showing the functions of controllers of a client personal computer and a license server according to a second embodiment of the invention. FIG. 15 corresponds to FIG. 2 in the first embodiment.

Figure 16:
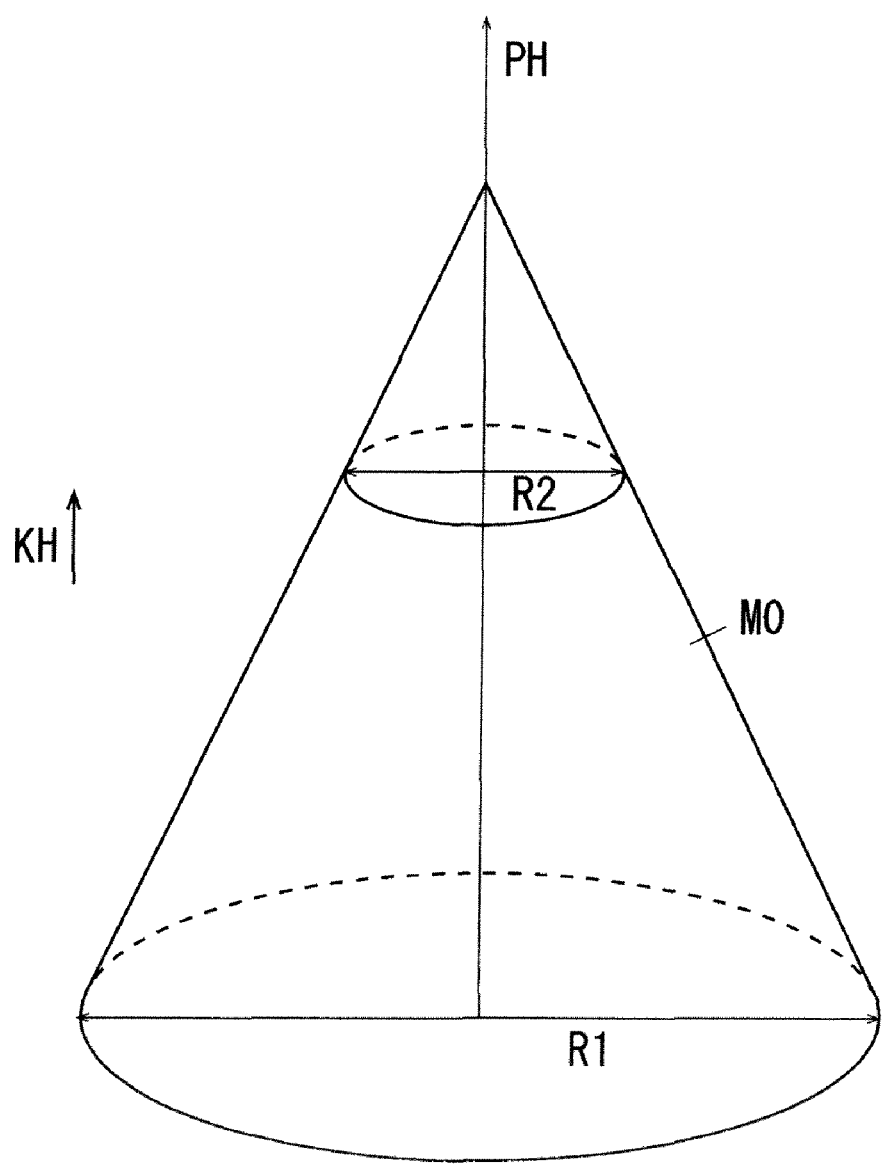
FIG. 16 is an enlarged explanatory view of a conical surface, which is an example of a rotational surface.

FIG. 16 is an enlarged explanatory view of a conical surface, which is an example of a rotational surface.

A design support system S according to a second embodiment of the invention will now be described. In the description of the second embodiment, the same parts as those in the first embodiment are represented by the same reference numerals, and detailed descriptions thereof will be omitted. The second embodiment has the following differences from the first embodiment. Other parts are the same as those in the first embodiment.

Description of Controller of Second Embodiment (Design Support Program AP2)

Referring to FIG. 15, if a surface is a rotational surface M0, which is a curved surface of a solid body, that is, a rotating body, obtained by rotation around a center axis, as shown in FIG. 16, a surface information storage unit C103A1 of the second embodiment stores the surface as a rotational surface M0. In the second embodiment, when the surface is drawn by an input for drawing a rotational surface during drawing, the surface drawn by the input is stored as the rotational surface M0.

An unmoldable portion determination unit C105A of the second embodiment has a rotational surface determination unit C105A3, a center axis parallel determination unit C105A4, and a sectional outer diameter determination unit C105A5.

C105A3: Rotational Surface Determination Unit

The rotational surface determination unit C105A3 determines on the basis of information stored in the surface information storage unit C103A1 whether or not the surface is the rotational surface M0.

C105A4: Center Axis Parallelism Determination Unit

The center axis parallel determination unit C105A4 determines whether or not a center axis direction PH of the rotational surface M0 and the mold pull direction KH are in parallel to each other, as shown in FIG. 16.

C105A5: Sectional Outer Diameter Determination Unit

In regards to the outer diameters R1 and R2 serving as a diameter of a circle in sectional view perpendicular to the center axis direction PH, the sectional outer diameter determination unit C105A5 determines whether or not an upstream-side outer diameter R1, which is an outer diameter on an upstream side of the mold pull direction KH, is equal to or larger than a downstream-side outer diameter R2, which is an outer diameter on a downstream side of the mold pull direction KH, as shown in FIG. 16. If it is determined that the center axis direction PH of the rotational surface M0 is in parallel to the mold pull direction KH, and the upstream-side outer diameter R1 is equal to or larger than the downstream-side outer diameter R2 over the center axis direction PH, the unmoldable portion determination unit C105A of the second embodiment determines that the rotational surface M0 is not the unmoldable portion M1. If it is determined that the center axis direction PH of the rotational surface M0 is not in parallel to the mold pull direction KH, or if it is determined that the center axis direction PH of the rotational surface M0 is in parallel to the mold pull direction KH, but the upstream-side outer diameter R1 is smaller than the downstream-side outer diameter R2 over the center axis direction PH, the unmoldable portion determination unit C105A determines that the rotational surface M0 is the unmoldable portion M1.

Figure 17:
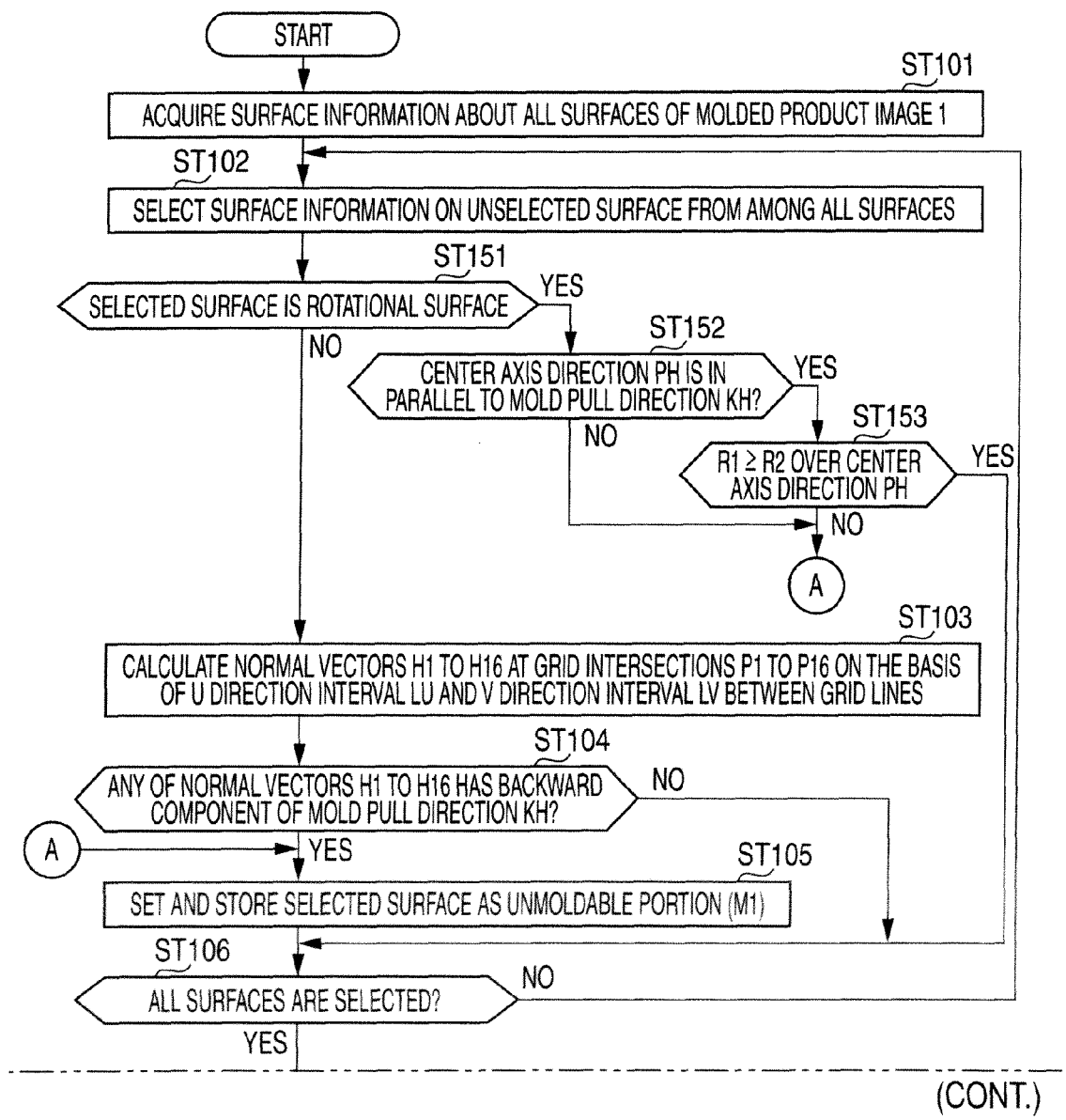
FIG. 17 is a flowchart of an unmoldable portion detection processing according to the second exemplary embodiment, specifically.

Description of Flowchart of Unmoldable Portion Detection Processing in Second Embodiment FIG. 17 is a flowchart of a unmoldable portion detection processing according to the second embodiment. FIG. 17 is an explanatory view of a subroutine of ST5 shown in FIG. 10 and corresponds to FIG. 11 in the first embodiment.

Referring to FIG. 17, the flowchart of the design support program AP2 in the client personal computer PC of the second embodiment is different from the flowchart of the main processing in the first embodiment shown in FIG. 11 in that ST151 to ST153 are executed between ST102 and ST103. ST101 to ST116 are the same as those in FIG. 11, and detailed descriptions thereof will be omitted.

Referring to FIG. 17, in ST151 it is determined whether or not a selected surface is a rotational surface M0. If it is determined Yes (Y), the process progresses to ST152, and if it is determined No (N), the process progresses to ST103.

In ST152, it is determined whether or not the center axis direction PH of the rotational surface M0 and the mold pull direction KH shown in FIG. 16 are in parallel to each other. If it is determined Yes (Y), the process progresses to ST153, and if it is determined No (N), the process progresses to ST105.

In ST153, it is determined whether or not the upstream-side outer diameter R1 is equal to or larger than the downstream-side outer diameter R2 over the center axis direction PH of the rotational surface M0. If it is determined Yes (Y), the process progresses to ST106, and if it is determined No (N), the process progresses to ST105.

Operations of Second Embodiment

Figure 18A:
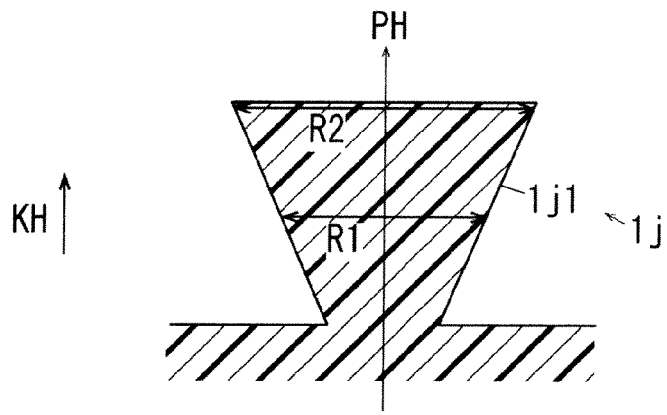
FIGS. 18A to 18C are explanatory views of the operations of the second exemplary embodiment and enlarged explanatory views showing an example of an unmoldable portion to be detected by the unmoldable portion detection processing of the second exemplary embodiment. Specifically.
Figure 18B:
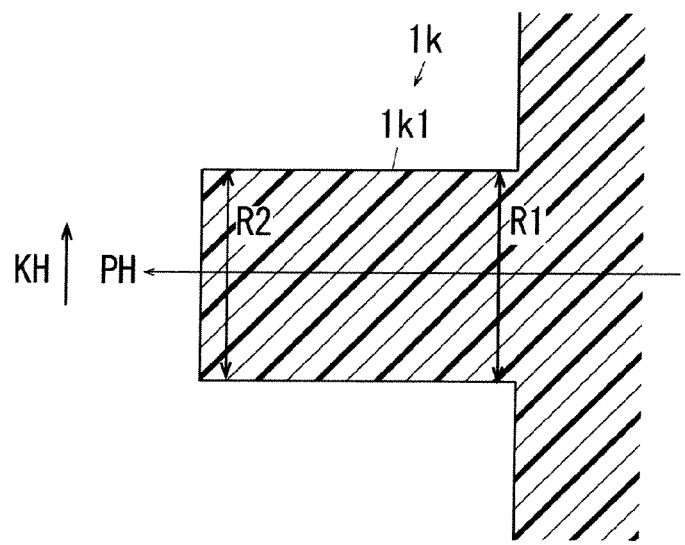
Figure 18C:
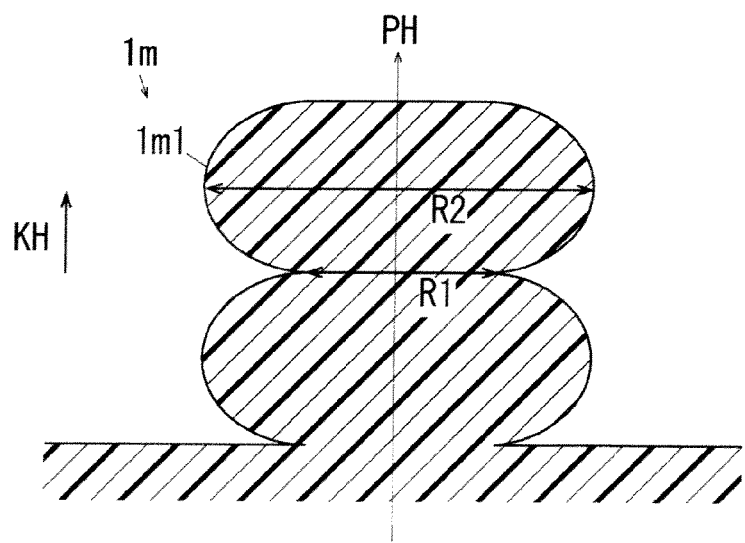

FIGS. 18A to 18C are explanatory views of the operations of the second embodiment and enlarged explanatory views showing an example of an unmoldable portion to be detected by the unmoldable portion detection processing of the second embodiment. FIG. 18A is a sectional view of a truncated conical surface which is an example of an unmoldable surface. FIG. 18B is a sectional view of a cylindrical surface which is an example of an unmoldable surface. FIG. 18C is a sectional view of a B curved surface which is an example of an unmoldable surface.

In the design support system S of the second embodiment having the above-described configuration, during the unmoldable portion detection processing, a processing shown in ST151 to ST153 of FIG. 17 is executed to determine whether or not the rotational surface M0 shown in FIG. 16 is the unmoldable surface M1. That is, if it is determined that the center axis direction PH of the rotational surface M0 is in parallel to the mold pull direction KH, and the upstream-side outer diameter R1 is equal to or larger than the downstream-side outer diameter R2 over the center axis direction PH, the rotational surface M0 is detected as the unmoldable surface M1.

As a result, a truncated conical surface 1j1 shown in FIG. 18A, serving as an example of the rotational surface M0, which constitutes a side surface 1j1 of a third protrusion 1j having an inverted truncated conical shape, is detected as the unmoldable surface M1. The reason is because the center axis direction PH is in parallel to the mold pull direction KH, but the upstream-side outer diameter R1 is equal to or smaller than the downstream-side outer diameter R2. Furthermore, a cylindrical surface 1k1 shown in FIG. 18B, serving as an example of the rotational surface M0, which constitutes a side surface 1k1 of a cylindrical fourth protrusion 1k, is detected as the unmoldable surface M1. The reason is because the upstream-side outer diameter R1 and the downstream-side outer diameter R2 are the same, but the center axis direction PH is not in parallel to the mold pull direction KH. Furthermore, a B curved surface 1m1 shown in FIG. 18C, serving as an example of the rotational surface M0, which constitutes a side surface 1m1 of a fifth protrusion 1m, is detected as the unmoldable surface M1. The reason is because the center axis direction PH is in parallel to the mold pull direction KH, but the upstream-side outer diameter R1 is equal to or smaller than the downstream-side outer diameter R2.

Therefore, in the design support system S of the second embodiment, when a selected surface is the rotational surface M0, unlike the design support system S of the first embodiment, it is possible to determine with good accuracy whether the rotational surface M0 is the unmoldable surface M1 or the unmoldable surface M1, without calculating the normal vector (h1 to h16).

(Modifications)

Although the invention will be described in connection with the foregoing embodiments, the invention is not limited to the foregoing embodiments. It should be noted that various modifications and changes may be made without departing from the scope of the invention read on the appended claims. For example, the following modifications (H01) to (H07) may be made.

(H01) In the unmoldable portion detection processing of the foregoing embodiments, the concave edge processing for detecting the concave connection portion M2 shown in ST108 and ST109 of FIG. 11, and the projection point processing for detecting the projection surface M3 having the surface M4 shown in ST110 of FIG. 11 are preferably executed in combination. However, the invention is not limited thereto. For example, only the concave edge processing may be executed or only the projection point processing may be executed. The stand wall processing for detecting the stand wall M5 constituting the moldable portions M3' and M5 shown in ST112 of FIG. 11 is preferably accompanied by the projection point processing, but it may be not executed. In this case, the surface (M5) is detected as the projection surface M3' not having the surface M4 and is set as the moldable portion M3', while being not detected as the stand wall M5.

(H02) In the unmoldable portion detection processing of the foregoing embodiments, the connection angles α and α' are calculated on the basis of the normal vectors h1 to h16 at the grid intersections p1 to p16, but the invention is not limited thereto. For example, like the unnecessary boundary detection processing or the wedge-shaped uneven portion detection processing, the connection angles α and α' may be calculated on the basis of the normal vectors HV1 and HV2 at the midpoint P of the first surface FM1 and the second surface FM2, which are connected to each other through the boundary L.

(H03) In the unnecessary boundary detection processing of the foregoing embodiments, it is determined on the basis of the curvatures Ku1, Kv1, and Ku2, Kv2 of the first surface FM1 and the second surface FM2 at the midpoint P of the boundary L whether or not the boundary L is the unnecessary boundary L1, but the invention is not limited thereto. For example, it may be possible to determine whether or not the boundary L is the unnecessary boundary L1, by calculating the curvature radii 1/Ku1, 1/Kv1, 1/Ku2, and 1/Kv2 of the first surface FM1 and the second surface FM2, determining whether or not the curvature radii 1/Ku1 and 1/Kv1 of the first surface FM1 are the same as the curvature radii 1/Ku2 and 1/Kv2 of the second surface FM2, and determining whether or not the first curved state and the second curved state are the same.

(H04) In the foregoing embodiments, the numerical values of the parameters $\alpha_{max}$, $\beta_{max}$, and LH1 may be changed.

(H05) In the foregoing embodiments, the detected unmoldable portion M1 to M3, the unnecessary boundary L1, and the wedge-shaped concave portion E1, and the wedge-shaped convex portion E2, which are detected by the unmoldable portion detection processing, the unnecessary boundary detection processing, and the wedge-shaped uneven portion detection processing, are displayed with colors, but the invention is not limited thereto. For example, a boundary between detection places may be highlighted, or a colored portion of a detection place may blink. Furthermore, a detection place may be displayed by an additional image, or a sentence or symbol, or may be reported by sound.

(H06) In the foregoing embodiments, the molded product image 1 has the unmoldable portion detection button 2, the unnecessary boundary detection button 3, and the wedge-shaped uneven portion detection button 4, but the invention is not limited thereto. For example, the buttons may be substituted with images, such as icons, or each processing may be executed by command input.

(H07) In the design support system S of the foregoing embodiments, the license of the design support system S is given by transmission/reception of the registration application information and the licensing information between the client personal computer PC and the license server, but the invention is not limited thereto. For example, transmission/reception of the registration application information and the licensing information may be omitted, and a confirmation processing of the license of the design support system S based on the licensing information may also be omitted.

Third Embodiment

Description of Controller of Third Embodiment

Figure 19:
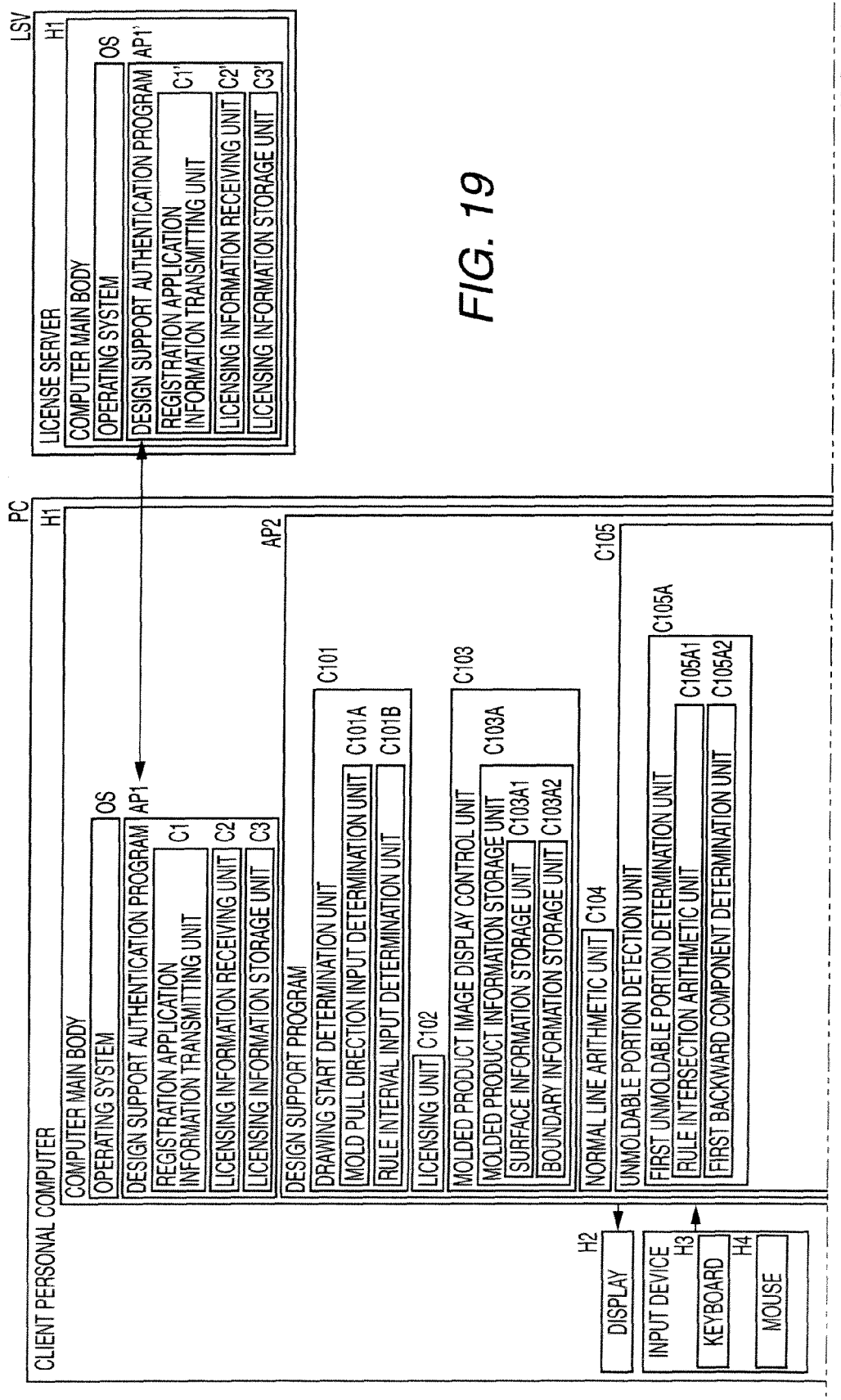
FIG. 19 is a functional block diagram showing the functions of controllers in a client personal computer and a license server of the third exemplary embodiment.

FIG. 19 is a functional block diagram showing the functions of controllers in a client personal computer and a license server of the third embodiment.

Figure 20:
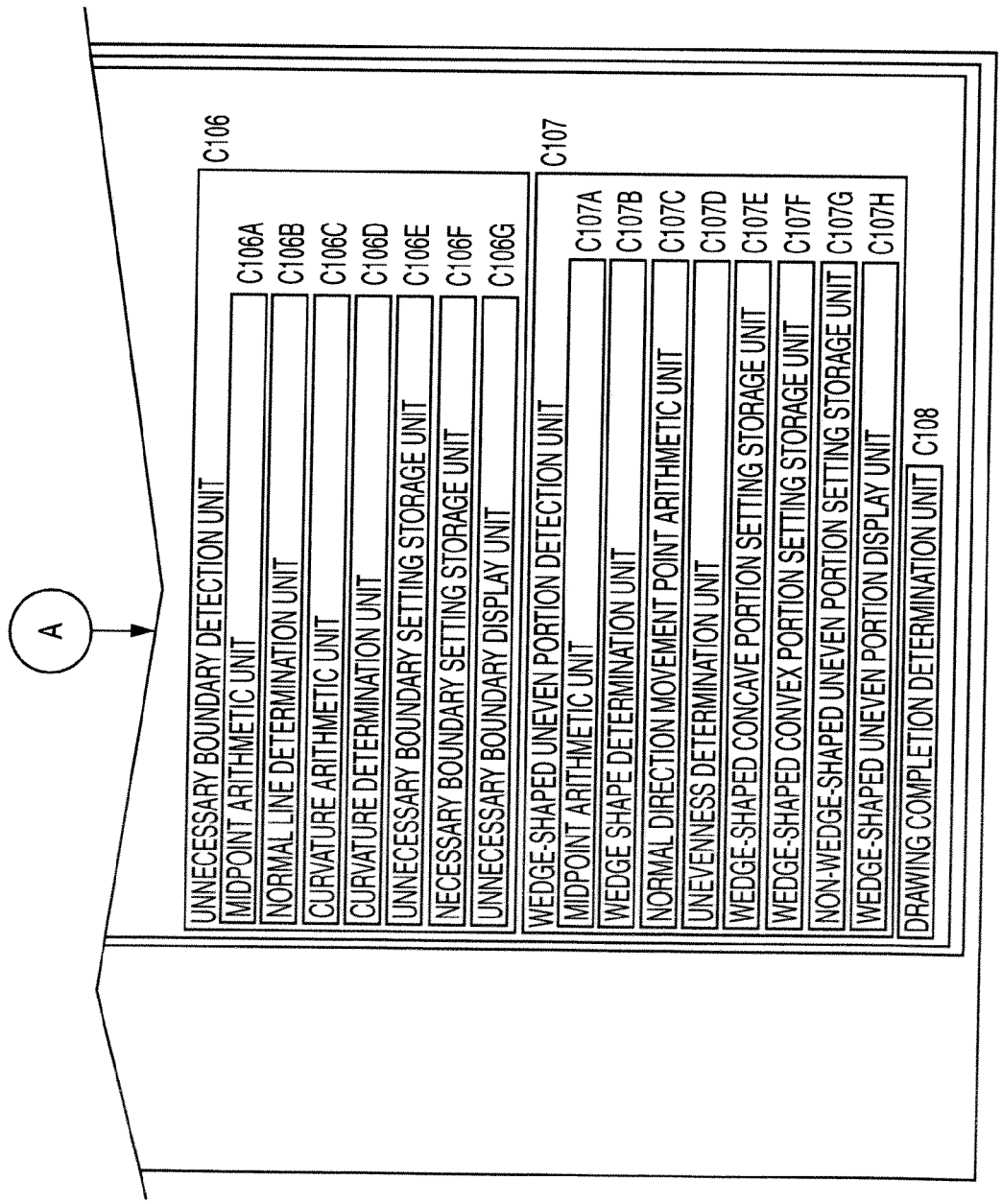
FIG. 20 is a functional block diagram which is continued to FIG. 19.

FIG. 20 is a functional block diagram which is continued to FIG. 19.

(Description of Controller in Client Personal Computer PC)

Referring to FIGS. 2 and 3, the computer main body H1 of the client personal computer PC has an I/O (Input/Output Interface) that performs input/output of signals to/from the outside and adjusts the levels of the input/output signals, a ROM (Read Only Memory) that stores programs and data for necessary processing, a RAM (Random Access Memory) that temporarily stores necessary data, a CPU (Central Processing Unit) that performs processing in accordance with the programs stored in a hard disc, and a clock oscillator.

Such a client personal computer PC may implement various functions by executing the programs stored in the hard disc or the ROM.

The hard disc of the client personal computer PC stores application programs, such as an operating system OS, which is basic software for controlling the basic operations of the computer apparatus, a design support authentication program AP1 that acquires license information of the design support system S from the license server LSV, a design support program AP2 that includes a function of an unmoldable portion detection program for drawing each molded product, word processor software for document creation (not shown), and software for electronic mail transmission and reception. Hereinafter, the functions (control unit) of the programs AP1 and AP2, excluding the known operating system OS and application programs (not shown), will be described.

(Design Support Authentication Program AP1)

The design support authentication program AP1 has a registration application information transmitting unit C1 that transmits registration application information, which is information about application for registration to the design support system design support system S, a licensing information receiving unit C2 that receives licensing information, which is information about a license of the design support system S, and a licensing information storage unit C3 that stores the licensing information. The client personal computer PC of the third embodiment transmits/receives information to/from the license server LSV and acquires the licensing information on the basis of the registration application information, thereby obtaining the license of the design support system S.

(Design Support Program AP2)

FIG. 21 is a partially enlarged explanatory view showing the relationship between a normal vector and a cavity direction at an intersection of grid lines in u and v directions on a surface of a molded product.

C101: Drawing Start Determination Unit

The drawing start determination unit C101 has a mold pull direction input determination unit C101A and a rule interval input determination unit C101B, and determines whether or not the design support system S starts to draw a molded product.

C101A: Mold Pull Direction Input Determination Unit

The mold pull direction input determination unit C101A determines whether or not a mold pull direction of a mold of the molded product shown in FIG. 21 is input. The mold pull direction input determination unit C101A of the third embodiment determines whether or not a cavity direction KH1 which is an example of a first mold pull direction, that is, a mold pull direction of a cavity plate, called a female mold, which is an example of a first mold of the molded product, and a core direction KH2, which is opposite to the cavity direction and an example of a second mold pull direction, that is, a mold pull direction of a core plate, called a male mold, which is an example of a second mold and corresponds to the female mold, are input. In the mold pull direction input determination unit C101A of the third embodiment, for example, an up direction, that is, a +Z direction is input as the cavity direction KH1, and a down direction, that is, a −Z direction is input as the core direction KH2.

C101B: Rule Interval Input Determination Unit

The rule interval input determination unit C101B determines whether or not an interval Lu between the grid lines in the u direction and an interval Lv between the grid lines in the v direction on each surface of the molded product shown in FIG. 21.

C102: Licensing Unit

A licensing unit C102 executes a licensing processing to determine on the basis of the licensing information stored in the licensing information storage unit C3 whether or not the client personal computer PC obtains an authorized license of the design support system S.

FIG. 4 is an explanatory view of a molded surface image of the third embodiment.

C103: Molded Product Image Display Control Unit

A molded product image display control unit C103 serving as an example of a molded product display unit has a molded product information storage unit C103A, and controls display of a molded product image 1 obtained from information about a three-dimensional shape of the molded product shown in FIG. 4. Referring to FIG. 4, in the molded product image 1 of the third embodiment, a developer container of a developing device in an image forming apparatus is displayed as an example of the molded product. The molded product image 1 has an unmoldable portion detection button 2 that is used to execute an unmoldable portion detection processing for detecting an unmoldable portion M8, called an undercut, to be unmoldable only by movement in one direction of a mold of the molded product shown in FIGS. 8A and 8B, an unnecessary boundary detection button 3 that is used to execute an unnecessary boundary detection processing for detecting an unnecessary boundary L1, that is, an unnecessary boundary dividing two surfaces FM1 and FM2, which should be the same surface, among boundaries L dividing surfaces of the molded product shown in FIG. 7A, and a wedge-shaped uneven portion detection button 4 that is used to execute a wedge-shaped uneven portion detection processing for detecting a wedge-shaped concave portion E1, called a mold edge, and a wedge-shaped convex portion E2, called a product edge, which are individually formed by connecting a first surface FM1 and a second surface FM2 at predetermined angles β and β', from among concave portions and convex portions formed by the boundary L and the first surface FM1 and the second surface FM2 connected to each other by the boundary L shown in FIGS. 9A and 9B.

C103A: Molded Product Information Storage Unit

A molded product information storage unit C103A has a surface information storage unit C103A1 that stores surface information about each surface of the molded product, and a boundary information storage unit C103A2 that stores boundary information, such as the coordinates of both ends of each boundary of the molded product. The molded product information storage unit C103A stores molded product information about the molded product including the surface information and the boundary information.

C104: Normal Line Arithmetic Unit

A normal line arithmetic unit C104 calculates a normal vector (h1 to h16, HV1, and HV2) serving as an example of a normal line at a normal line calculation point (p1 to p17 and P) set on the surface, at which the normal line is calculated. In the third embodiment, as the normal line calculation point (p1 to p17 and P), grid intersections p1 to p16 on each surface shown in FIG. 21 and a midpoint P of each boundary shown in FIGS. 7A to 11B are used.

C105: Unmoldable Portion Detection Unit

An unmoldable portion detection unit C105 has a first unmoldable portion determination unit C105A, a first adjacent unmoldable portion determination unit C105B, a first projection unmoldable portion determination unit C105C, a first unmoldable portion setting storage unit C105D, a second unmoldable portion determination unit C105A', a second adjacent unmoldable portion determination unit C105B', a second projection unmoldable portion determination unit C105C', a second unmoldable portion setting storage unit C105D', an unmoldable portion determination unit C105E, an unmoldable portion setting storage unit C105F, a third moldable portion setting storage unit C105G, a moldable portion setting storage unit C105H, an unmoldable portion display unit C105J, and a third moldable portion display unit C105K. When the unmoldable portion detection button 2 is selected, the unmoldable portion detection unit C105 executes the unmoldable portion detection processing for detecting the unmoldable portion M8.

C105A: First Unmoldable Portion Determination Unit

The first unmoldable portion determination unit C105A has a rule intersection arithmetic unit C105A1 and a first backward component determination unit C105A2. The first unmoldable portion determination unit C105A determines on the basis of the normal vector (h1 to h16) whether or not each surface is a cavity-side unmoldable portion (M1), which is an example of a first unmoldable portion to be unmoldable only by movement of the female mold in the cavity direction KH1.

C105A1: Rule Intersection Arithmetic Unit

As shown in FIG. 21, the rule intersection arithmetic unit C105A1 calculates, on the basis of the interval Lu in the u direction and the interval Lv in the v direction previously input, the grid intersections p1 and p16 on each surface of the grid lines in the u and v directions on each surface and the boundary surrounding each surface.

C105A2: First Backward Component Determination Unit

As shown in FIG. 21, the first backward component determination unit C105A2 determines whether or not each of the normal vectors h1 to h16 calculated at the grid intersections p1 to p16 has a cavity backward component serving as an example of a first backward component, which is a directional component opposite to the cavity direction KH1 previously input. Accordingly, if any one of the normal vectors h1 to h16 has the cavity backward component, the first unmoldable portion determination unit C105A of the third embodiment determines that a corresponding surface is the cavity-side unmoldable portion (M1).

FIGS. 6A and 6B are partially enlarged explanatory views showing the relationship between a cavity-side unmoldable surface and a cavity-side concave connection surface of a molded product. FIG. 5A is an explanatory view showing a state where a cavity-side unmoldable surface and a cavity-side adjacent surface are concavely connected to each other. FIG. 5B is an explanatory view showing a state where a cavity-side unmoldable surface and a cavity-side adjacent surface are convexly connected to each other.

C105B: First Adjacent Unmoldable Portion Determination Unit

The first adjacent unmoldable portion determination unit C105B has a first adjacent surface determination unit C105B1, a first connection angle arithmetic unit C105B2, and a first concave connection determination unit C105B3. As shown in FIGS. 6A and 6B, it is assumed that the surface which is determined by the first unmoldable portion determination unit C105A as the cavity-side unmoldable portions (M1 to M3) is a cavity-side unmoldable surface M1, and the surface which is determined as not the cavity-side unmoldable surface M1 and is adjacent to the cavity-side unmoldable surface M1 is a cavity-side adjacent surface M2 or M2'. In this case, the first adjacent unmoldable portion determination unit C105B determines that a cavity-side concave connection surface M2, which is the cavity-side adjacent surface M2 concavely connected to the cavity-side unmoldable surface M1, is the cavity-side unmoldable portion (M2).

C105B1: First Adjacent Surface Determination Unit

The first adjacent surface determination unit C105B1 determines whether or not each surface which is determined as not the cavity-side unmoldable surface M1 is the cavity-side adjacent surface M2 or M2' shown in FIG. 5A or 5B. That is, the first adjacent surface determination unit C105B1 determines whether or not a surface adjacent to each surface, which is determined as not the cavity-side unmoldable surface M1, is the cavity-side unmoldable portion (M1 to M3).

C105B2: First Connection Angle Arithmetic Unit

The first connection angle arithmetic unit C105B2 calculates a connection angle $\alpha$ or $\alpha'$ serving as a first connection angle between the cavity-side adjacent surface M2 or M2' and the cavity-side unmoldable surface M1 adjacent to the cavity-side adjacent surface M2 or M2' shown in FIG. 5A or 5B. The first connection angle arithmetic unit C105B2 of the third embodiment calculates the connection angle $\alpha$ or $\alpha'$ on the basis of the normal vector (h1 to h16) serving as an example of a first normal line on the cavity-side unmoldable surface M1 and the normal vector (h1 to h16) serving as an example of a second normal line on the cavity-side adjacent surface M2 or M2'.

C105B3: First Concave Connection Determination Unit

The first concave connection determination unit C105B3 determines whether or not the cavity-side unmoldable surface M1 and the cavity-side adjacent surface M2 or M2' are concavely connected to each other, that is, the cavity-side adjacent surface M2 or M2' is the cavity-side concave connection surface M2. The first concave connection determination unit C105B3 of the third embodiment determines whether or not the connection angle $\alpha$ or $\alpha$ calculated by the first connection angle arithmetic unit C105B2 is less than a prescribed concave connection determination value $\alpha_{max}$, thereby determining whether or not the cavity-side unmoldable surface M1 and the cavity-side adjacent surface M2 or M2' are concavely connected to each other. In the third embodiment, for example, the concave connection determination value $\alpha_{max}$ may be set to 180° in advance. Therefore, the first adjacent unmoldable portion determination unit C105B of the third embodiment determines that the cavity-side concave connection surface M2 concavely connected to the cavity-side unmoldable portion (M1 to M3) is the cavity-side unmoldable portion (M1 and M2).

Figure 22A:
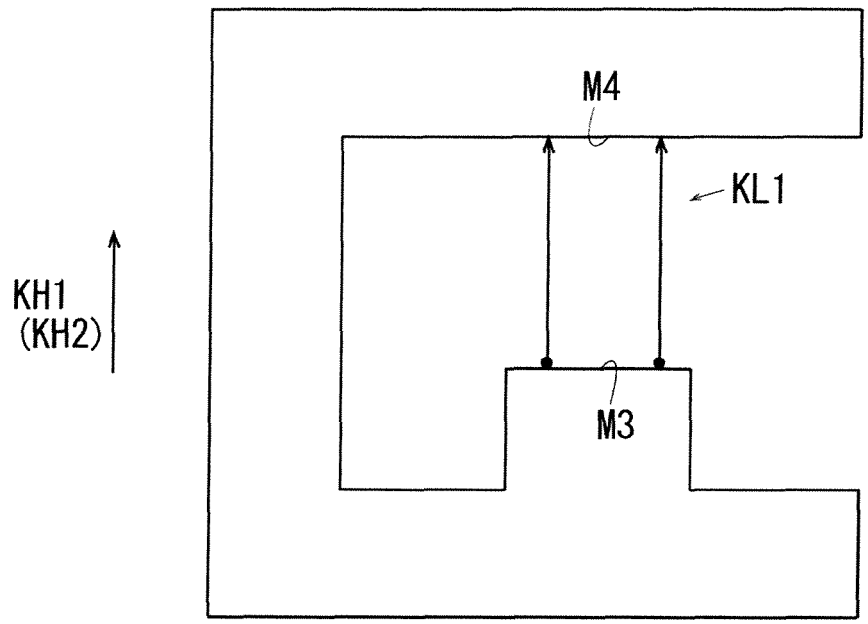
FIGS. 22A and 22B are partially enlarged explanatory view of a cavity direction line which extends from a cavity-side projection surface of a molded product.
Figure 22B:
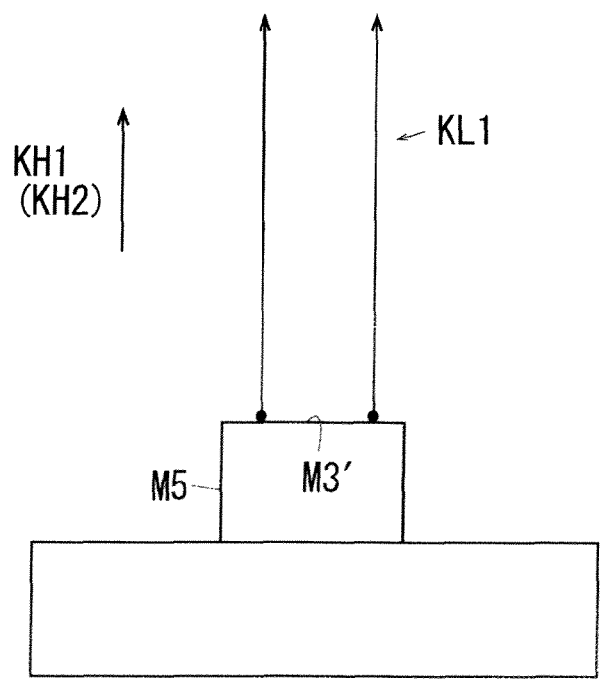

FIGS. 7A and 7B are partially enlarged explanatory view of a cavity direction line which extends from a cavity-side projection surface of a molded product. FIG. 22A is a sectional view showing a state where there is a surface which a cavity direction line reaches. FIG. 22B is a sectional view showing a state where there is no surface which a cavity direction line reaches.

C105C: First Projection Unmoldable Portion Determination Unit

The first projection unmoldable portion determination unit C105C has a first projection line reach determination unit C105C1 and a stand wall determination unit C105C2. As shown in FIGS. 7A and 7B, when it is assumed that each surface (M2') is a cavity-side projection surface M3 or M3', the first projection unmoldable portion determination unit C105C determines on the basis of a cavity direction line KL1 serving as an example of a first mold pull direction line extending from the cavity-side projection surface M3 or M3' in the cavity direction KH1 whether or not the cavity-side projection surface M3 or M3' is the cavity-side unmoldable portion (M1 to M3). In regards to each surface (M2') which is not determined as the cavity-side unmoldable portion (M1, M2) by the first unmoldable portion determination unit C105A and the first adjacent unmoldable portion determination unit C105B, the first projection unmoldable portion determination unit C105C of the third embodiment determines whether or not the cavity-side projection surface M3 or M3' is the cavity-side unmoldable portion (M1 to M3).

C105C1: First Projection Line Reach Determination Unit

As shown in FIGS. 7A and 7B, the first projection line reach determination unit C105C1 determines whether or not there is a surface M4 which the cavity direction line KL1 extending from the cavity-side projection surface M3 or M3' reaches. Therefore, the first projection unmoldable portion determination unit C105C of the third embodiment determines that the cavity-side projection surface M3 having the surface M4 is the cavity-side unmoldable portions M1 to M3.

C105C2: Stand Wall Determination Unit

The stand wall determination unit C105C2 determines whether or not there is a stand wall M5 shown in FIG. 22B, which is a surface adjacent to the cavity-side projection surface M3' not having the surface M4 and in parallel to the cavity direction line KL1. Therefore, the first projection unmoldable portion determination unit C105C of the third embodiment determines that the cavity-side projection surface M3' not having the surface M4 and the stand wall M5 are not the cavity-side unmoldable portions M1 to M3.

C105D: First Unmoldable Portion Setting Storage Unit

The first unmoldable portion setting storage unit C105D sets and stores the surfaces M1 to M3, which are determined as the cavity-side unmoldable portions M1 to M3 by the first unmoldable portion determination unit C105A, the first adjacent unmoldable portion determination unit C105B, and the first projection unmoldable portion determination unit C105C, as the cavity-side unmoldable portions M1 to M3, respectively.

If a mark "'" is suffixed to each of reference numerals C105A, C105A1, C105A2, C105B, C105B1 to C105B3, C105C, C105C1, C105C2, and C105D, and the terms "first", "female mold", "cavity", "KH1", and "KL1" are substituted with the terms "second", "male mold", "core", "KH2", and "KL2", respectively, the descriptions of the first unmoldable portion determination unit C105A, the first adjacent unmoldable portion determination unit C105B, the first projection unmoldable portion determination unit C105C, and the first unmoldable portion setting storage unit C105D can also be applied to the second unmoldable portion determination unit C105A', the second adjacent unmoldable portion determination unit C105B', the second projection unmoldable portion determination unit C105C', and the second unmoldable portion setting storage unit C105D', the detailed descriptions of which will therefore be omitted.

C105E: Unmoldable Portion Determination Unit

The unmoldable portion determination unit C105E has a third moldable portion determination unit C105E1 and determines whether or not the cavity-side unmoldable portions M1 to M3 stored in the first unmoldable portion setting storage unit C105D are the unmoldable portion (M8) to be unmoldable by movement of the male mold in the core direction KH2 and movement of a slide core, which is an example of a third mold other than the female mold and the male mold, in a standard slide direction KH3, which is an example of a third mold pull direction other than the cavity direction KH1 and the core direction KH2. The unmoldable portion determination unit C105E also determines whether or not the core-side unmoldable portions M1 to M3 stored in the second unmoldable portion setting storage unit C105D' are the unmoldable portion (M8) to be unmoldable by movement of the female mold in the cavity direction KH1 and movement of the slide core in the standard slide direction KH3.

When the mold pull direction input determination unit C101A determines that the +Z direction is input as the cavity direction KH1 and the −Z direction is input as the core direction KH2, the standard slide direction KH3 of the third embodiment is set in advance so as to be a line, which connects the cavity direction line KL1 and the core direction line KL2, that is, a line on an XY plane orthogonal to a line in the Z-axis direction. Specifically, when the cavity direction line KL1 is a line in the +Z direction and the core direction line KL2 is a line in the −Z direction, a standard slide direction line KL3 is set in advance so as to be lines in four directions, that is, a +X direction as the front-back direction and a ±Y direction as the right-left direction.

C105E1: Third Moldable Portion Determination Unit

The third moldable portion determination unit C105E1 has a third projection line reach determination unit C105E1a, and determines the cavity-side unmoldable portions M1 to M3, at which it is determined by the second projection line reach determination unit C105C1' that there is a surface M4 which the core direction line KL2 reaches and there is no surface which the standard slide direction line KL3, serving as an example of a third mold pull direction line, extending in the standard slide direction KH3 reaches, as a third moldable portion (M6 and M7) to be moldable by movement of the slide core in the standard slide direction KH3. The third moldable portion determination unit C105E1 also determines the core-side unmoldable portions M1 to M3, at which it is determined by the first projection line reach determination unit C105C1 that there is a surface M4 which the cavity direction line KL1 reaches, and there is no surface which the standard slide direction line KL3 reaches, as the third moldable portion (M6 and M7).

C105E1a: Third Projection Line Reach Determination Unit

When the second projection line reach determination unit C105C1' determines that there is a surface M4 which the core direction line KL2 reaches, the third projection line reach determination unit C105E1a determines whether or not there is a surface which the standard slide direction line KL3 reaches from the cavity-side unmoldable portions M1 to M3 stored in the first unmoldable portion setting storage unit C105D. If the first projection line reach determination unit C105C1 determines that there is a surface M4 which the cavity direction line KL1 reaches, the third projection line reach determination unit C105E1a also determines whether or not there is a surface which the standard slide direction line KL3 reaches from the core-side unmoldable portions M1 to M3 stored in the second unmoldable portion setting storage unit C105D'.

Figure 23A:
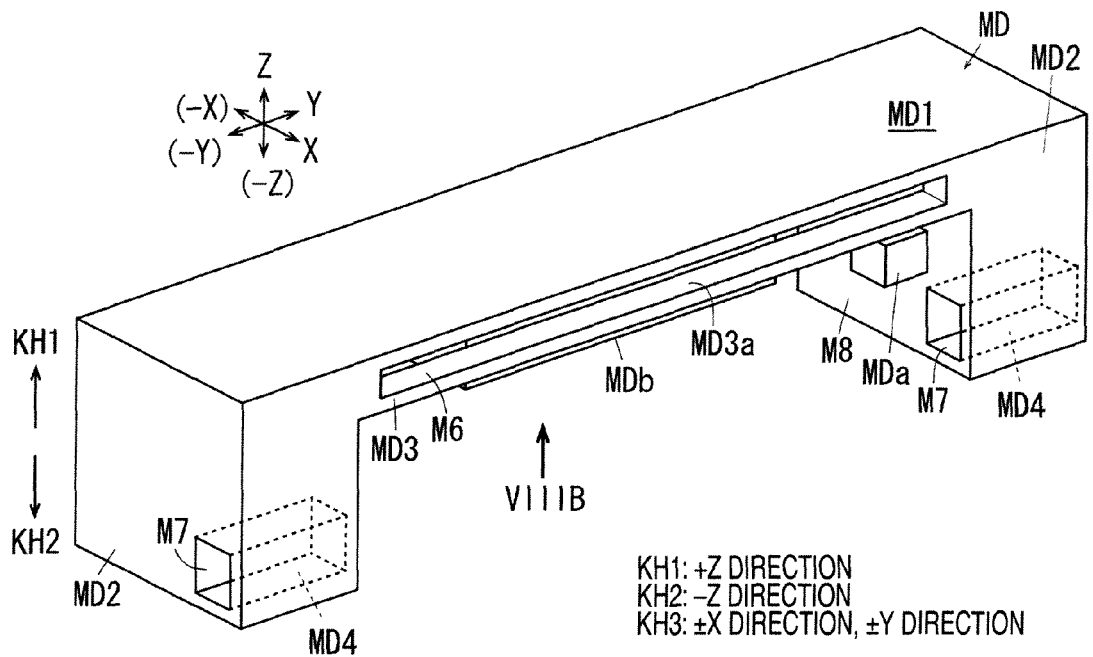
FIGS. 23A and 23B are explanatory views of an unmoldable portion and a third moldable portion of the third exemplary embodiment.
Figure 23B:
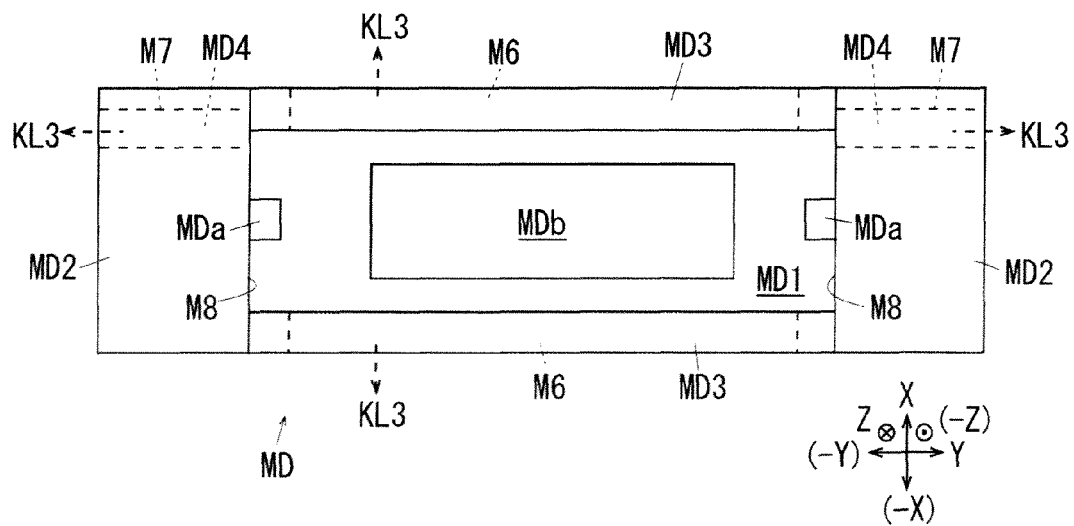

FIGS. 8A and 8B are explanatory views of an unmoldable portion and a third moldable portion of the third embodiment. FIG. 23A is a perspective explanatory view of a model of a molded product in which a cavity direction and a core direction are set to be in the up and down directions. FIG. 23B is an explanatory view showing when FIG. 23A is viewed from a VIIIB direction, which is a cavity direction.

As shown in FIGS. 8A and 8B, in regards to a model MD of the molded product, when the cavity direction line KL1 and the core direction line KL2 are set as lines in the ±Z directions, respectively, and the standard slide direction line KL3 is set as lines in the ±X direction as a lateral direction of the model MD and lines in the ±Y direction as a longitudinal direction, the third projection line reach determination unit C105E1a of the third embodiment determines whether or not there is a surface which the standard slide direction line KL3 reaches with respect to each of the surfaces (M6 to M8) which are the cavity-side unmoldable portions M1 to M3 or the core-side unmoldable portions M1 to M3 of the molded product.

As shown in FIGS. 8A and 8B, the model MD of the third embodiment has a top plate MD1 that extends in the Y-axis direction, that is, the right-left direction, and leg portions MD2 and MD2 that extend from both left and right ends of the top plate MD1 in the −Y direction, that is, downward. Keel portions MD3 and MD3 are formed at both front and back ends of the top plate MD1 in the right-left direction to extend downward. In each of the keel portions MD3 and MD3, a rectangular through hole MD3a is formed to extend in the right-left direction and pass through the keel portion MD3 in the front-back direction. Rectangular through holes MD4 and MD4 are individually formed at the front-side lower ends of the leg portions MD2 and MD2 to pass through the leg portions MD2 and MD2 in the right-left direction. First prismatic protrusions MDa and MDa are formed at the central portions of the inner surfaces of the leg portions MD2 and MD2, respectively, to protrude inward, and a second prismatic protrusion MDb is formed to protrude from the central portion of a lower end surface of the top plate MD1 downward.

Focusing on the surfaces M6, M7, and M8 which become the cavity-side unmoldable portions M1 to M3 and the core-side unmoldable portions M1 to M3, in case of the surface M6, no surface exists in the +X direction, and in case of the surface M7, no surface exists in the ±Y directions. In case of the surface M8, surfaces exists in all of the ±X direction and the ±Y direction, that is, the surfaces of the protrusions MDa, MDa, and MDb exist. For this reason, in regards to the surfaces M6 and M7 the third projection line reach determination unit C105E1a determines that there is no surface which the standard slide direction line KL3 reaches. In regards to the surface M8, it is determined that there is a surface which the standard slide direction line KL3 reaches.

Therefore, the third moldable portion determination unit C105E1 of the third embodiment determines that the surfaces M6 and M7 are the third moldable portion, and also determines that the surface M8 is not the third moldable portion, That is, the unmoldable portion determination unit C105E of the third embodiment determines that the surface M8 is the unmoldable portion, and also determines that the surfaces M6 and M7 are not the unmoldable portion.

C105F: Unmoldable Portion Setting Storage Unit

The unmoldable portion setting storage unit C105F sets and stores the surface M8, which is determined as the unmoldable portion M8 by the unmoldable portion determination unit C105E, as the unmoldable portion M8.

C105G: Third Moldable Portion Setting Storage Unit

The third moldable portion setting storage unit C105G sets and stores the surfaces M6 and M8, which are determined as the third moldable portions M6 and M7 by the third moldable portion determination unit C105E1, as the third moldable portions M6 and M7.

C105H: Moldable Portion Setting Storage Unit

The moldable portion setting storage unit C105H sets and stores the surfaces (M3' and M5), which are not determined as the cavity-side unmoldable portions M1 to M3 and the core-side unmoldable portions M1 to M3 by the first projection unmoldable portion determination unit C105C and the second projection unmoldable portion determination unit C105C', as moldable portions M3' and M5, which are surfaces with no undercut. The moldable portion setting storage unit C105H also sets and stores the cavity-side unmoldable portions M1 to M3 and the core-side unmoldable portions M1 to M3, which are not determined as the unmoldable portion M8 and the third moldable portions M6 and M7 by the unmoldable portion determination unit C105E and the third moldable portion determination unit C105E1, as the moldable portions M1 to M3.

C105J: Unmoldable Portion Display Unit

The unmoldable portion display unit C105J serving as an example of a molded product display unit displays all the unmoldable portions M8 stored in the unmoldable portion setting storage unit C105F on the molded product image 1. The unmoldable portion display unit C105J of the third embodiment displays all the unmoldable portions M8 with red on the molded product image 1.

C105K: Third Moldable Portion Display Unit

The third moldable portion display unit C 051K serving as an example of a molded product display unit displays all the third moldable portions M6 and M7 stored in the third moldable portion setting storage unit C105G on the molded product image 1. The third moldable portion display unit C115K of the third embodiment displays all the third moldable portions M6 and M7 with red on the molded product image 1

C106: Unnecessary Boundary Detection Unit

An unnecessary boundary detection unit C106 has a midpoint arithmetic unit C106A, a normal line determination unit C106B, a curvature arithmetic unit C106C, a curvature determination unit C106D serving as an example of a curved state determination unit, an unnecessary boundary setting storage unit C106E, a necessary boundary setting storage unit C106F, and an unnecessary boundary display unit C106G. When the unnecessary boundary detection button 3 is selected, the unnecessary boundary detection unit C106 executes the unnecessary boundary detection processing for detecting the unnecessary boundary (L1).

FIGS. 7A and 7B are partially enlarged explanatory views showing the relationship between a first normal vector of a first surface and a second normal vector of a second surface at a midpoint of a boundary of a molded product. FIG. 7A is an explanatory view illustrating a case where a first normal vector and a second normal vector are of the same direction. FIG. 7B is an explanatory view illustrating a case where a first normal vector and a second normal vector are of different directions.

C106A: Midpoint Arithmetic Unit

The midpoint arithmetic unit C106A calculates a midpoint P on the basis of the coordinates of both ends of each boundary L shown in FIGS. 7A and 7B.

C106B: Normal Line Determination Unit

As shown in FIG. 7A, if it is assumed that two surfaces, which are connected to each other by the boundary L, are a first surface FM1 and a second surface FM2, a normal vector of the first surface FM1 is a first normal vector HV1, and a normal vector of the second surface FM2 is a second normal vector HV1, the normal line determination unit C106B determines whether or not the first normal vector HV1 and the second normal vector HV2 are of the same direction at the midpoint P calculated by the normal line arithmetic unit C104.

FIGS. 8A and 8B are partially enlarged explanatory views showing the relationship between a u1 direction curvature and a v1 direction curvature of a first surface and a u2 direction curvature and a v2 direction curvature of a second surface at a midpoint of a boundary of a molded product. FIG. 8A is an explanatory view showing a case where the u1 direction curvature and the v1 direction curvature, and the u2 direction curvature and the v2 direction curvature are the same. FIG. 8B is an explanatory view showing a case where the u1 direction curvature and the v1 direction curvature are different from the u2 direction curvature and the v2 direction curvature.

C106C: Curvature Arithmetic Unit

The curvature arithmetic unit C106C calculates the curvatures (Ku1, Kv1, Ku2, and Kv2) of the first surface FM1 and the second surface FM2. If the first normal vector HV1 and the second normal vector HV2 are of the same direction, as shown in FIGS. 8A and 8B, the curvature arithmetic unit C106C of the third embodiment calculates, at the midpoint P, a u1 direction curvature Ku1 that is a curvature in a u1 direction, which is an example of a u direction of the grid line on the first surface FM1, a v1 direction curvature Kv1 that is a curvature in a v1 direction, which is an example of a v direction of the grid line, a u2 direction curvature Ku2 that is a curvature in a u2 direction, which is an example of a u direction of the grid line on the second surface FM2, and a v2 direction curvature Kv2 that is a curvature in a v2 direction, which is an example of a v direction of the grid line. In the third embodiment, first curvatures Ku1 and Kv1 are defined as the u1 direction curvature Ku1 and the v1 direction curvature Kv1, respectively. Second curvatures Ku2 and Kv2 are defined as the u2 direction curvature Ku2 and the v2 direction curvature Kv2, respectively.

C106D: Curvature Determination Unit

As shown in FIG. 8A, the curvature determination unit C106D determines whether or not the first curvatures Ku1 and Kv1 of the first surface FM1 calculated by the curvature arithmetic unit C106C, and the second curvatures Ku2 and Kv2 of the second surface FM2 are the same, thereby determining whether or not a first curved state, which is a curved state of the first surface FM1 at the boundary L, is the same as a second curved state, which is a curved state of the second surface FM2 at the boundary L. When the u1 direction curvature Ku1 and the u2 direction curvature Ku2 are the same and the v1 direction curvature Kv1 and the v2 direction curvature Kv2 are the same, or when the u1 direction curvature Ku1 and the v2 direction curvature Kv2 are the same and the u2 direction curvature Ku2 and the v1 direction curvature Kv1 are the same, that is, when the conditions Ku1=Ku2 and Kv1=Kv2 are satisfied, or when the conditions Ku1=Kv2 and Ku2=Kv1 are satisfied, the curvature determination unit C106D of the third embodiment determines that the curvatures Ku1 and Kv1 of the first surface FM1, and the curvatures Ku2 and Kv2 of the second surface FM2 are the same. Therefore, if it is determined that the normal vectors HV1 and HV2 are of the same direction, and the first curvatures Ku1 and Kv1 of the first surface FM1, and the second curvatures Ku2 and Kv2 of the second surface FM2 are the same, the unnecessary boundary detection unit C106 of the third embodiment determines that the boundary L is the unnecessary boundary L1 which divides the first surface FM1 and the second surface FM2, which should be the same surface.

C106E: Unnecessary Boundary Setting Storage Unit

The unnecessary boundary setting storage unit C106E sets and stores as the unnecessary boundary L1 each boundary L, shown in FIG. 8A, which is determined as the unnecessary boundary L1.

C106F: Necessary Boundary Setting Storage Unit

The necessary boundary setting storage unit C106F sets and stores each boundary L, shown in FIGS. 7B and 10B, which is not determined as the unnecessary boundary L1, as a necessary boundary L2, which is a necessary boundary.

C106G: Unnecessary Boundary Display Unit

The unnecessary boundary display unit C106G displays all the unnecessary boundaries L1 stored in the unnecessary boundary setting storage unit C106E with colors on the molded product image 1.

C107: Wedge-Shaped Uneven Portion Detection Unit

A wedge-shaped uneven portion detection unit C107 has a midpoint arithmetic unit C107A, a wedge shape determination unit C107B, a normal direction movement point arithmetic unit C107C, an unevenness determination unit C107D, a wedge-shaped concave portion setting storage unit C107E, a wedge-shaped convex portion setting storage unit C107F, a non-wedge-shaped uneven portion setting storage unit C107G, and a wedge-shaped uneven portion display unit C107H. When the wedge-shaped uneven portion detection button 4 is selected, the wedge-shaped uneven portion detection unit C107 executes a wedge-shaped uneven portion detection processing for detecting a wedge-shaped uneven portion (E1+E2) including a wedge-shaped concave portion (E1) or a wedge-shaped convex portion (E2), called a sharp edge.

FIGS. 9A and 9B are enlarged sectional explanatory views of a wedge-shaped uneven portion, which is formed in a molded product. FIG. 9A is a sectional view of a wedge-shaped concave portion. FIG. 9B is a section view of a wedge-shaped convex portion.

C107A: Midpoint Arithmetic Unit

Similarly to the midpoint arithmetic unit C106A, the midpoint arithmetic unit C107A calculates a midpoint P on the basis of the coordinates of both ends of each boundary L shown in FIGS. 9A and 9B.

C107B: Wedge Shape Determination Unit

The wedge shape determination unit C107B determines whether or not a connection angle $\beta$ or $\beta'$, which is an angle between the first surface FM1 and the second surface FM2 connected by the boundary L shown in FIGS. 9A and 9B with respect to the boundary L, is less than a wedge shape determination value $\beta_{max}$. Similarly to the first connection angle arithmetic unit C105B2, in the wedge shape determination unit C107B7 the connection angle $\beta$ or $\beta'$ is calculated on the basis of an angle $\gamma$ or $\gamma'$ between the first normal vector HV1 of the first surface FM1 and the second normal vector HV2 of the second surface FM2 at the midpoint P. That is, $\beta=|360°-(90°\times2)-\gamma|=|180°-\gamma|$ and $\beta'=|360°-(90°\times2)-\gamma'|=|180(-('$ (are calculated. In the third embodiment, for example, the wedge shape determination value (max may be set to 60 (in advance.

C107C: Normal Direction Movement Point Arithmetic Unit

The normal direction movement point arithmetic unit C107C calculates a normal direction movement point Q which is moved to a point in a direction of a normal line calculated from the normal line calculation point P. As shown in FIGS. 9A and 9B, the normal direction movement point arithmetic unit C107C calculates the normal direction movement point Q which is moved to a point in a direction of the first normal vector HV1 at the midpoint P. In the third embodiment, a normal direction movement distance LH1, which is a distance between the midpoint P and the normal direction movement point Q, may be set to a value sufficiently smaller than the thickness of each surface of the molded product. For example, the normal direction movement distance LH1 may be set to 0.1 [mm]. Although in the third embodiment, the normal direction movement point Q which is moved in a direction of the first normal vector HV1 at the midpoint P is calculated, the invention is not limited thereto. For example, a normal direction movement point which is moved in a direction of the second normal vector HV2 by the normal direction movement distance LH1 may be calculated.

C107D: Unevenness Determination Unit

The unevenness determination unit C107D determines whether the first surface FM1 and the second surface FM2 are connected to each other concavely or convexly through the boundary L. As shown in FIG. 9A, when the normal direction movement point Q is a point inside the molded product, the unevenness determination unit C107D of the third embodiment determines that the first surface FM1 and the second surface FM2 are concavely connected to each other. As shown in FIG. 9B, when the normal direction movement point Q is a point on a space, the unevenness determination unit C107D determines that the first surface FM1 and the second surface FM2 are convexly connected to each other. Therefore, if it is determined that the connection angle β or β' is less than the wedge shape determination value $β_{max}$, and the first surface FM1 and the second surface FM2 are concavely connected to each other, the wedge-shaped uneven portion detection unit C107 of the third embodiment determines that the wedge-shaped concave portion E1 is formed by the boundary L, and the first and second surfaces FM1 and FM2. If it is determined that the connection angle β or β' is less than the wedge shape determination value $β_{max}$, and the first surface FM1 and the second surface FM2 are convexly connected to each other, the wedge-shaped uneven portion detection unit C107 determines that the wedge-shaped convex portion E2 is formed by the boundary L and the first and second surfaces FM1 and FM2.

C107E: Wedge-Shaped Concave Portion Setting Storage Unit

The wedge-shaped concave portion setting storage unit C107E sets and stores as the wedge-shaped concave portion E1 the boundary L and the first and second surfaces FM1 and FM2, shown in FIG. 9A, which are determined as the wedge-shaped concave portion E1.

C107F: Wedge-Shaped Convex Portion Setting Storage Unit

The wedge-shaped convex portion setting storage unit C107F sets and stores as the wedge-shaped convex portion E2 the boundary L and the first and second surfaces FM1 and FM2, shown in FIG. 9B, which are determined as the wedge-shaped convex portion E2.

C107G: Non-Wedge-Shaped Uneven Portion Setting Storage Unit

The non-wedge-shaped uneven portion setting storage unit C107G sets and stores the boundary L and the first and second surfaces FM1 and FM2, which are not determined as the wedge-shaped concave portion E1 or the wedge-shaped convex portion E2, as a non-wedge-shaped uneven portion with no wedge-shaped uneven portion E1+E2.

C107H: Wedge-Shaped Uneven Portion Display Unit

The wedge-shaped uneven portion display unit C107H displays all the wedge-shaped concave portions E1 stored in the wedge-shaped concave portion setting storage unit C107E and all the wedge-shaped convex portions E2 stored in the wedge-shaped convex portion setting storage unit C107F with different colors on the molded product image 1.

C108: Drawing Completion Determination Unit

A drawing completion determination unit C108 determines whether or not the design support system S completes drawing of a molded product. The drawing completion determination unit C108 of the third embodiment determines whether or not a user inputs an instruction to end the design support program AP1, thereby determining whether or not the design support system S completes drawing of a molded product.

(Description of Controller of License Server LSV)

Referring to FIGS. 2 and 3 similarly to the computer main body H1 of the client personal computer PC, the computer main body H1 of the license server LSV has an input/output interface, a ROM, a RAM, a CPU, a clock oscillator, and the like. The computer main body H1 executes programs stored in the hear disc or the ROM, thereby implementing various functions. The hard disc of the license server LSV stores application programs, such as an operating system OS, a design support authentication program AP1' for transmitting licensing information of the design support system S to the client personal computer PC. Hereinafter, the functions (control unit) of the design support authentication program AP1 will be described.

(Design Support Authentication program AP1')

The design support authentication program AP1' has a registration application information receiving unit C1' that receives the registration application information from the client personal computer PC, a licensing information transmitting unit C2' that transmits the licensing information, and a registration application information storage unit C3' that stores the registration application information. The license server LSV of the third embodiment transmits/receives information with respect to the client personal computer PC, and transfers the licensing information on the basis of the registration application information to thereby permit the use of the design support system S.

Description of Flowchart of Third Embodiment

Next, the flow of a processing of the design support program AP2 in the client personal computer PC according to the third embodiment will be described with reference to a flowchart. The processing corresponding to the design support authentication program AP1' in the client personal computer PC and the license server LSV is just as follows: the client personal computer PC transmits the registration application information, and receives and stores the licensing information; and the license server LSV transmits and stores the registration application information, and receives the licensing information. Therefore, detailed description thereof will be omitted.

Figure 24:
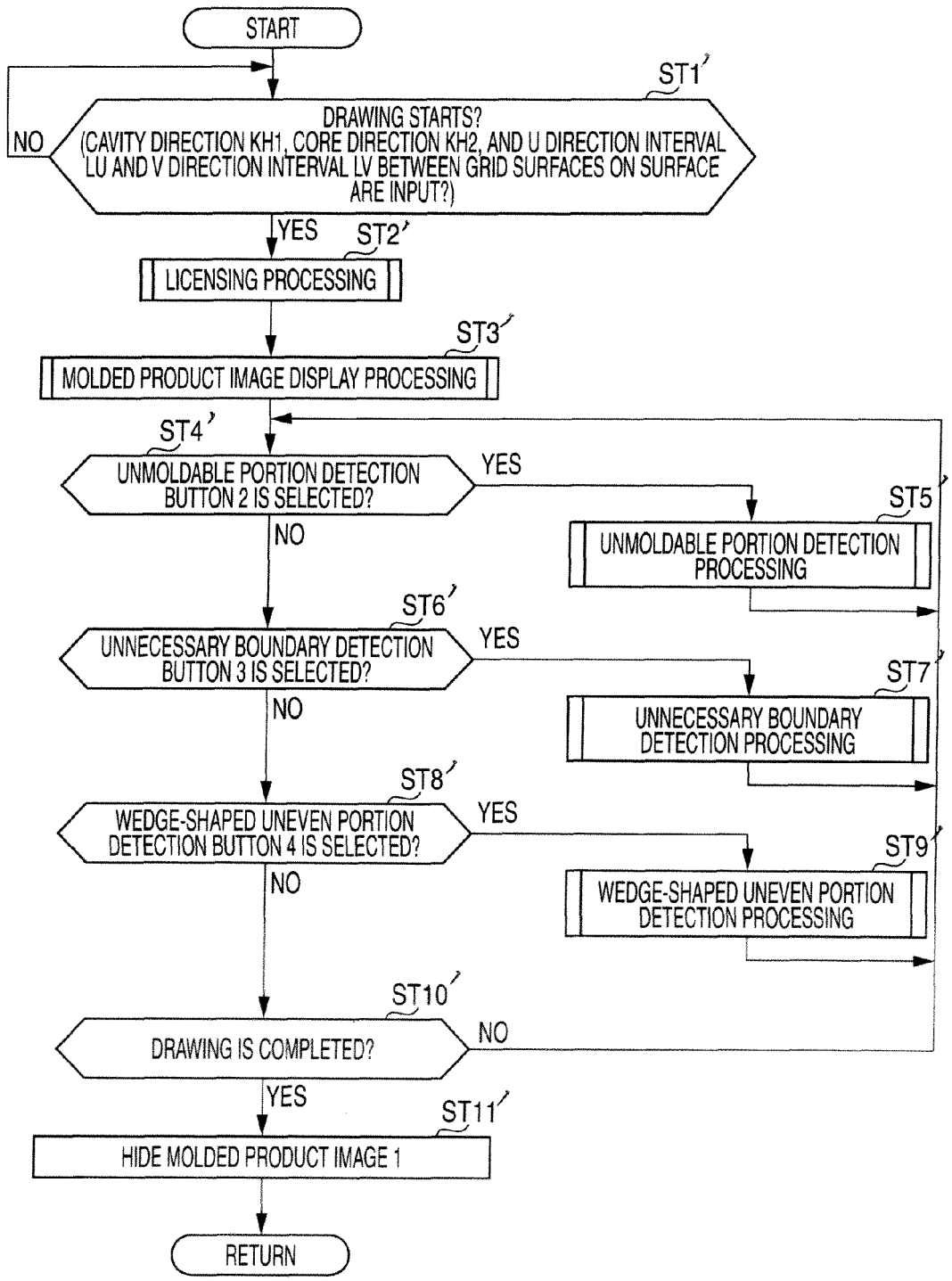
FIG. 24 is a flowchart of a main processing of a design support program according to the third exemplary embodiment.

Description of Flowchart of Main Processing of Design Support Program AP2' in Third Embodiment FIG. 24 is a flowchart of a main processing of a design support program according to the third embodiment.

The STs (Steps) of the flowchart shown in FIG. 24 are executed in accordance with the programs stored in the ROM or the like of the controller. The STs are executed in parallel to various processing, for example, molded product drawing, in a multitask manner.

The flowchart shown in FIG. 24 starts when the design support program AP1 runs after the client personal computer PC is powered-on.

Referring to FIG. 24, in ST1', it is determined whether or not a user inputs the cavity direction KH1, the core direction KH2, and the u direction interval Lv and the v direction interval Lu between the grid lines. Accordingly, it is determined whether or not the design support system S starts to draw a molded product. If it is determined Yes (Y), the process progresses to ST2', and if it is determined No (N), ST1' is repeatedly executed.

In ST2' a licensing processing is executed to determine on the basis of the licensing information stored in the licensing information storage unit C3 whether or not the client personal computer PC obtains an authorized license of the design support system S. Next, the process progresses to ST3'.

In ST3' as shown in FIG. 4, a molded product image display processing is executed to display the molded product image 1 obtained from molded product information, which is information about a three-dimensional shape of a molded product stored in the molded product information storage unit C103A. Next, the process progresses to ST4'.

In ST4', it is determined whether or not the unmoldable portion detection button 2 of the molded product image 1 is selected. If it is determined Yes (Y), the process progresses to ST5', and if it is determined No (N), the process progresses to ST6'.

Figure 25:
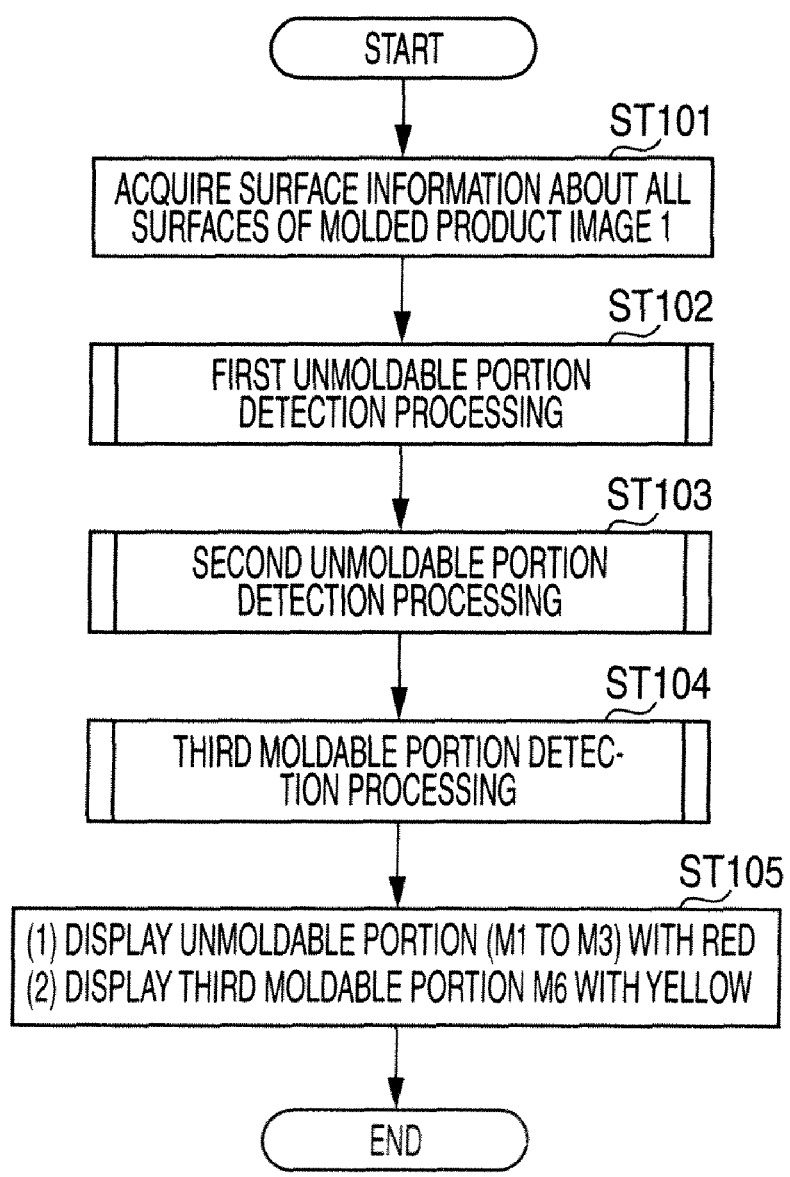
FIG. 25 is a flowchart of an unmoldable portion detection processing, and is an explanatory view of a subroutine of ST5 in FIG. 24.

In ST5', an unmoldable portion detection processing shown in a flowchart of the FIG. 25 is executed to detect the unmoldable portions M1 to M3. Next, the process returns to ST4'.

In ST6', it is determined whether or not the unnecessary boundary detection button 3 of the molded product image 1 is selected. If it is determined Yes (Y), the process progresses to ST7', and if it is determined No (N), the process progresses to ST8'.

In ST7', an unnecessary boundary detection processing shown in a flowchart of FIG. 12 is executed to detect the unnecessary boundary L1. Next, the process returns to ST4'.

In ST8', it is determined whether or not the wedge-shaped uneven portion detection button 4 of the molded product image 1 is selected. If it is determined Yes (Y), the process progresses to ST9', and if it is determined No (N), the process progresses to ST10'.

In ST9', a wedge-shaped uneven portion detection processing shown in a flowchart of FIG. 13 is execute to detect the wedge-shaped uneven portion E1+E2 including a wedge-shaped concave portion E1 or a wedge-shaped convex portion E2. Next, the process returns to ST4'.

In ST10', it is determined whether or not the user inputs an instruction to end the design support program AP1. Accordingly, it is determined whether or not the design support system S completes drawing of a molded product. If it is determined Yes (Y), the process progresses to ST11', and if it is determined No (N), the process returns to ST4'.

In ST11', the molded product image 1 is hidden. Next the process returns to ST1'.

Description of Flowchart of Unmoldable Portion Detection Processing of Design Support Program AP2' in Third Embodiment FIG. 25 is a flowchart of an unmoldable portion detection processing, and is an explanatory view of a subroutine of ST115' in FIG. 24.

Referring to FIG. 25, in ST101, surface information about all the surfaces of the molded product image 1 stored in the surface information storage unit C103A1 is acquired. Next, the process progresses to ST102.

Figure 26:
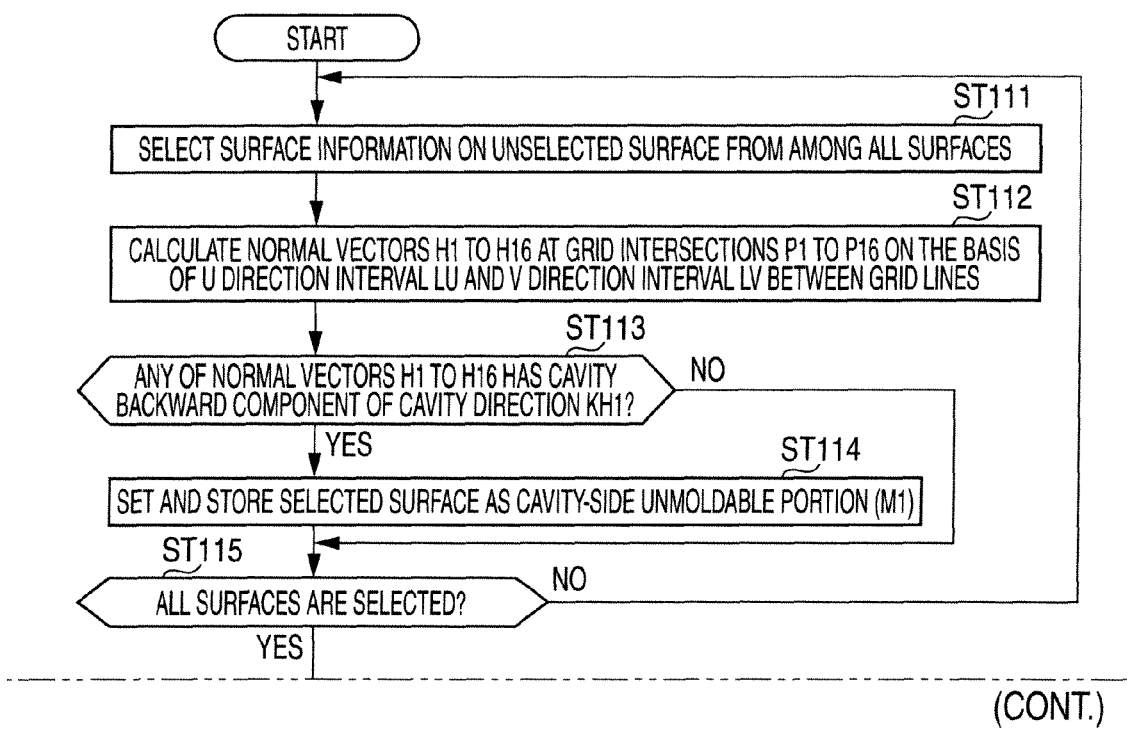
FIG. 26 is a flowchart of a first unmoldable portion detection processing and is an explanatory view of a subroutine of ST102 in FIG. 25.

In ST102, a first unmoldable portion detection processing shown in a flowchart of FIG. 26 is executed to detect the cavity-side unmoldable portions M1 to M3 to be unmoldable only by movement of the female mold in the cavity direction KH1. Next, the process progresses to ST103.

In ST103, a second unmoldable portion detection processing is executed to detect the core-side unmoldable portions M1 to M3 to be unmoldable only by movement of the male mold in the core direction KH2. Next, the process progresses to ST104.

Figure 27:
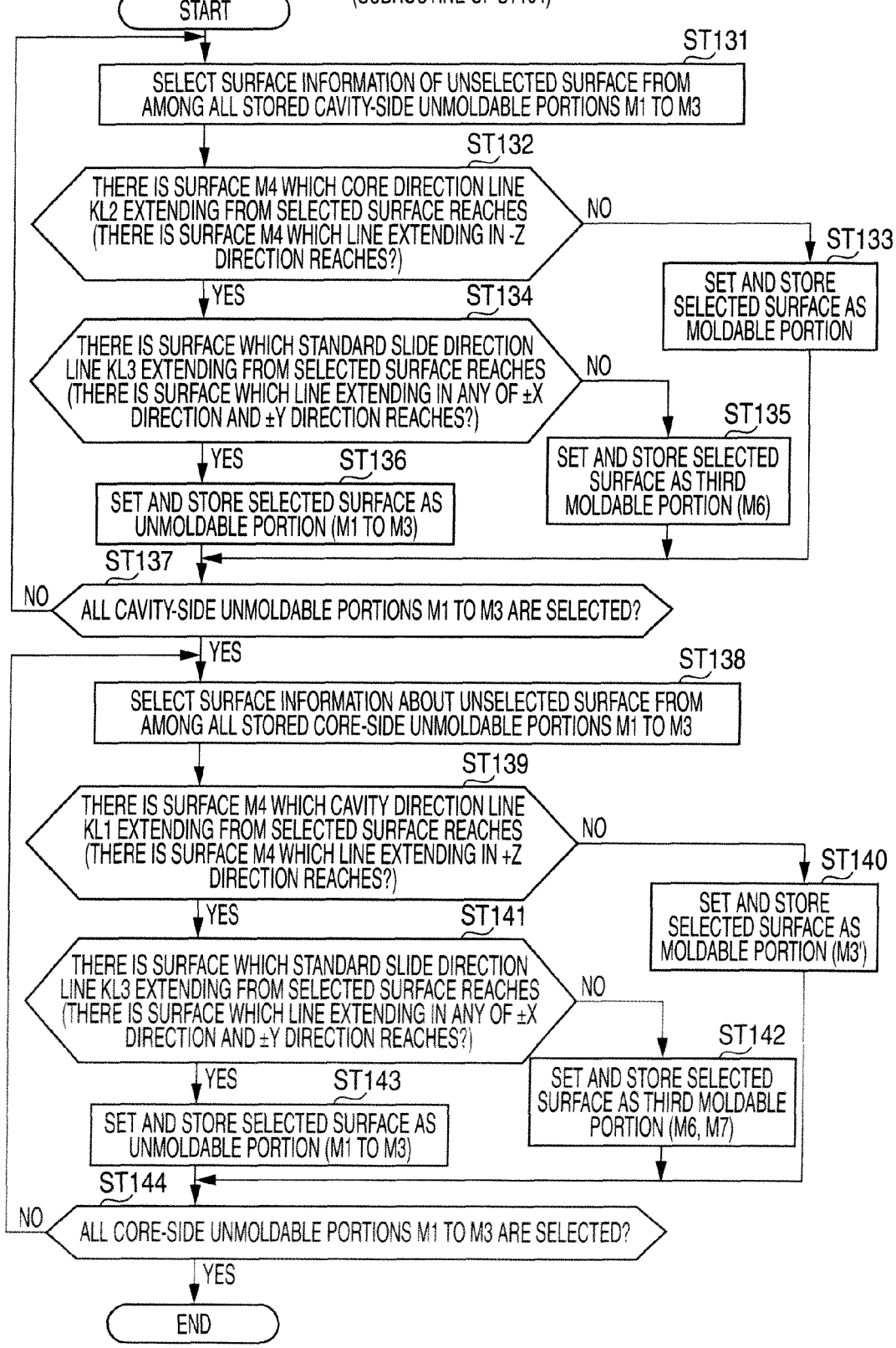
FIG. 27 is a flowchart of a third moldable portion detection processing and is an explanatory view of a subroutine of ST104 in FIG. 25.

In ST104, a third moldable portion detection processing shown in a flowchart of FIG. 27 is executed to determine whether the cavity-side unmoldable portions M1 to M3 and the core-side unmoldable portions M1 to M3 are the unmoldable portion M8 to be unmoldable by movement in the standard slide direction KH3 or the third moldable portions M6 and M7 to be moldable by movement of the slide core in the standard slide direction KH3. Next, the process progresses to ST105.

In ST105, the following substeps (1) and (2) are executed, and then the unmoldable portion detection processing is ended. Thereafter, the process returns to the main processing of FIG. 24.

(1) All the unmoldable portions M8 stored in the unmoldable portion setting storage unit C105E are displayed with red on the molded product image 1.

(2) All the third moldable portions M6 and M7 stored in the third moldable portion setting storage unit C105F are displayed with yellow on the molded product image 1.

Description of Flowchart of First Unmoldable Portion Detection Processing of Design Support Program AP2' in Third Embodiment FIG. 26 is a flowchart of a first unmoldable portion detection processing and is an explanatory view of a subroutine of ST102 in FIG. 25.

If a mark "'" is suffixed to the ST number of each step of the first unmoldable portion detection processing, and the terms "first", "female mold", "cavity", "KH1", "KL1", and "+Z direction" are substituted with the terms "second", "male mold", "core", "KH2", "KL2", and "−Z direction", respectively, the description of the first unmoldable portion detection processing can also be applied to the second unmoldable portion detection processing, the detailed description of which will therefore be omitted.

Referring to FIG. 26, in ST111 surface information about an unselected surface from among all the surfaces is selected. Next, the process progresses to ST112.

In ST112, the normal vectors h1 to h16 of all the grid intersections p1 to p16 shown in FIG. 21 are calculated on the basis of the u direction interval Lu and the v direction interval Lv between the grid lines are calculated. Next, the process progresses to ST113.

In ST113, it is determined whether or not any one of the normal vectors h1 to h16 has a cavity backward component of the cavity direction KH1. If it is determined Yes (Y), the process progresses to ST114, and if it is determined No (N), the process progresses to ST115.

In ST114, the selected surface is set and stored as the cavity-side unmoldable portion (M1). Next, the process progresses to ST115.

In ST115, it is determined whether or not all the surfaces are selected. If it is determined Yes (Y), the process progresses to ST116, and if it is determined No (N), the process returns to ST111.

In ST116, surface information about an unset surface from among the surfaces, excluding the surface set as the cavity-side unmoldable portion (M1), is selected. Next, the process progresses to ST117.

In ST117, it is determined whether or not a surface adjacent to the selected surface is the cavity-side unmoldable surface M1. That is, it is determined whether or not the selected surface is the cavity-side adjacent surface M2. If it is determined Yes (Y), the process progresses to ST118, and if it is determined No (N), the process progresses to ST119.

In ST118, it is determined whether or not the connection angle α or α' between the cavity-side unmoldable surface M1 and the cavity-side adjacent surface M2 shown in FIGS. 6A and 6B is less than a prescribed concave connection determination value $\alpha_{max}$. That is, it is determined that the conditions α<α$_{max}$ and α'<αmax are satisfied, and accordingly it is determined whether or not the cavity-side adjacent surface M2 or M2' is the cavity-side concave connection surface M2. If it is determined No (N), the process progresses to ST119, and if it is determined Yes (Y), the process progresses to ST123.

In ST119, it is determined whether or not there is a surface M4 which the cavity direction line KL1, that is, a line in the +Z direction, extending from the selected surface, that is, the cavity-side projection surface M3 or M3' shown in FIG. 22A or 22B, reaches. If it is determined No (N), the process progresses to ST120, and if it is determined Yes (Y), the process progresses to ST123.

In ST120, the selected surface is set and stored as the moldable portion M3'. Next, the process progresses to ST121.

In ST121, it is determined whether or not there is a stand wall M5 which is adjacent to the selected surface (M3') and in parallel to the cavity direction line KL1. If it is determined Yes (Y), the process progresses to ST122, and if it is determined No (N), the process progresses to ST124.

In ST122, all the stand walls M5 adjacent to the selected surface (M3') are set and stored as the moldable portion M5. Next, the process progresses to ST124.

In ST123, the selected surface is set and stored as the unmoldable portion M2 or M3. Next, the process progresses to ST124.

In ST124, it is determined whether or not there is an unset surface other than the cavity-side unmoldable portions M1 to M3. If it is determined Yes (Y), the process returns to ST116. If it is determined No (N), the first unmoldable portion detection processing ends, and the process returns to the unmoldable portion detection processing of FIG. 25.

Description of Flowchart of Third Moldable Portion Detection Processing of Design Support Program AP2 in Third Embodiment FIG. 27 is a flowchart of a third moldable portion detection processing and is an explanatory view of a subroutine of ST104 in FIG. 25.

Referring to FIG. 27, in ST131, surface information about an unselected surface from among all the cavity-side unmoldable portions M1 to M3 stored in the first unmoldable portion setting storage unit C105D is selected. Next, the process progresses to ST132.

In ST132, it is determined whether or not there is a surface M4 which the core direction line KL2, that is, a line in the −Z direction, extending from the selected surface reaches. If it is determined No (N), the process progresses to ST133, and if it is determined Yes (Y), the process progresses to ST134.

In ST133, the selected surface is set and stored as the moldable portion M3'. Next, the process progresses to ST137.

In ST134, it is determined whether or not there is a surface which the standard slide direction lines KL3 extending from the selected surface shown in FIGS. 8A and 8B reaches, that is, lines in the ±X direction and lines in the ±Y direction reach. If it is determined No (N), the process progresses to ST135, and if it is determined Yes (Y), the process progresses to ST136.

In ST135, the selected surfaces are set and stored as the third moldable portion M6 and M7. Next, the process progresses to ST137.

In ST136, the selected surfaces are set and stored as the unmoldable portions M1 to M3. Next, the process progresses to ST137.

In ST137, it is determined whether or not all the cavity-side unmoldable portions M1 to M3 are selected. If it is determined Yes (Y), the process progresses to ST138, and if it is determined No (N), the process progresses to ST131.

In ST138, surface information about an unselected surface from among all the core-side unmoldable portions M1 to M3 stored in the second unmoldable portion setting storage unit C105D' is selected. Next, the process progresses to ST139.

In ST139, it is determined whether or not there is a surface M4 which the cavity direction line KL1 extending from the selected surface reaches, that is, a line in the +Z direction reaches. If it is determined No (N), the process progresses to ST140, and if it is determined Yes (Y), the process progresses to ST141.

In ST140, the selected surface is set and stored as the moldable portion M3'. Next, the process progresses to ST144.

In ST141, it is determined whether or not there is a surface which the standard slide direction line KL3 extending from the selected surface shown in FIGS. 8A and 8B, that is, lines in the ±X direction and lines in the ±Y direction. If it is determined No (N) the process progresses to ST142, and if it is determined Yes (Y), the process progresses to ST143.

In ST142, the selected surfaces are set and stored as the third moldable portions M6 and M7. Next, the process progresses to ST144.

In ST143, the selected surfaces are set and stored as the unmoldable portions M1 to M3. Next, the process progresses to ST144.

In ST144, it is determined whether or not all the core-side unmoldable portions M1 to M3 are selected. If it is determined No (N), the process returns to ST138. If it is determined Yes (Y), the third moldable portion detection processing ends, and the process returns to the unmoldable portion detection processing of FIG. 25.

Description of Flowchart of Unnecessary Boundary Detection Processing of Design Support Program AP2 in Third Embodiment FIG. 12 is a flowchart of an unnecessary boundary detection processing and is an explanatory view of a subroutine of ST7 in FIG. 24.

Referring to FIG. 12, in ST201, boundary information about all the boundaries L of the molded product image 1 stored in the boundary information storage unit C103A2 is acquired. Next, the process progresses to ST202.

In ST202, boundary information about an unselected boundary L from among all the boundaries L is selected. Next, the process progresses to ST203.

In ST203, surface information about the first surface FM1 and the second surface FM2 connected to each other through the selected boundary L is acquired. Next, the process progresses to ST204.

In ST204, the following substeps (1) and (2) are executed, and then the process progresses to ST205.

(1) At the midpoint P of the selected boundary, L, the first normal vector HV1 of the first surface FM1 is calculated.

(2) At the midpoint P of the selected boundary L, the second normal vector HV2 of the second surface FM2 is calculated.

In ST205, it is determined whether or not the first normal vector HV1 and the second normal vector HV2 are of the same direction. If it is determined Yes (Y), the process progresses to ST206, and if it is determined No (N), the process progresses to ST210.

In ST206, the following substeps (1) and (2) are executed, and then the process progresses to ST207.

(1) At the midpoint P of the selected boundary L, the u1 direction curvature Ku1 and the v1 direction curvature Kv1 of the first surface FM1 are calculated.

(2) At the midpoint P of the selected boundary L, the u2 direction curvature Ku2 and the v2 direction curvature Kv2 of the second surface FM2 are calculated.

In ST207, it is determined whether or not the u1 direction curvature Ku1 and the u2 direction curvature Ku2 are the same, and the v1 direction curvature Kv1 and the v2 direction curvature Kv2 are the same. That is, it is determined whether or not the conditions Ku1=Ku2 and Kv1=Kv2 are satisfied. If it is determined No (N), the process progresses to ST208, and if it is determined Yes (Y), the process progresses to ST209.

In ST208, it is determined whether or not the u1 direction curvature Ku1 and the v2 direction curvature Kv2 are the same, and the u2 direction curvature Ku2 and the v1 direction curvature Kv1 are the same. That is, it is determined whether or not the conditions Ku1=Kv2 and Ku2=Kv1 are satisfied. If it is determined Yes (Y), the process progresses to ST209, and if it is determined No (N), the process progresses to ST210.

In ST209, the selected boundary L is set and stored as the unnecessary boundary L1.

Next, the process progresses to ST211.

In ST210, the selected boundary L is set and stored as the necessary boundary L2. Next, the process progresses to ST211.

In ST211, it is determined whether or not all the boundaries L are selected. If it is determined Yes (Y), the process progresses to ST212, and if it is determined No (N), the process returns to ST202.

In ST212, all the stored unnecessary boundaries L1 are displayed with color. Thereafter, the unnecessary boundary detection processing ends, and the process returns to the main processing of FIG. 24.

Description of Flowchart of Wedge-Shaped Uneven Portion Detection Processing of Design Support Program AP2 in Third Embodiment FIG. 13 is a flowchart of a wedge-shaped uneven portion detection processing and is an explanatory view of a subroutine of ST9 in FIG. 24.

Referring to FIG. 13, in ST301, boundary information about all the boundaries L of the molded product image 1 stored in the boundary information storage unit C103A2 is acquired. Next, the process progresses to ST302.

In ST302, boundary information of an unselected boundary L from among all the boundaries L is selected. Next, the process progresses to ST303.

In ST303, surface information of the first surface FM1 and the second surface FM2 connected to each other through the selected boundary L is acquired. Next, the process progresses to ST304.

In ST304, the following substeps (1) and (2) are executed, and then the process progresses to ST305.

(1) At the midpoint P of the selected boundary L, the first normal vector HV1 of the first surface FM1 is calculated.

(2) At the midpoint P of the selected boundary L, the second normal vector HV2 of the second surface FM2 is calculated.

In ST305, it is determined whether or not the connection angles $\beta$ and $\beta'$ between the first surface FM1 and the second surface FM2 are less than the wedge shape determination value $\alpha_{max}$. That is, it is determined whether or not the conditions $\beta < \beta_{max}$ and $\beta' < \beta_{max}$ are satisfied. In ST305, the connection angles $\beta$ and $\beta'$ are calculated on the basis of the angles $\gamma$ and $\gamma'$ between the first normal vector HV1 of the first surface FM1 and the second normal vector HV2 of the second surface FM2 at the midpoint P. That is, $\beta = |360° - (90° \times 2) - \gamma| = |180° - \gamma|$ and $\beta' = |136° - (90° \times 2) - \gamma'| = |180° - \gamma'|$ are calculated. If it is determined No (N), the process progresses to ST306, and if it is determined Yes (Y), the process returns to ST307.

In ST306, the selected boundary L, the first surface FM1, and the second surface FM2 are set and stored as a non-wedge-shaped uneven portion. Next, the process progresses to ST311.

In ST307, the normal direction movement point Q which is moved from the midpoint P in a direction of the first normal vector HV1 by the normal direction movement distance LH1 is calculated. Next, the process progresses to ST308.

In ST308, it is determined whether or not the normal direction movement point Q is a point inside a molded product. That is, it is determined whether or not the normal direction movement point Q is not a point on a space. If it is determined Yes (Y), the process progresses to ST309, and if it is determined No (N), the process progresses to ST310.

In ST309, the selected boundary L, the first surface FM1, and the second surface FM2 are set and stored as the wedge-shaped concave portion E1. Next, the process progresses to ST311.

In ST310, the selected boundary L, the first surface FM1, and the second surface FM2 are set and stored as the wedge-shaped convex portion E2. Next, the process progresses to ST311.

In ST311, it is determined whether or not all the boundaries L are selected. If it is determined Yes (Y), the process progresses to ST312, and if it is determined No (N), the process returns to ST302.

In ST312, all the wedge-shaped concave portions E1 stored in the wedge-shaped concave portion setting storage unit C107E and all the wedge-shaped convex portions E2 stored in the wedge-shaped convex portion setting storage unit C107F are displayed with different colors on the molded product image 1. Thereafter, the wedge-shaped uneven portion detection processing ends, and the process returns to the main processing of FIG. 24.

Operations of Third Embodiment

Figure 28A:
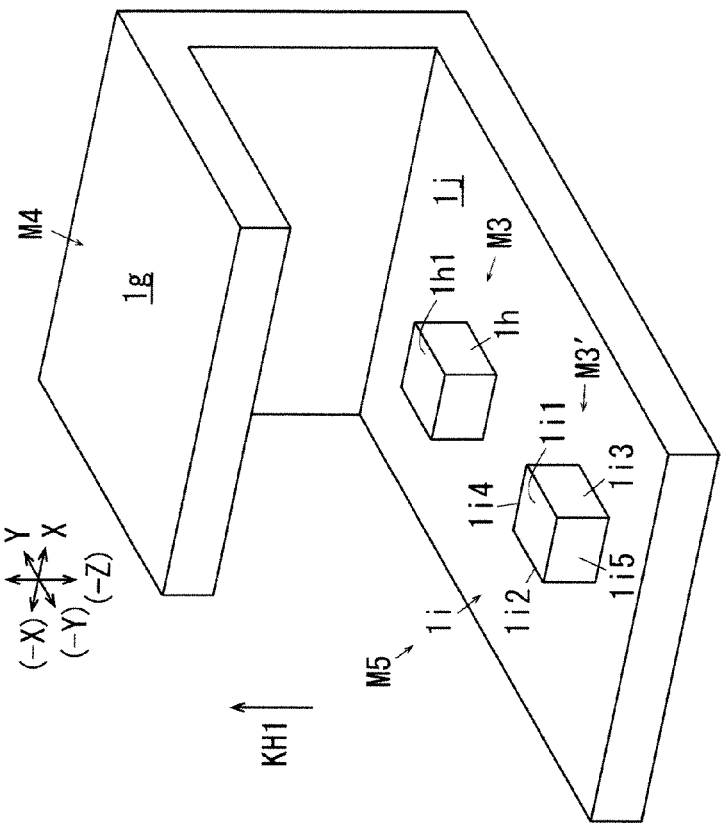
FIGS. 28A to 28C are explanatory views of the operations of the third exemplary embodiment and enlarged explanatory views showing an example of an unmoldable portion to be detected by the unmoldable portion detection processing.
Figure 28C:
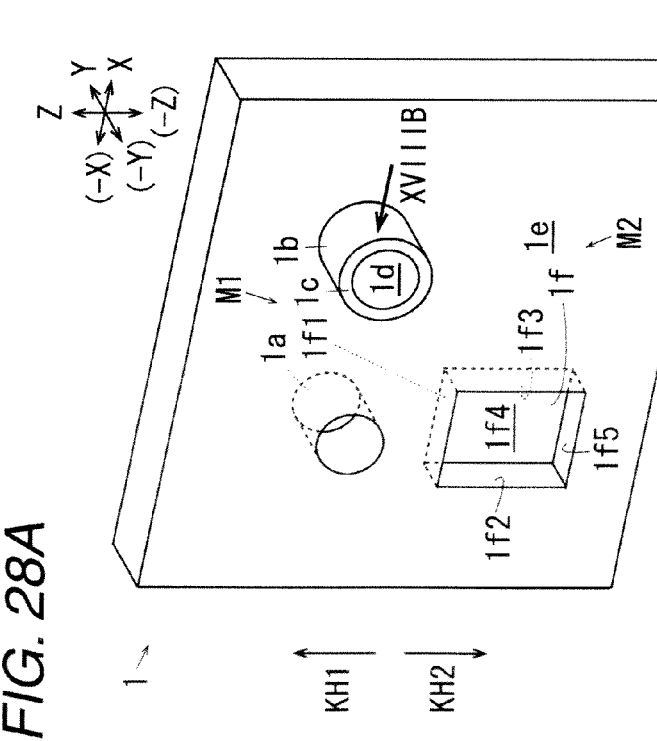
Figure 28B:
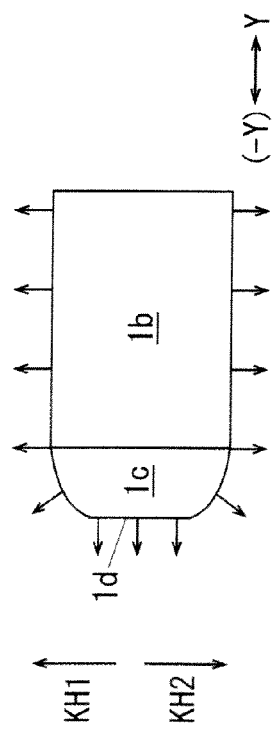

FIGS. 28A to 28C are explanatory views of the operations of the third embodiment and enlarged explanatory views showing an example of an unmoldable portion to be detected by the unmoldable portion detection processing. FIG. 28A is an explanatory view showing an example of each portion of a molded product to be detected as a cavity-side unmoldable surface and a cavity-side adjacent surface. FIG. 28B is an enlarged explanatory view of a boss when viewed from a direction of an arrow XVIIIB of FIG. 28A. FIG. 28C is an explanatory view showing an example of each portion of a molded product to be detected as a cavity-side projection surface and an example of each portion of a molded product to be not detected as a cavity-side projection surface.

In the design support system S of the third embodiment having the above-described configuration, when the unmoldable portion detection button 2 of the molded product image 1 shown in FIG. 4 is selected, the unmoldable portion detection processing shown in ST5 of FIG. 24 and ST101 to ST105 of FIG. 25 is executed.

In the unmoldable portion detection processing of the third embodiment, the first unmoldable portion detection processing shown in ST131 to ST124 of FIG. 26 and the second unmoldable portion detection processing, which is similar to the first unmoldable portion detection processing, are executed.

(In-Plane Undercut Processing of First Unmoldable Portion Detection Processing)

During the first unmoldable portion detection processing of the unmoldable portion detection processing, first, like Patent Document 1, an in-plane undercut processing is executed in which the cavity-side unmoldable portion M1 is detected on the basis of the cavity direction KH1 and the normal vectors h1 to h16. That is, in ST113 of FIG. 26, the in-plane undercut processing is executed in which the cavity-side unmoldable surface M1, on which any one of the normal vectors h1 to h16 has the cavity backward component of the cavity direction KH1, is detected as the cavity-side unmoldable portion M1.

For example, in regards to a through hole that passes through a surface of a molded product on the molded product image 1 shown in FIGS. 28A and 28B, a normal vector at an upper part of a through surface 1$a$ inside the through hole has a cavity backward component of the cavity direction KH1, that is, upward. In regards to a boss, which is an example of a protrusion protruding from a surface of the molded product, a normal vector at a lower part of a cylindrical surface 1$b$ in a base end portion and a normal vector at a lower part of a chamfered portion 1$c$ in a front end portion have the cavity backward component. Meanwhile, the normal vectors on a planar front end surface 1$d$ of the boss are all perpendicular to the cavity direction KH1 and have no cavity backward component. In this case, with the in-plane undercut processing, the through surface 1$a$, the cylindrical surface 1$b$, and the chamfered portion 1$c$ are detected as the cavity-side unmoldable portion M1.

(Concave Edge Processing of First Unmoldable Portion Detection Processing)

During the first unmoldable portion detection processing of the unmoldable portion detection processing, a concave edge processing is executed in which a new cavity-side unmoldable portion M2 is detected on the basis of the connection angles α and α' to the previously detected cavity-side unmoldable portions M1 to M3. That is, in ST117 and ST118 of FIG. 26, it is determined whether or not the connection angles α and α' between the cavity-side unmoldable portions M1 to M3 and the cavity-side adjacent surfaces M2 and M2' shown in FIGS. 6A and 6B are less than the prescribed concave connection determination value $α_{max}$. Then, the concave edge processing is executed in which the cavity-side concave connection surface M2, which is connected to the cavity-side unmoldable portions M1 to M3, is detected as a new cavity-side unmoldable portion M2.

For example, a protrusion support surface 1$e$, shown in FIG. 28A, which supports the boss 1$b$ to 1$d$, is detected as the cavity-side concave connection surface M2 concavely connected to the cylindrical surface 1$b$. Actually, in regards to the protrusion support surface 1$e$, a downward portion of the boss 1$b$ to 1$d$ on the upstream side of the cavity direction KH1 becomes a cavity-side unmoldable portion M1. Furthermore, in regards to a pocket-like groove 1$f$, an upper end surface 1$f$1 is detected as the cavity-side unmoldable surface M1, but there is no normal vector opposite to the cavity direction KH1 during the in-plane undercut processing. For this reason, other surfaces 1$f$2 to 1$f$5 are not detected as the cavity-side unmoldable surface M1 even though they are the cavity-side unmoldable surface M1. In the third embodiment, however, with the concave edge processing, a left surface 1$f$2, a right surface 1$f$3, and a bottom surface 1$f$4 concavely connected to the upper end surface 1$f$1 are detected as the cavity-side concave connection surface M2, and a lower end surface 1$f$5 is detected as the cavity-side concave connection surface M2 of each of the surfaces 1$f$2 to 1$f$4.

(Projection Point Processing of First Unmoldable Portion Detection Processing)

During the first unmoldable portion detection processing of the unmoldable portion detection processing, a projection point processing is executed in which a new cavity-side unmoldable portion M3 is detected on the basis of the cavity direction line KL1 extending from the cavity-side projection surface M3 or M3'. That is, in ST119 of FIG. 26, it is determined whether or not there is a surface M4 which the cavity direction line KL1 extending from the cavity-side projection surface M3 or M3 shown in FIG. 22A or 22B reaches. Then, the projection point processing is executed in which the cavity-side projection surface M3 having the surface M4 is detected as a new cavity-side unmoldable portion M3.

As a result, an upper surface 1$h$1 of a first protrusion 1$h$, which protrudes upward from a bottom surface (1$j$) of the molded product below a solid barrier portion 1$g$, shown in FIG. 28C, which is an example of the surface M4, is detected as the cavity-side unmoldable portion M3 since the cavity direction line KL1 extending from the upper surface 1$h$1 reaches the solid barrier portion 1$g$.

(Stand Wall Processing of First Unmoldable Portion Detection Processing)

During the first unmoldable portion detection processing of the unmoldable portion detection processing, a stand wall processing is executed in which it is determined on the basis of the cavity-side projection surface M3' not having the surface M4 whether or not a surface (M5) adjacent to the cavity-side projection surface M3' is the moldable surface M5.

That is, in ST121 of FIG. 26, the stand wall processing is executed in which the stand wall M5, shown in FIG. 22B, which is adjacent to the cavity-side projection surface M3' and in parallel to the cavity direction line KL1 is determined as the moldable surface M5.

As a result, for example, in regards to a second protrusion 1$i$, shown in FIG. 28C, which protrudes upward from a bottom surface (1$j$) of a molded product, an upper surface 1$i$1 of the second protrusion 1$i$ is detected as the moldable portion M3' being not undercut with no solid barrier portion against the cavity direction line KL1 extending from the upper surface 1$i$1. Furthermore, since the side surfaces 1$i$2 to 1$i$5 are in parallel to the cavity direction line KL1, each side surface is determined as the stand wall M5 and then detected as the moldable portion M5.

(Second Unmoldable Portion Detection Processing)

During the second unmoldable portion detection processing of the unmoldable portion detection processing, similarly to the cavity direction KH1, in regards to the core direction KH2, the in-plane undercut processing, the concave edge processing, the projection point processing and the stand wall processing are executed. As a result, the core-side unmoldable portions M1 to M3 and the moldable portion M3 and M5 are detected.

During the unmoldable portion detection processing, in ST131 to ST144 of FIG. 27, the third moldable portion detection processing is executed in which the third moldable portions M6 and M7 shown in FIG. 23A or 23B are detected from the detected cavity-side unmoldable portions M1 to M3 and the detected core-side unmoldable portions M1 to M3.

That is, as shown in ST132 and ST133 of FIG. 27, the cavity-side unmoldable portions M1 to M3 are detected as the core-side projection surface M3' when being moldable by the movement of the male mold in the core direction KH2 and are then detected as the moldable portion M3'. Thus, the cavity-side unmoldable portions M1 to M3 are determined as being moldable by the male mold. Further, as shown in ST132, ST134, and ST135 of FIG. 27, the cavity-side unmoldable portions M1 to M3 are detected as the third moldable portions M6 and M7 when being unmoldable by the movement of the male mold in the core direction KH2 but being moldable by the movement of the slide cord in the standard slide direction KH3. Thus, the cavity-side unmoldable portions M1 to M3 are determined as being moldable by the slide core. Furthermore, as shown in ST132, ST134, and ST136 of FIG. 27, the cavity-side unmoldable portions M1 to M3 are detected as the unmoldable portion M8 when being unmoldable by the movement of the male mold in the core direction KH2 and the movement of the slide core in the standard slide direction KH3. In this case, the cavity-side unmoldable portions M1 to M3 are determined as being unmoldable by the female mold, the male mold, and the slide core.

Figure 29:
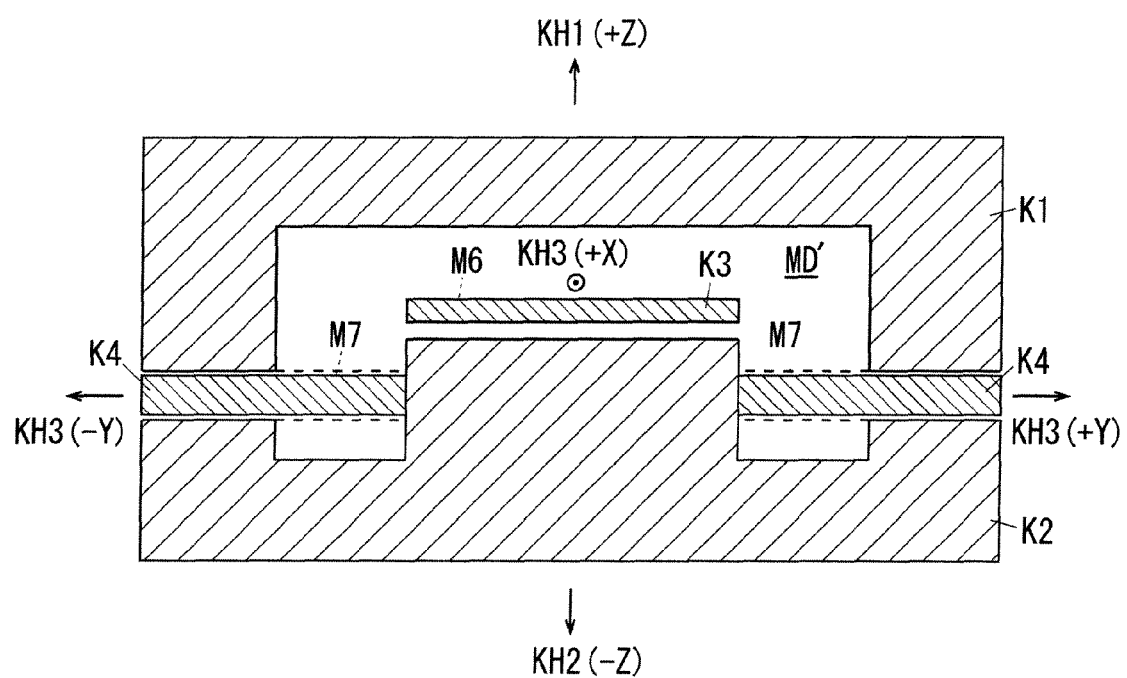
FIG. 29 is an explanatory view of a slide core according to the third exemplary embodiment and is an explanatory view of a slide core corresponding to a model when protrusions are removed from the model of the molded product shown in FIGS. 23A and 23B.

FIG. 29 is an explanatory view of a slide core according to the third embodiment and is an explanatory view of a slide core corresponding to a model when protrusions are removed from the model of the molded product shown in FIGS. 23A and 23B.

For example, as shown in FIG. 29, with a model MD', which is obtained by removing the protrusions MDa, MDa, and MDb from the model MD of the molded product shown in FIGS. 8A and 8B, the surfaces, excluding the surfaces M6 and M7, which are detected as the cavity-side unmoldable portions M1 to M3 and the core-side unmoldable portions M1 to M3, can be molded by a female mold K1, which is moved in the +Z direction serving as the cavity direction KH1, and a male mold K2, which is moved in the +Z direction serving as the core direction KH2. Furthermore, the surface M6 is determined as being moldable by a first slide core K3, which is moved in the ±X direction serving as an example of the standard slide direction KH3. Thus, the surface M6 is detected as the third moldable portion. Furthermore, the surface M7 is determined as being moldable by a second slide core K4, which is moved in the ±Y direction serving as an example of the standard slide direction KH3. Thus, the surface M7 is detected as the third moldable portion.

As a result, the surfaces 1a to 1c, 1e, and 1f shown in FIG. 28 are moldable by movement of a slide core having a shape corresponding to each of the surfaces 1a to 1c, 1e, and 1f in the −Y direction serving as an example of the standard slide direction KH3. Thus, the surfaces 1a to 1c, 1e, and 1f are detected as the third moldable portions M6 and M7.

The bottom surface 1j, from which the protrusions 1h and 1i shown in FIG. 28C protrude, are detected as the cavity-side unmoldable portions M1 to M3 and the core-side unmoldable portions M1 to M3. In this case, even though a slide core having a shape corresponding to the bottom surface 1j is moved in the ±X direction and the ±Y direction serving as an example of the standard slide direction KH3, since the protrusions 1h and 1i are present, the bottom surface 1j is unmoldable. For this reason, the bottom surface 1j is detected as the unmoldable portion M8.

Similarly to the cavity-side unmoldable portions M1 to M3, as shown in ST139 and ST140 of FIG. 27, the core-side unmoldable portions M1 to M3 are detected as the cavity-side projection surface M3', that is, the moldable portion M3' when being moldable by the movement of the female mold in the cavity direction KH1. Thus, the core-side unmoldable portions M1 to M3 are determined as being moldable by the female mold. Furthermore, as shown in ST139, ST141, and ST142 of FIG. 27, the core-side unmoldable portions M1 to M3 are detected as the third moldable portions M6 and M7 when being unmoldable by the movement of the female mold in the cavity direction KH1 but being moldable by the movement of the slide core in the standard slide direction KH3. Thus, the core-side unmoldable portions M1 to M3 are determined as being moldable by the slide core. Furthermore, as shown in ST139, ST141, and ST143 of FIG. 27, the core-side unmoldable portions M1 to M3 are detected as the unmoldable portion M8 when being unmoldable by the movement of the female mold in the cavity direction KH1 and the movement of the slide core in the standard slide direction KH3. In this case, the core-side unmoldable portions M1 to M3 are determined as being unmoldable by the female mold, the male mold, and the slide core.

Therefore, in the design support system S of the third embodiment, the unmoldable portion detection processing ensures automatic determination of presence/absence of the unmoldable portions M1 to M3 with good accuracy and makes it easy to design a molded product or a mold having no unmoldable portion M8 without needing proficient knowledge.

In the design support system S of the third embodiment, on the molded product image 1, the third moldable portions M6 and M7 are displayed with yellow, and the unmoldable portion M8 is displayed with red. Therefore, it is possible to distinguish the moldable portions (M1-M3), the third moldable portions M6 and M7, and the unmoldable portion M8 on the molded product image 1. As a result, it is possible to easily design a molded product or a mold having no unmoldable portion M8, as compared with a case where the individual portions are displayed with the same color.

In the design support system S of the third embodiment, when the unnecessary boundary detection button 3 of the molded product image 1 shown in FIG. 4 is selected, the unnecessary boundary detection processing shown in ST7 of FIG. 24 and ST201 to ST212 of FIG. 12 is executed.

During the unnecessary boundary detection processing of the third embodiment, if it is determined in ST205 of FIG. 12 that the normal vectors HV1 and HV2 of the first surface FM1 and second surface FM2 connected to each other through the boundary L shown in FIGS. 7A and 7B are of the same direction, and it is determined in ST207 and ST208 of FIG. 12 that the first curvatures Ku1 and Kv1 of the first surface FM1 and the second curvatures Ku2 and Kv2 of the second surface FM2 shown in FIGS. 8A and 8B are the same, the boundary L is determined as the unnecessary boundary L1 that divides the first surface FM1 and the second surface FM2, which should be the same surface.

Therefore, in the design support system S of the third embodiment, the unnecessary boundary detection processing ensures automatic detection of the unnecessary boundary L1 with good accuracy and makes it easy to design the mold without needing proficient knowledge.

In the design support system S of the third embodiment, when the wedge-shaped uneven portion detection button 4 of the molded product image 1 shown in FIG. 4 is selected, the wedge-shaped uneven portion detection processing shown in ST9 of FIG. 24 and ST301 to ST312 of FIG. 13 is executed.

During the wedge-shaped uneven portion detection processing of the third embodiment, in ST305 of FIG. 13, it is determined whether or not the connection angles β and β' of the first surface FM1 and the second surface FM2, which are calculated on the basis of the normal vectors HV1 and HV2 of the first surface FM1 and the second surface FM2 connected to each other through the boundary L are less than the prescribed wedge shape determination value ma, Accordingly, it is determined whether or not the boundary L, the first surface FM1, and the second surface FM2 are the wedge-shaped uneven portion E1+E2.

If it is determined that the boundary L, the first surface FM1, and the second surface FM2 are the wedge-shaped uneven portion E1+E2, in ST307 and ST308 of FIG. 13, it is determined whether or not the normal direction movement point Q, which is moved from the midpoint P of the boundary L in the first normal vector HV1 by the normal direction movement distance LH1 is a point inside the molded product or a point on a space. As a result, if it is determined that the normal direction movement point Q is a point inside the molded product, it is determined that the boundary L, the first surface FM1, and the second surface FM2 are the wedge-shaped concave portion E1. If it is determined that the normal direction movement point Q is a point on a space, it is determined that the boundary L, the first surface FM1, and the second surface FM2 are the wedge-shaped convex portion E2.

Therefore, in the design support system S of the third embodiment, the wedge-shaped uneven portion detection processing ensures automatic detection with good accuracy of the wedge-shaped concave portion E1, which becomes problematic in terms of the strength of the mold due to the sharpness of the mold, and the wedge-shaped convex portion E2, which is dangerous to the user due to the sharpness of the molded product, causes a difficulty in processing the mold having a concave shape, and becomes problematic in terms of manufacturing costs. As a result, it is possible to easily design the mold without needing proficient knowledge.

Fourth Embodiment

Figure 30:
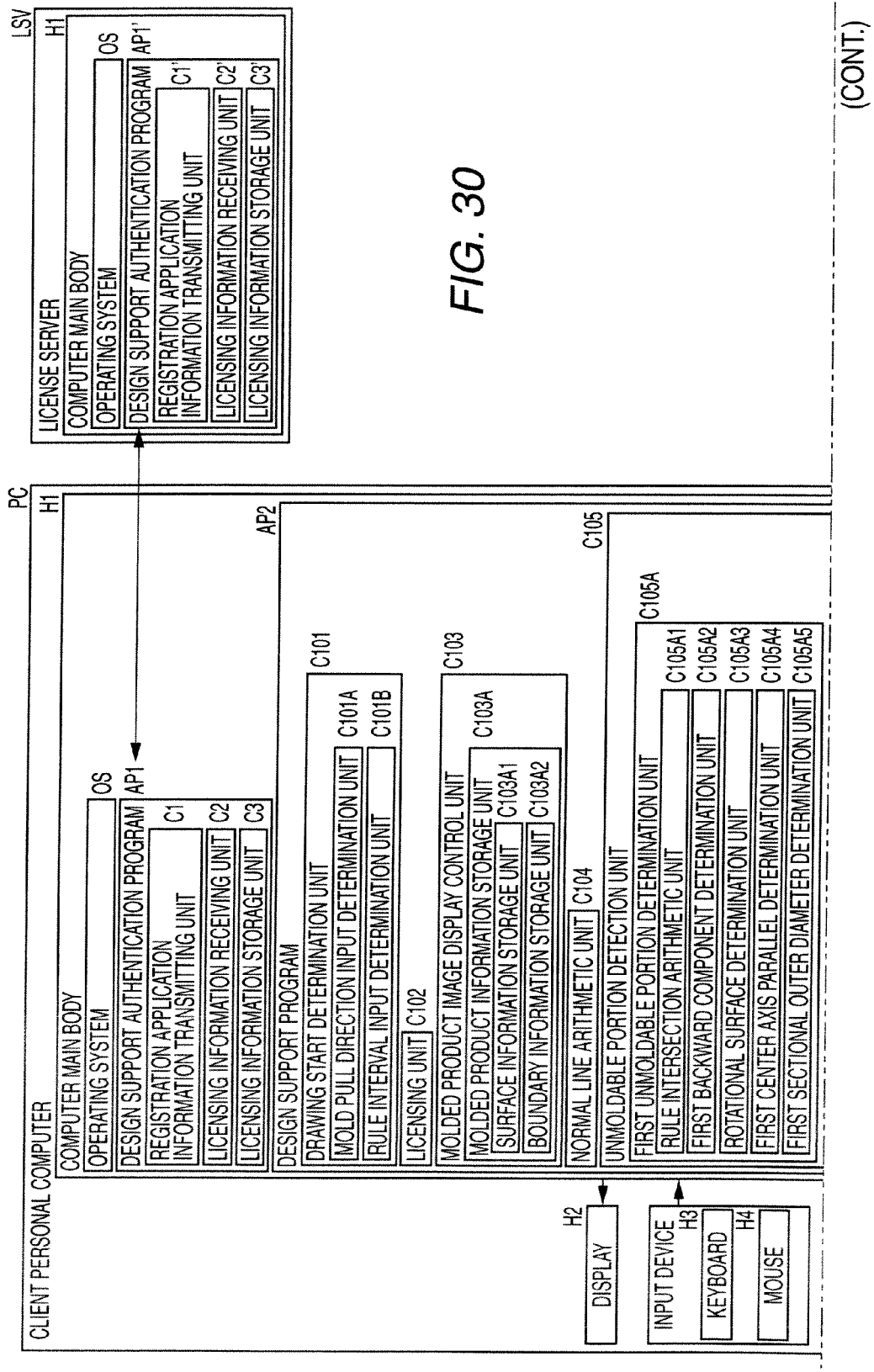
FIG. 30 is a functional block diagram showing the functions of controllers of a client personal computer and a license server according to a fourth exemplary embodiment of the invention and corresponds to FIG. 19 in the third exemplary embodiment.

FIG. 30 is a functional block diagram showing the functions of controllers of a client personal computer and a license server according to a fourth embodiment of the invention. FIG. 30 corresponds to FIG. 19 in the third embodiment.

FIG. 31 is a functional block diagram which is continued to FIG. 30, and corresponds to FIG. 20 in the third embodiment.

Figure 32:
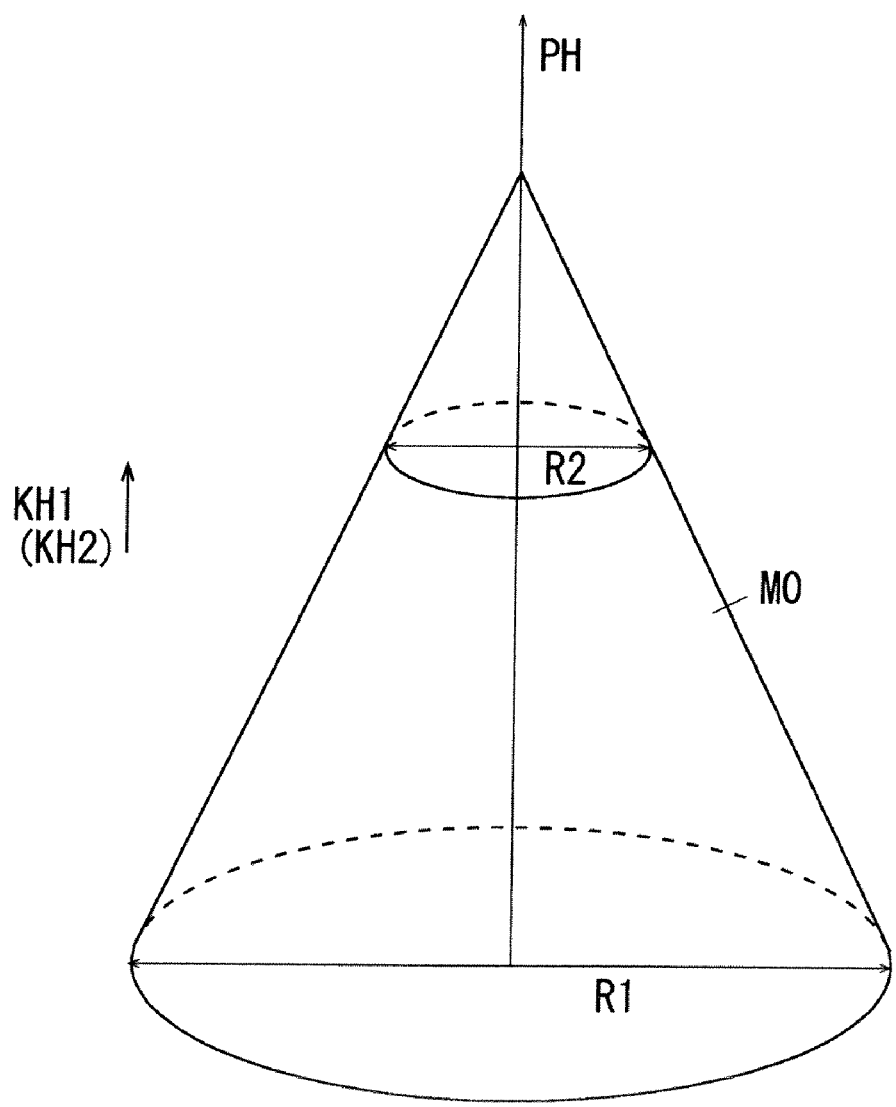
FIG. 32 is an enlarged explanatory view of a conical surface, which is an example of a rotational surface.

FIG. 32 is an enlarged explanatory view of a conical surface, which is an example of a rotational surface.

A design support system S according to a fourth embodiment of the invention will now be described. In the description of the fourth embodiment, the same parts as those in the third embodiment are represented by the same reference numerals, and detailed descriptions thereof will be omitted. The fourth embodiment has the following differences from the third embodiment. Other parts are the same as those in the third embodiment.

Description of Controller of Fourth Embodiment (Design Support Program AP2)

Referring to FIGS. 30 and 31, if a surface is a rotational surface M0, which is a curved surface of a solid body, that is, a rotating body, obtained by rotation around a center axis, as shown in FIG. 32, a surface information storage unit C103A1 of the fourth embodiment stores the surface as a rotational surface M0. In the fourth embodiment, when the surface is drawn by an input for drawing a rotational surface during drawing, the surface drawn by the input is stored as the rotational surface M0.

A first unmoldable portion determination unit C105A of the fourth embodiment has a rotational surface determination unit C105A3, a first center axis parallel determination unit C105A4, and a first sectional outer diameter determination unit C105A5.

CT05A3: Rotational Surface Determination Unit

The rotational surface determination unit C105A3 determines on the basis of information stored in the surface information storage unit C103A1 whether or not the surface is the rotational surface M0.

C105A4: First Center Axis Parallelism Determination Unit

The first center axis parallel determination unit C105M determines whether or not a center axis direction PH of the rotational surface M0 and the cavity direction KH1 are in parallel to each other, as shown in FIG. 32.

C105A5: First Sectional Outer Diameter Determination Unit

In regards to the outer diameters R1 and R2 serving as a diameter of a circle in sectional view perpendicular to the center axis direction PH, the first sectional outer diameter determination unit C105A5 determines whether or not a cavity upstream-side outer diameter R1, which is an example of a first upstream-side outer diameter, that is, an outer diameter on an upstream side of the cavity direction KH1, is equal to or larger than a cavity downstream-side outer diameter R2, which is an example of a first downstream-side outer diameter, that is, an outer diameter on a downstream side of the cavity direction KH1, as shown in FIG. 32. If it is determined that the center axis direction PH of the rotational surface M0 is in parallel to the cavity direction KH1, and the cavity upstream-side outer diameter R1 is equal to or larger than the cavity downstream-side outer diameter R2 over the center axis direction PH, the first unmoldable portion determination unit C105A of the fourth embodiment determines that the rotational surface M0 is not the cavity-side unmoldable portion M1. If it is determined that the center axis direction PH of the rotational surface M0 is not in parallel to the cavity direction KH1, or if it is determined that the center axis direction PH of the rotational surface M0 is in parallel to the cavity direction KH1, but the cavity upstream-side outer diameter R1 is smaller than the cavity downstream-side outer diameter R2 over the center axis direction PH, the first unmoldable portion determination unit C105A determines that the rotational surface M0 is the cavity-side unmoldable portion M1.

A second unmoldable portion determination unit C105A' of the fourth embodiment has a rotational surface determination unit C105A3, a second center axis parallel determination unit C105A4' and a second sectional outer diameter determination unit C105A5'. If a mark "'" is suffixed to each of reference numerals C105A3, C105A4, and C105A5, and the terms "first", "cavity", and "KH1" are substituted with the terms "second", "core", and "KH2", respectively, the descriptions of the rotational surface determination unit C105A3, the first center axis parallel determination unit C105A4, and the first sectional outer diameter determination unit C105A5 can also be applied to the rotational surface determination unit C105A3', the second center axis parallel determination unit C105A4', and the second sectional outer diameter determination unit C105A5', the detailed descriptions of which will therefore be omitted.

Figure 33:
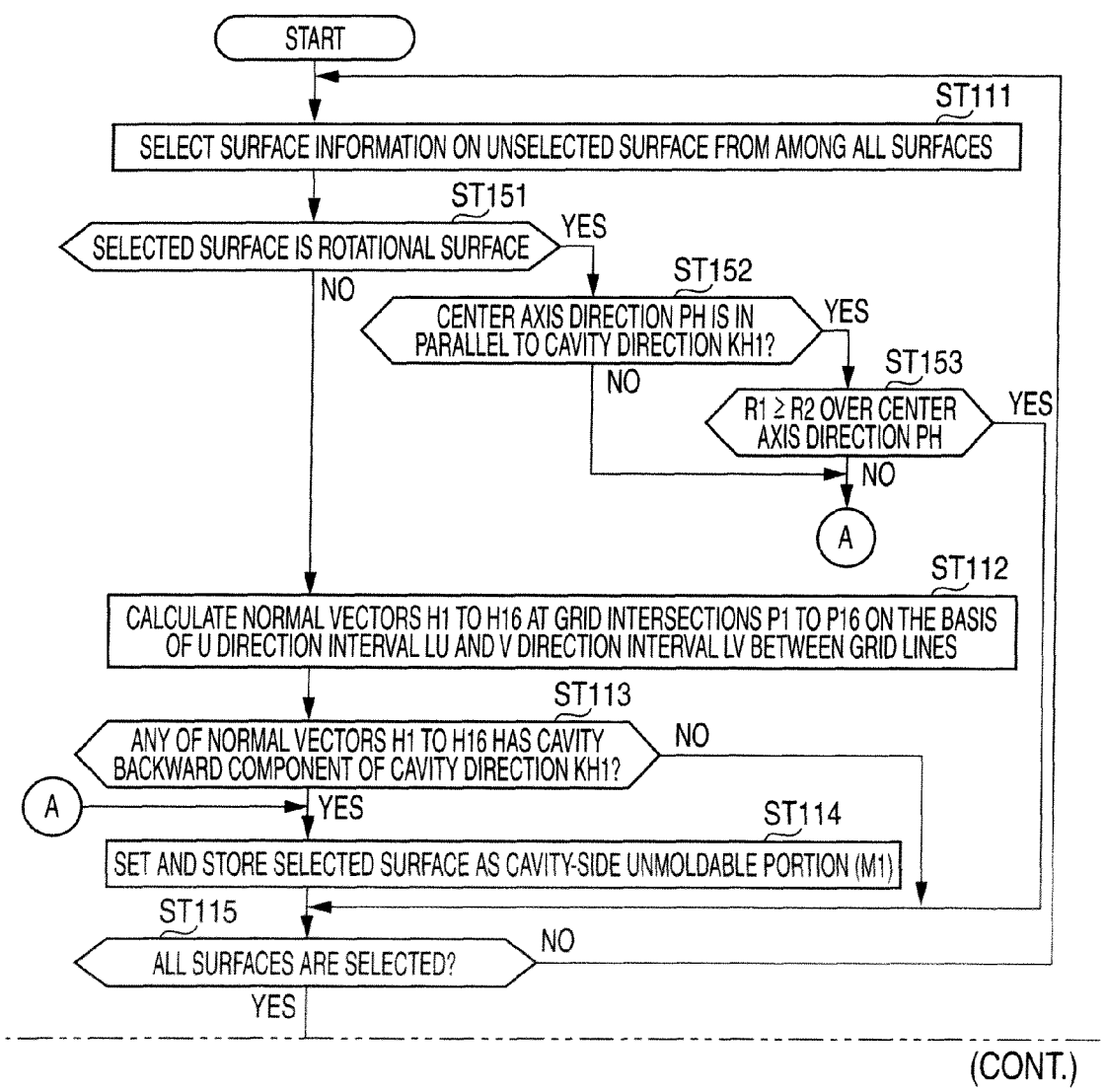
FIG. 33 is a flowchart of a first unmoldable portion detection processing according to the fourth exemplary embodiment.

Description of Flowchart of First Unmoldable Portion Detection Processing in Fourth Embodiment FIG. 33 is a flowchart of a first unmoldable portion detection processing according to the fourth embodiment. FIG. 23 is an explanatory view of a subroutine of ST5 shown in FIG. 25 and corresponds to FIG. 26 in the third embodiment.

Referring to FIG. 33, the flowchart of the design support program AP2 in the client personal computer PC of the fourth embodiment is different from the flowchart of the main processing in the third embodiment shown in FIG. 26 in that ST151 to ST153 are executed between ST111 and ST112, ST113 to ST124 are the same as those in FIG. 26, and detailed descriptions thereof will be omitted.

Referring to FIG. 33, in ST151, it is determined whether or not a selected surface is a rotational surface M0. If it is determined Yes (Y), the process progresses to ST152, and if it is determined No (N), the process progresses to ST112.

In ST152, it is determined whether or not the center axis direction PH of the rotational surface M0 and the cavity direction KH1 shown in FIG. 32 are in parallel to each other. If it is determined Yes (Y), the process progresses to ST153, and if it is determined No (N), the process progresses to ST114.

In ST153, it is determined whether or not the upstream-side outer diameter R1 is equal to or larger than the downstream-side outer diameter R over the center axis direction PH of the rotational surface M0. If it is determined No (N), the process progresses to ST114, and if it is determined Yes (Y), the process progresses to ST115.

If a mark "'" is suffixed to the ST number of each step of the first unmoldable portion detection processing, and the terms "first", "female mold", "cavity", "KH1", "KL1", and "+Z direction" are substituted with the terms "second", "male mold", "core", "KH2", "KL2", and "−Z direction", respectively, the description of the first unmoldable portion detection processing can also be applied to the second unmoldable portion detection processing of the fourth embodiment, the detailed description of which will therefore be omitted.

Operations of Fourth Embodiment

Figure 34A:
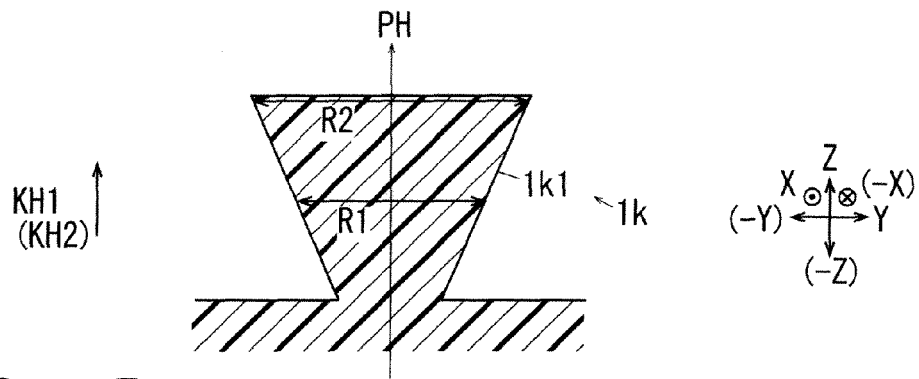
FIGS. 34A to 34C are explanatory views of the operations of the fourth exemplary embodiment and enlarged explanatory views showing an example of an unmoldable portion to be detected by the unmoldable portion detection processing of the fourth exemplary embodiment, specifically.
Figure 34B:
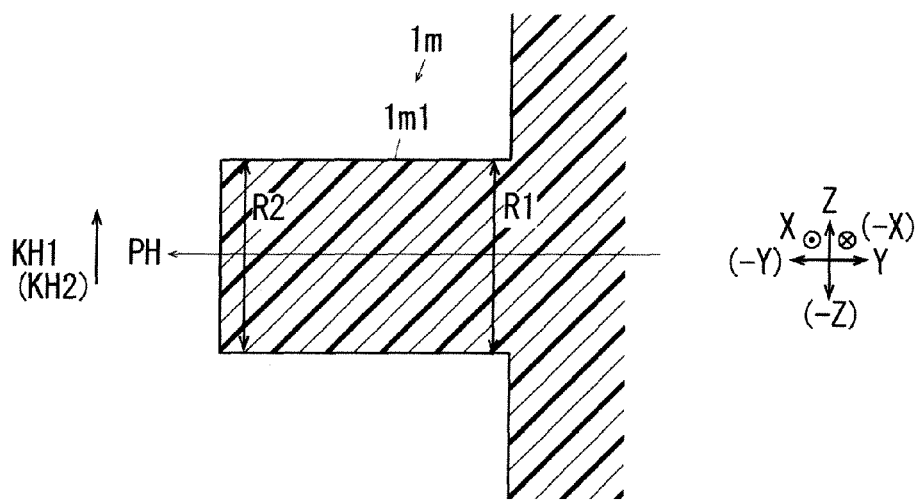
Figure 34C:
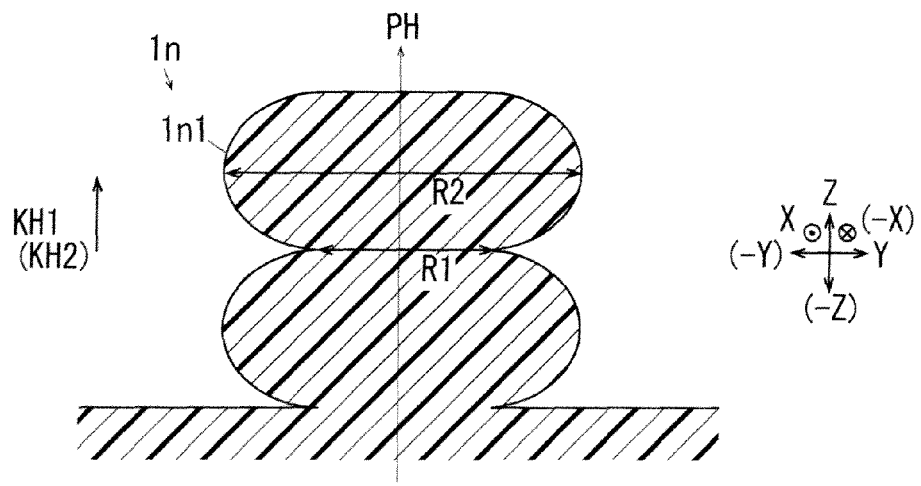

FIGS. 34A to 34C are explanatory views of the operations of the fourth embodiment and enlarged explanatory views showing an example of an unmoldable portion to be detected by the unmoldable portion detection processing of the fourth embodiment. FIG. 34A is a sectional view of a truncated conical surface which is an example of an unmoldable surface. FIG. 34B is a sectional view of a cylindrical surface which is an example of an unmoldable surface. FIG. 34C is a sectional view of a B curved surface which is an example of an unmoldable surface.

In the design support system S of the fourth embodiment having the above-described configuration, during the first unmoldable portion detection processing of the unmoldable portion detection processing, a processing shown in ST151 to ST153 of FIG. 33 is executed to determine whether or not the rotational surface M0 shown in FIG. 32 is the cavity-side unmoldable surface M1. That is, if it is determined that the center axis direction PH of the rotational surface M0 is in parallel to the cavity direction KH1, and the cavity upstream-side outer diameter R1 is equal to or larger than the cavity downstream-side outer diameter R2 over the center axis direction PH, the rotational surface M0 is detected as the cavity-side unmoldable surface M1.

As a result, a truncated conical surface 1k1 shown in FIG. 34A, serving as an example of the rotational surface M0, which constitutes a side surface 1k1 of a third protrusion 1k having an inverted truncated conical shape, is detected as the cavity-side unmoldable surface M1. The reason is because the center axis direction PH is in parallel to the cavity direction KH1, but the cavity upstream-side outer diameter R1 is equal to or smaller than the cavity downstream-side outer diameter R. Furthermore, a cylindrical surface 1m1 shown in FIG. 34B, serving as an example of the rotational surface M0, which constitutes a side surface 1m1 of a cylindrical fourth protrusion 1m, is detected as the cavity-side unmoldable surface M1. The reason is because the cavity upstream-side outer diameter R1 and the cavity downstream-side outer diameter R2 are the same, but the center axis direction PH is not in parallel to the cavity direction KH1. Furthermore, a B curved surface 1n1 shown in FIG. 34C, serving as an example of the rotational surface M0, which constitutes a side surface 1n1 of a fifth protrusion 1n, is detected as the cavity-side unmoldable surface M1. The reason is because the center axis direction PH is in parallel to the cavity direction KH1, but the cavity upstream-side outer diameter R1 is equal to or smaller than the cavity downstream-side outer diameter R2.

During the second unmoldable portion detection processing of the unmoldable portion detection processing of the fourth embodiment, similarly to the cavity direction KH1, in regards to the core direction KH2, a processing is executed to determine whether or not the rotational surface M0 is the core-side unmoldable surface M1. That is, if it is not determined that the center axis direction PH of the rotational surface M0 is in parallel to the core direction KH2, and the core upstream-side outer diameter R1 is equal to or larger than the core downstream-side outer diameter R2 over the center axis direction PH, the rotational surface M0 is detected as the core-side unmoldable portion M1.

Therefore, in the design support system S of the fourth embodiment, when a selected surface is the rotational surface M0, unlike the design support system S of the third embodiment, it is possible to determine with good accuracy whether the rotational surface M0 is the cavity-side unmoldable surface M1 or the core-side unmoldable surface M1, without calculating the normal vector (h1 to h16).

During the unmoldable portion detection processing of the fourth embodiment, similarly to the unmoldable portion detection processing of the third embodiment, the third moldable portion detection processing shown in ST131 to ST144 of FIG. 27 is executed. For this reason, the cylindrical surface 1m1 shown in FIG. 34B is moldable by movement of a slide core having a shape corresponding to the cylindrical surface 1m1 in the −Y direction serving as an example of the standard slide direction KH3. Therefore, the cylindrical surface 1m1 is detected as the third moldable portion M6 or M7. Furthermore, the surfaces 1k1 and 1n1 shown in FIGS. 34A and 34C are detected as the unmoldable portion M8 since, even though a slide core having a shape corresponding to each of the surfaces 1k1 and 1n1 is formed, the slide core is not movable in any of the ±X direction and the ±Y direction serving as an example of the standard slide direction KH3 due to the surfaces 1k1 and 1n1 themselves, unless the slide core is divided.

In addition, the design support system S of the fourth embodiment has the same advantages and effects as the design support system S of the third embodiment.

(Modifications)

Although the invention will be described in connection with the foregoing embodiments, the invention is not limited to the foregoing embodiments. It should be noted that various modifications and changes may be made without departing from the scope of the invention read on the appended claims. For example, the following modifications (H01) to (H012) may be made.

(H01) In the unmoldable portion detection processing of the foregoing embodiments, the concave edge processing shown in ST117 and ST118 of FIG. 26 and the projection point processing shown in ST119 of FIG. 26 are preferably executed in combination. However, the invention is not limited thereto. For example, while the concave edge processing may be not executed, only the projection point processing may be executed. The stand wall processing shown in ST121 of FIG. 25 is preferably accompanied by the projection point processing, but it may be not executed. In this case, though not detected as the stand wall M5, the surface (M5) is detected as the moldable portion M3' or the third moldable portion M6 or M7.

(H02) In the unmoldable portion detection processing of the foregoing embodiments, the connection angles α and α' are calculated on the basis of the normal vectors h1 to h16 at the grid intersections p1 to p16, but the invention is not limited thereto. For example, like the unnecessary boundary detection processing or the wedge-shaped uneven portion detection processing, the connection angles α and α' may be calculated on the basis of the normal vectors HV1 and HV2 at the midpoint P of the first surface FM1 and the second surface FM2, which are connected to each other through the boundary L.

(H03) In the unnecessary boundary detection processing of the foregoing embodiments, it is determined on the basis of the curvatures Ku1, Kv1, and Ku2, Kv2 of the first surface FM1 and the second surface FM2 at the midpoint P of the boundary L whether or not the boundary L is the unnecessary boundary L1, but the invention is not limited thereto. For example, it may be possible to determine whether or not the boundary L is the unnecessary boundary L1, by calculating the curvature radii 1/Ku1, 1/Kv1, 1/Ku2, and 1/Kv2 of the first surface FM1 and the second surface FM2, determining whether or not the curvature radii 1/Ku1 and 1/Kv1 of the first surface FM1 are the same as the curvature radii 1/Ku2 and 1/Kv2 of the second surface FM2, and determining whether or not the first curved state and the second curved state are the same.

(H04) In the foregoing embodiments, the numerical values of the parameters $α_{max}$, $β_{max}$, and LH1 may be changed.

(H05) In the foregoing embodiments, the detected unmoldable portion M8, the unnecessary boundary L1, and the wedge-shaped concave portion E1, and the wedge-shaped convex portion E2, which are detected by the unmoldable portion detection processing, the unnecessary boundary detection processing, and the wedge-shaped uneven portion detection processing, are displayed with colors, but the invention is not limited thereto. For example, a boundary between detection places may be highlighted, or a colored portion of a detection place may blink. Furthermore, a detection place may be displayed by an additional image, or a sentence or symbol, or may be reported by sound.

(H06) In the foregoing embodiments, the molded product image 1 has the unmoldable portion detection button 2, the unnecessary boundary detection button 3, and the wedge-shaped uneven portion detection button 4, but the invention is not limited thereto. For example, the buttons may be substituted with images, such as icons, or each processing may be executed by command input.

(H07) In the design support system S of the foregoing embodiments, the license of the design support system S is given by transmission/reception of the registration application information and the licensing information between the client personal computer PC and the license server, but the invention is not limited thereto. For example, transmission/reception of the registration application information and the licensing information may be omitted, and a confirmation processing of the license of the design support system S based on the licensing information may also be omitted.

(H08) In the foregoing embodiments, during the unmoldable portion detection processing shown in ST5 of FIG. 34 and ST101 to ST105 of FIG. 25, the first unmoldable portion detection processing for detecting the cavity-side unmoldable portions M1 to M3, and the second unmoldable portion detection processing for detecting the core-side unmoldable portions M1 to M3 are executed, but the invention is not limited thereto. Like Patent Document 1, one of the first unmoldable portion detection processing and the second unmoldable portion detection processing may be omitted. For example, when a surface being in contact with the male mold (K2) is designed to be defined in an even flat surface, and it is ensured that the core-side unmoldable portions M1 to M3 do not exist in the core direction KH2, the second unmoldable portion detection processing may be omitted, and only the first unmoldable portion detection processing on the cavity direction KH1 may be executed. While second unmoldable portion detection processing may be omitted, only the first unmoldable portion detection processing may be executed in accordance with the user's input. In this case, in regards to only the detected cavity-side unmoldable portions M1 to M3, the third moldable portion detection processing for detecting the third moldable portions M6 and M7 is executed.

(H09) In the foregoing embodiments, the standard slide direction lines KL3 are set as the lines in four directions of the ±X direction and the ±Y direction, which are the lines on the XY plane orthogonal to the line in the Z-axis direction serving as the cavity direction line KL1 and the core direction line KL2, but the invention is not limited thereto. Other lines on the XY lines may be used. Furthermore, lines on a plane inclined with respect to the line in the Z-axis direction may be used. That is, the standard slide direction lines KL3 are not limited to the lines in four directions of the ±X direction and the ±Y direction, but lines in three or less directions, or lines in five or more directions may be used.

(H010) In the fourth embodiment, in order to determine whether or not the rotational surface M0 is the unmoldable portion M8, it is determined whether or not the center axis direction PH1 of the rotational surface M0 is in parallel to the cavity direction KH1 or the core direction KH2, and it is determined whether the rotational surface M0 is not the cavity-side unmoldable portion M1 or the core-side unmoldable portion M1. Alternatively, the target for determination of the rotational surface M0 is not limited to the directions KH1 and KH2. For example, it may be possible to determine whether or not the center axis direction PH1 of the rotational surface M0 is in parallel to the standard slide direction KH3, and to determine whether or not the rotational surface M0 is the third moldable portion M6 or M7.

(H011) In the fourth embodiment 2, when the center axis direction PH of the rotational surface M0 is not in parallel to the cavity direction KH1, or when the center axis direction PH of the rotational surface M0 is in parallel to the cavity direction KH1, but the cavity upstream-side outer diameter R1 includes an area smaller than the cavity downstream-side outer diameter R2 over the center axis direction PH, the rotational surface M0 is determined as the cavity-side unmoldable portion M1 or the core-side unmoldable portion M1. However, the determination result of the rotational surface M0 is not limited thereto. For example, when the center axis direction PH of the rotational surface M0 is in parallel to the cavity direction KH1, but the cavity upstream-side outer diameter R1 includes an area smaller than the cavity downstream-side outer diameter R2 over the center axis direction PH, the rotational surface M0 may be unconditionally determined as the unmoldable portion M8. In this case, it is possible to exclude the rotational surface M0, which is determined as the unmoldable portion M8, from the target subject to the third moldable portion detection processing for detecting the third moldable portions M6 and M7. Therefore, it is possible to improve a processing speed of the entire unmoldable portion detection processing.

(H012) In the foregoing embodiments, in regards to the cavity-side unmoldable portions M1 to M3 and the cavity-side unmoldable portions M1 to M3, which are detected by the first unmoldable portion detection processing and the second unmoldable portion detection processing, the third moldable portion detection processing is executed. Then, the cavity-side unmoldable portions M1 to M3 and the cavity-side unmoldable portions M1 to M3, excluding the third moldable portions M6 and M7, are detected as the unmoldable portion M8. As a result, it is possible to improve the processing speed of the entire unmoldable portion detection processing. However, the invention is not limited thereto. For example, similarly to the first unmoldable portion detection processing and the second unmoldable portion detection processing the third moldable portion detection processing may be executed on all the surfaces of the molded product. In this case, during the unmoldable portion detection processing, the unmoldable portion M8 is detected on the basis of all the results of the detection processing, as well as the result of the third moldable portion detection processing.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An unmoldable portion detection system comprising:
 a processor;
 a memory;
 a normal line arithmetic unit that calculates a normal line extending from a point on each of surfaces constituting a three-dimensional shape of a molded product to outside of the molded product;
 a backward component determination unit that determines whether or not an extending direction of the normal line has a backward component, which is a directional component opposite to a prescribed mold pull direction of a mold of the molded product, in accordance with a surface, on which the normal line is calculated; and
 an unmoldable portion determination unit that determines a surface having a point, at which the extending direction of the normal line having the backward component is calculated, as an unmoldable portion to be unmoldable only by movement of the mold in one direction,
 wherein
 the system further comprises:
  a concave connection determination unit that, in a case where the surface which is determined as the unmoldable portion is an unmoldable surface, and a surface which is adjacent to the unmoldable surface and determined as not the unmoldable surface is an adjacent surface, determines whether or not the unmoldable surface and the adjacent surface are concavely connected to each other with respect to a boundary between the unmoldable surface and the adjacent surface; and
  an adjacent unmoldable portion determination unit that, in a case where it is determined that the unmoldable surface and the adjacent surface are concavely connected to each other, determines the adjacent surface as the unmoldable portion.

2. The unmoldable portion detection system as claimed in claim 1, further comprising:
 a connection angle arithmetic unit that, in a case where a normal line with respect to the unmoldable surface is a first normal line, and a normal line with respect to the adjacent surface is a second normal line, calculates a connection angle between the unmoldable surface and the adjacent surface with respect to the boundary on the basis of an extending direction of the first normal line and an extending direction of the second normal line,
 wherein
 the concave connection determination unit determines on the basis of the connection angle whether or not the unmoldable surface and the adjacent surface are connected concavely to each other.

3. The unmoldable portion detection system as claimed in claim 1, further comprising:
 a rotational surface determination unit that determines whether or not the surface is a rotational surface which is a curved surface of a rotational body as a solid body obtained by rotation with a line as a center axis;
 a center axis parallel determination unit that determines whether or not the center axis direction of the rotational surface is in parallel to the mold pull direction; and
 a sectional outer diameter determination unit that, in a case where the surface is a rotational surface whose center axis direction is in parallel to the mold pull direction, in regards to an outer diameter, which is a diameter of a circle in sectional view perpendicular to the center axis direction of the rotational surface, determines whether or not an upstream-side outer diameter, which is an outer diameter on an upstream side of the mold pull direction, is equal to or larger than a downstream-side outer diameter, which is an outer diameter on a downstream side of the mold pull direction,
 wherein
  the unmoldable portion determination unit, in a case where it is determined that the surface is the rotational surface whose center axis direction is in parallel to the mold pull direction, and the upstream-side outer diameter is equal to or larger than the downstream-side outer diameter over the center axis direction determines the surface as not the unmoldable portion.

4. A computer readable non-transitory medium storing a program causing a computer to execute a process for determining an unmoldable portion, the process comprising:
 calculating a normal line extending from a point on each of surfaces constituting a three-dimensional shape of a molded product to outside of the molded product;
 determining whether or not an extending direction of the normal line has a backward component, which is a directional component opposite to a prescribed mold pull direction of a mold of the molded product, in accordance with a surface, on which the normal line is calculated; and
 determining a surface having a point, at which the extending direction of the normal line having the backward component is calculated, as the unmoldable portion to be unmoldable only by movement of the mold in one direction,
 the process comprises steps of:
  determining, in a case where the surface which is determined as the unmoldable portion is an unmoldable surface, and a surface which is adjacent to the unmoldable surface and determined as not the unmoldable surface is an adjacent surface, whether or not the unmoldable surface and the adjacent surface are concavely connected to each other with respect to a boundary between the unmoldable surface and the adjacent surface; and determining, in a case where it is determined that the unmoldable surface and the adjacent surface are concavely connected to each other, the adjacent surface as the unmoldable portion.

5. An unmoldable portion detection method programmed to be executable by a computer having a processor and a memory comprising:

calculating with the processor a normal line extending from a point on each of surfaces constituting a three-dimensional shape of a molded product to the molded product;

determining whether or not an extending direction of the normal line has a backward component, which is a directional component opposite to a prescribed mold pull direction of a mold of the molded product, in accordance with a surface, on which the normal line is calculated; and determining a surface having a point, at which the extending direction of the normal line having the backward component is calculated, as an unmoldable portion to be unmoldable only by movement of the mold in one direction, the method further comprises steps of:

determining, in a case where the surface which is determined as the unmoldable portion is an unmoldable surface, and a surface which is adjacent to the unmoldable surface and determined as not the unmoldable surface is an adjacent surface, whether or not the unmoldable surface and the adjacent surface are concavely connected to each other with respect to a boundary between the unmoldable surface and the adjacent surface; and determining, in a case where it is determined that the unmoldable surface and the adjacent surface are concavely connected to each other, the adjacent surface as the unmoldable portion.

6. An unmoldable portion detection system comprising:
a processor;
a memory;
a normal line arithmetic unit that calculates a normal line extending a point on each of surfaces constituting a three-dimensional shape of a molded product to outside of the molded product;
a first backward component determination unit that determines whether or not an extending direction of the normal line has a first backward component, which is a directional component opposite to a first mold pull direction, which is a prescribed mold pull direction of a first mold of the molded product, in accordance with each molded surface;
a first unmoldable portion determination unit that determines a surface having a point, at which the extending direction of the normal line having the first backward component is calculated, as a first unmoldable portion to be unmoldable only by movement of the first mold in the first mold pull direction;
a second backward component determination unit that, in regards to a second mold pull direction, which is a mold pull direction of a second mold corresponding to the first mold, determines whether or not the extending direction of the normal line has a second backward component, which is a directional component opposite to the second mold pull direction, which is opposite to the first mold pull direction;
a second unmoldable portion determination unit that determines a surface having a point, at which the extending direction of the normal line having the second backward component is calculated, as a second unmoldable portion to be unmoldable only by movement of the second mold in the second mold pull direction;
a first projection line reach determination unit that determines whether or not there is a surface which a first mold pull direction line extending from the second unmoldable portion in the first mold pull direction reaches;
a second projection line reach determination unit that, in regards to the second mold pull direction, determines whether or not there is a surface which a second mold pull direction line extending in the second mold pull direction opposite to the first mold pull direction reaches;
a third projection line reach determination unit that, in a case where it is determined that there is a surface which the second mold pull direction line reaches, determines whether or not there is a surface which a third mold pull direction line extending from the first unmoldable portion in a third mold pull direction other than the first mold pull direction and the second mold pull direction;
a third unmoldable portion determination unit that determines the first unmoldable portion, at which it is determined that there is a surface which the second mold pull direction line reaches and it is determined that there is a surface which the third mold pull direction line reaches, as a third unmoldable portion to be unmoldable by movement of the second mold in the second mold pull direction and by movement of the third mold in the third mold pull direction; and
a molded product display unit that displays the surfaces constituting the three-dimensional shape of the molded product and the third unmoldable portion from among the surfaces.

7. An unmoldable portion detection system as claimed in claim 6, further comprising:
wherein
the third projection line reach determination unit, in a case where it is determined that there is a surface which the first mold pull direction line reaches, determines whether or not there is a surface which the third mold pull direction line extending from the second unmoldable portion in the third mold pull direction reaches, and
the third unmoldable portion determination unit that determines the second unmoldable portion, at which it is determined that there is a surface which the first mold pull direction line reaches and it is determined that there is a surface which the third mold pull direction line reaches, as the third unmoldable portion to be unmoldable by the movement of the first mold in the first mold pull direction and the movement of the third mold in the third mold pull direction.

8. The unmoldable portion detection system as claimed in claim 7, further comprising:
a moldable portion determination unit that determines the first unmoldable portion, at which it is determined that there is a surface which the second mold pull direction line reaches and it is determined that there is a surface which the third mold pull direction line reaches, as a moldable portion to be moldable by the movement of the third mold in the third mold pull direction,
wherein
the moldable portion determination unit determining the second unmoldable portion, at which it is determined that there is a surface which the first mold pull direction line reaches and it is determined that there is no surface which the third mold pull direction line reaches, as the moldable portion, and the molded product display unit that displays the moldable portion.

9. The unmoldable portion detection system as claimed in claim 7, further comprising:
a first concave connection determination unit that, in a case where the surface which is determined as the first unmoldable portion is a first unmoldable surface, and a surface which is adjacent to the first unmoldable surface and determined as not the first unmoldable surface is a first adjacent surface, determines whether or not the first unmoldable surface and the first adjacent surface are concavely connected to each other with respect to a boundary between the first unmoldable surface and the first adjacent surface;
a first adjacent unmoldable portion determination unit that, in a case where it is determined that the first unmoldable surface and the first adjacent surface are concavely connected to each other, determines the first adjacent surface as the first unmoldable portion,
a second concave connection determination unit that, in a case where the surface which is determined as the second unmoldable portion is a second unmoldable surface, and a surface which is adjacent to the second unmoldable surface and determined as not the second unmoldable surface is a second adjacent surface, determines whether or not the second unmoldable surface and the second adjacent surface are concavely connected to each other with respect to a boundary between the second unmoldable surface and the second adjacent surface; and
a second adjacent unmoldable portion determination unit that, in a case where it is determined that the second unmoldable surface and the second adjacent surface are concavely connected to each other, determines the second adjacent surface as the second unmoldable portion.

10. The unmoldable portion detection system as claimed in claim 9, further comprising:
a first connection angle arithmetic unit that, in a case where a normal line with respect to the first unmoldable surface is a first normal line, and a normal line with respect to the first adjacent surface is a second normal line, calculates a first connection angle between the first unmoldable surface and the first adjacent surface with respect to the boundary on the basis of an extending direction of the first normal line and an extending direction of the second normal line; and
a second connection angle arithmetic unit that, in a case where a normal line with respect to the second unmoldable surface is a first normal line, and a normal line with respect to the second adjacent surface is a second normal line, calculates a second connection angle between the second unmoldable surface and the second adjacent surface with respect to the boundary on the basis of the extending direction of the first normal line and the extending direction of the second normal line,
wherein
a first concave connection determination unit determines on the basis of the first connection angle whether or not the first unmoldable surface and the first adjacent surface are concavely connected to each other, and
a second concave connection determination unit determines on the basis of the second connection angle whether or not the second unmoldable surface and the second adjacent surface are concavely connected to each other.

11. The unmoldable portion detection system as claimed in claim 7,
wherein
the first unmoldable portion determination unit, in a case where there is no surface which the second mold pull direction line extending from the first unmoldable portion reaches, determines the first unmoldable portion and a stand wall, which is a surface adjacent to the first unmoldable portion and parallel to the second mold pull direction line, as not the third unmoldable portion, and
the second unmoldable portion determination unit, in a case where there is no surface which the first mold pull direction line extending from the second unmoldable portion reaches, determines the second unmoldable portion and a stand wall, which is a surface adjacent to the second unmoldable portion and parallel to the first mold pull direction line, as not the third unmoldable portion.

12. The unmoldable portion detection system as claimed in claim 6, wherein the third mold pull direction line is a line on a plane orthogonal to a line, which connects the first mold pull direction line and the second mold pull direction line.

13. The unmoldable portion detection system as claimed in claim 6, further comprising:
a rotational surface determination unit that determines whether or not the surface is a rotational surface which is a curved surface of a rotational body as a solid body obtained by rotation with a line as a center axis;
a first center axis parallel determination unit that determines whether or not the center axis direction of the rotational surface is in parallel to the first mold pull direction;
a first sectional outer diameter determination unit that, in a case where the surface is a rotational surface whose center axis direction is in parallel to the first mold pull direction, in regards to an outer diameter, which is a diameter of a circle perpendicular to the center axis direction of the rotational surface in sectional view, determines whether or not a first upstream-side outer diameter, which is an outer diameter on an upstream side of the first mold pull direction, is equal to or larger than a first downstream-side outer diameter, which is an outer diameter on a downstream side of the first mold pull direction;
a second center axis parallel determination unit that determines whether or not the center axis direction of the rotational surface is in parallel to the second mold pull direction; and
a second sectional outer diameter determination unit that, in a case where the surface is a rotational surface whose center axis direction is in parallel to the second mold pull direction, in regards to an outer diameter of a circle perpendicular to the center axis direction of the rotational surface in sectional view, determines whether or not a second upstream-side outer diameter, which is an outer diameter on an upstream side of the second mold pull direction, is equal to or larger than a second downstream-side outer diameter, which is an outer diameter on a downstream side of the second mold pull direction,
wherein
the third unmoldable portion determination unit that, in a case where it is determined that the surface is the rotational surface whose center axis direction is in parallel to the first mold pull direction, and the first upstream-side outer diameter is equal to or larger than the first downstream-side outer diameter over the center axis direction, determines the surface as not the third unmoldable portion, and the third unmoldable portion determination unit that, in a case where it is determined that the surface is the rotational surface whose center axis direction is in parallel to the second mold pull direction, and the second upstream-side outer diameter is equal to or larger than the second downstream-side outer diameter over the center axis direction, determines the surface as not the third unmoldable portion.

14. A computer readable non-transitory medium storing a program causing a computer to execute a process for determining an unmoldable portion, the process comprising:

calculating a normal line extending from a point on each of surfaces constituting a three-dimensional shape of a molded product to outside of the molded product;

determining whether or not an extending direction of the normal line has a first backward component, which is a directional component opposite to a first mold pull direction, which is a prescribed mold pull direction of a first mold, in accordance with each molded surface;

determining a surface having a point, at which the extending direction of the normal line having the first backward component is calculated, as a first unmoldable portion to be unmoldable only by movement of the first mold in the first mold pull direction;

determining, in regards to a second mold pull direction, which is a mold pull direction of a second mold corresponding to the first mold, whether or not there is a surface which a second mold pull direction line extending from the first unmoldable portion in the second mold pull direction opposite to the first mold pull direction reaches;

determining, in a case where it is determined that there is a surface which the second mold pull direction line reaches, whether or not there is a surface which a third mold pull direction line extending from the first unmoldable portion in a third mold pull direction, which is a mold pull direction of a third mold other than the first mold and the second mold, other than the first mold pull direction and the second mold pull direction;

determining the first unmoldable portion, at which it is determined that there is a surface which the second mold pull direction line reaches and it is determined that there is a surface which the third mold pull direction line reaches, as an unmoldable portion to be unmoldable by the movement of the second mold in the second mold pull direction and movement of the third mold in the third mold pull direction; and displaying the surfaces constituting the three-dimensional shape of the molded product and the unmoldable portion from among the surfaces.

15. An unmoldable portion detection method programmed to be executable by a computer having a processor and a memory comprising:

calculating with the processor a normal line extending from a point on each of surfaces constituting a three-dimensional shape of a molded product to outside of the molded product; determining whether or not an extending direction of the normal line has a first backward component, which is a directional component opposite to a first mold pull direction, which is a prescribed mold pull direction of a first mold, in accordance with each molded surface;

determining a surface having a point, at which the extending direction of the normal line having the first backward component is calculated, as a first unmoldable portion to be unmoldable only by movement of the first mold in the first mold pull direction;

determining, in regards to a second mold pull direction, which is a mold pull direction of a second mold corresponding to the first mold, whether or not there is a surface which a second mold pull direction line extending in the second mold pull direction opposite to the first mold pull direction reaches;

determining, in a case where it is determined that there is a surface which the second mold pull direction line reaches, whether or not there is a surface which a third mold pull direction line extending from the first unmoldable portion in a third mold pull direction, which is a mold pull direction of a third mold other than the first mold and the second mold, other than the first mold pull direction and the second mold pull direction;

determining the first unmoldable portion, at which it is determined that there is a surface which the second mold pull direction line reaches and it is determined that there is a surface which the third mold pull direction line reaches, as an unmoldable portion to be unmoldable by the movement of the second mold in the second mold pull direction and movement of the third mold in the third mold pull direction; and displaying the surfaces constituting the three-dimensional shape of the molded product and the unmoldable portion from among the surfaces.

16. An unmoldable portion detection system comprising:
a processor;
a memory;
a normal line arithmetic unit that calculates a normal line extending from a point on each of surfaces constituting a three-dimensional shape of a molded product to outside of the molded product;
a backward component determination unit that determines whether or not an extending direction of the normal line has a backward component, which is a directional component opposite to a prescribed mold pull direction of a mold of the molded product, in accordance with a surface, on which the normal line is calculated; and
an unmoldable portion determination unit that determines a surface having a point, at which the extending direction of the normal line having the backward component is calculated, as an unmoldable portion to be unmoldable only by movement of the mold in one direction,
wherein the system further comprises:
a concave connection determination unit that, in a case where the surface which is determined as the unmoldable portion is an unmoldable surface, and a surface which is adjacent to the unmoldable surface and determined as not the unmoldable surface is an adjacent surface, determines whether or not the unmoldable surface and the adjacent surface are concavely connected to each other with respect to a boundary between the unmoldable surface and the adjacent surface;
an adjacent unmoldable portion determination unit that, in a case where it is determined that the unmoldable surface and the adjacent surface are concavely connected to each other, determines the adjacent surface as the unmoldable portion;
a projection line reach determination unit that, in a case where the surface which is determined as not the unmoldable portion is a projection surface, determines whether or not there is another surface which a mold pull direction line extending from the projection surface in the mold pull direction reaches; and a projection unmoldable portion determination unit that, in a case where there is another surface which the mold pull direction line extending from the projection surface reaches, determines the projection surface as the unmoldable portion.

17. The unmoldable portion detection system as claimed in claim 16, wherein the projection unmoldable portion determination unit that determines, in a case where there is no surface which the mold pull direction line extending from the projection surface reaches, the projection surface and a stand wall, which is a surface adjacent to the projection surface and in parallel to the mold pull direction line as the unmoldable portion.

18. A computer readable non-transitory medium storing a program causing a computer to execute a process for determining an unmoldable portion, the process comprising:

calculating a normal line extending from a point on each of surfaces constituting a three-dimensional shape of a molded product to outside of the molded product;

determining whether or not an extending direction of the normal line has a backward component, which is a directional component opposite to a prescribed mold pull direction of a mold of the molded product, in accordance with a surface, on which the normal line is calculated; and determining a surface having a point, at which the extending direction of the normal line having the backward component is calculated, as the unmoldable portion to be unmoldable only by movement of the mold in one direction, wherein the process comprises steps of:

determining, in a case where the surface which is determined as the unmoldable portion is an unmoldable surface, and a surface which is adjacent to the unmoldable surface and determined as not the unmoldable surface is an adjacent surface, whether or not the unmoldable surface and the adjacent surface are concavely connected to each other with respect to a boundary between the unmoldable surface and the adjacent surface;

determining, in a case where it is determined that the unmoldable surface and the adjacent surface are concavely connected to each other, the adjacent surface as the unmoldable portion, determining, in a case where the surface which is determined as not the unmoldable portion is a projection surface, whether or not there is another surface which a mold pull direction line extending from the projection surface in the mold pull direction reaches, and determining, in a case where there is another surface which the mold pull direction line extending from the projection surface reaches, the projection surface as the unmoldable portion.

19. An unmoldable portion detection method programmed to be executable by a computer having a processor and a memory comprising:

calculating with the processor a normal line extending from a point on each of surfaces constituting a three-dimensional shape of a molded product to the molded product;

determining whether or not an extending direction of the normal line has a backward component, which is a directional component opposite to a prescribed mold pull direction of a mold of the molded product, in accordance with a surface, on which the normal line is calculated; and determining a surface having a point, at which the extending direction of the normal line having the backward component is calculated, as an unmoldable portion to be unmoldable only by movement of the mold in one direction, wherein the method further comprises steps of:

determining, in a case where the surface which is determined as the unmoldable portion is an unmoldable surface, and a surface which is adjacent to the unmoldable surface and determined as not the unmoldable surface is an adjacent surface, whether or not the unmoldable surface and the adjacent surface are concavely connected to each other with respect to a boundary between the unmoldable surface and the adjacent surface; and determining, in a case where it is determined that the unmoldable surface and the adjacent surface are concavely connected to each other, the adjacent surface as the unmoldable portion, and determining, in a case where the surface which is determined as not the unmoldable portion is a projection surface, whether or not there is another surface which a mold pull direction line extending from the projection surface in the mold pull direction reaches; and determining, in a case where there is another surface which the mold pull direction line extending from the projection surface reaches, the projection surface as the unmoldable portion.

* * * * *